(12) United States Patent
Sabella et al.

(10) Patent No.: US 12,184,739 B2
(45) Date of Patent: Dec. 31, 2024

(54) PREFERRED APP REGISTRATION IN MEC DUAL DEPLOYMENTS

(71) Applicant: Intel Corporation, Santa Clara, CA (US)

(72) Inventors: Dario Sabella, Gassino (IT); Samar Shailendra, Bangalore (IN); Miltiadis Filippou, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/288,005

(22) PCT Filed: Aug. 31, 2022

(86) PCT No.: PCT/US2022/042170
§ 371 (c)(1),
(2) Date: Oct. 23, 2023

(87) PCT Pub. No.: WO2023/034392
PCT Pub. Date: Mar. 9, 2023

(65) Prior Publication Data
US 2024/0195879 A1     Jun. 13, 2024

Related U.S. Application Data

(60) Provisional application No. 63/239,267, filed on Aug. 31, 2021.

(51) Int. Cl.
*H04L 67/289*  (2022.01)
*H04L 67/51*   (2022.01)

(52) U.S. Cl.
CPC ............ *H04L 67/289* (2013.01); *H04L 67/51* (2022.05)

(58) Field of Classification Search
CPC ... H04L 67/289; H04L 67/51; H04L 12/1407; H04L 63/0815; H04L 67/303; H04W 4/44; H04M 15/50; H04M 15/66
See application file for complete search history.

(56) References Cited

U.S. PATENT DOCUMENTS

2018/0270780 A1* 9/2018 Xiong ..................... H04L 69/00
2021/0075892 A1* 3/2021 Chun .................... H04L 69/163
(Continued)

FOREIGN PATENT DOCUMENTS

WO    WO-2021062256 A1    4/2021
WO    WO-2023034392 A1    3/2023

OTHER PUBLICATIONS

"3GPP; TSG SA; Architecture for enabling Edge Applications (Release 17)", 3GPP TS 23.558 V17.0.0, (Jun. 28, 2021).
(Continued)

*Primary Examiner* — Benjamin M Thieu
(74) *Attorney, Agent, or Firm* — Schwegman Lundberg & Woessner, P.A.

(57) ABSTRACT

Various approaches are provided for enabling Edge Dual Deployment (EDD). EDD includes Multi-access edge computing (MEC) Dual Deployments (MDD) initialization performed as a preliminary step before the actual registration, as a mechanism to allow the two platforms (EES and MEC platform) to communicate directly. MDD establishment is a dual registration mechanism of the edge application in the EDD environment. MDD update and closing are analogous registration update and de-registration processes, with both sub-cases.

20 Claims, 26 Drawing Sheets

(56) References Cited

U.S. PATENT DOCUMENTS

| | | | |
|---|---|---|---|
| 2021/0112136 A1* | 4/2021 | Seo | H04W 4/50 |
| 2021/0235355 A1 | 7/2021 | Seo | |
| 2021/0243264 A1 | 8/2021 | Yoon et al. | |

OTHER PUBLICATIONS

"ETSI GS MEC 011 V2.2.1", Multi-access Edge Computing (MEC); Edge Platform Application Enablement, (Dec. 2020), 78 pgs.

"International Application Serial No. PCT/US2022/042170, International Search Report mailed Dec. 22, 2022", 3 pgs.

"International Application Serial No. PCT/US2022/042170, Written Opinion mailed Dec. 22, 2022", 5 pgs.

"Operator Platform Telco Edge Requirements", GSMA Version 1.0, (Jun. 29, 2021), 124 pgs.

"ETSI GS MEC 010-2 V2.1.1", Multi-access Edge Computing (MEC); MEC Management; Part 2: Application lifecycle, rules and requirements management, (Nov. 2019), 134 pgs.

"Harmonizing standards for edge computing—A synergized architecture leveraging ETSI ISG MEC and 3GPP specifications", ETSI White Paper #36 [Online]. Retrieved from the Internet: URL: https: www.etsi.org images files ETSIWhitePapers ETSI_wp36_Harmonizing-standards-for-edge-computing.pdf, (Jul. 2020), 14 pgs.

"Draft ETSI GS MMEC 003 V3.0.4", Multi-access Edge Computing (MEC);Framework and Reference Architecture, (May 2021), 29 pgs.

"MEC011_MEC application registration", Huawei Technologies (UK), (Apr. 2021), 5 pgs.

"International Application Serial No. PCT US2022 042170, International Preliminary Report on Patentability mailed Mar. 14, 2024", 7 pgs.

* cited by examiner

PREFERRED APP REGISTRATION IN MEC DUAL DEPLOYMENTS

PRIORITY CLAIM

This application is a U.S. National Stage Filing under 35 U.S.C. 371 from International Application No. PCT/US2022/042170, filed Aug. 31, 2022 and published in English as WO 2023/034392 on Mar. 9, 2023, which claims the benefit of priority to U.S. Provisional Patent Application Ser. No. 63/239,267, filed Aug. 31, 2021, each of which is incorporated herein by reference in its entirety.

TECHNICAL FIELD

Embodiments described herein generally relate to data processing, network communication, and communication system implementations, and in particular, to techniques usable in a Multi-Access Edge Cloud (MEC) networked system.

BACKGROUND

Edge computing, at a general level, refers to the transition of compute and storage resources closer to endpoint devices (e.g., consumer computing devices, user equipment, etc.) to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with MEC approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for the operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

Similarly, Internet of Things (IOT) networks and devices are designed to offer a distributed compute arrangement, from a variety of endpoints. IoT devices are physical or virtualized objects that may communicate on a network and may include sensors, actuators, and other input/output components, which may be used to collect data or perform actions in a real-world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, private enterprise networks (e.g., software-defined wide-area networks (SD-WANs)), and IoT networks, devices, and services have introduced several advanced use cases and scenarios occurring at and towards the edge of the network. However, these advanced use cases have also introduced corresponding technical challenges relating to security, processing, and network resources, service availability, and efficiency, among many other issues. One such challenge is enabling an edge application to be connected both with an ETSI MEC platform and a 3rd generation partnership project (3GPP) Edge Enabler Server (EES). Other challenges arise in ensuring that the same edge application is able to consume both sets of application programming interfaces (APIs) and guaranteeing at the same time that the Standardization Development Organizations (SDOs) can have in principle mechanisms for single app registration.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for providing MEC API interoperability support for multiple message brokers in a MEC infrastructure. The following examples introduce specific configurations and usage of a vehicle-to-anything (V2X) information service (VIS) service mesh control plane for providing the MEC API interoperability support.

Figure 1A:
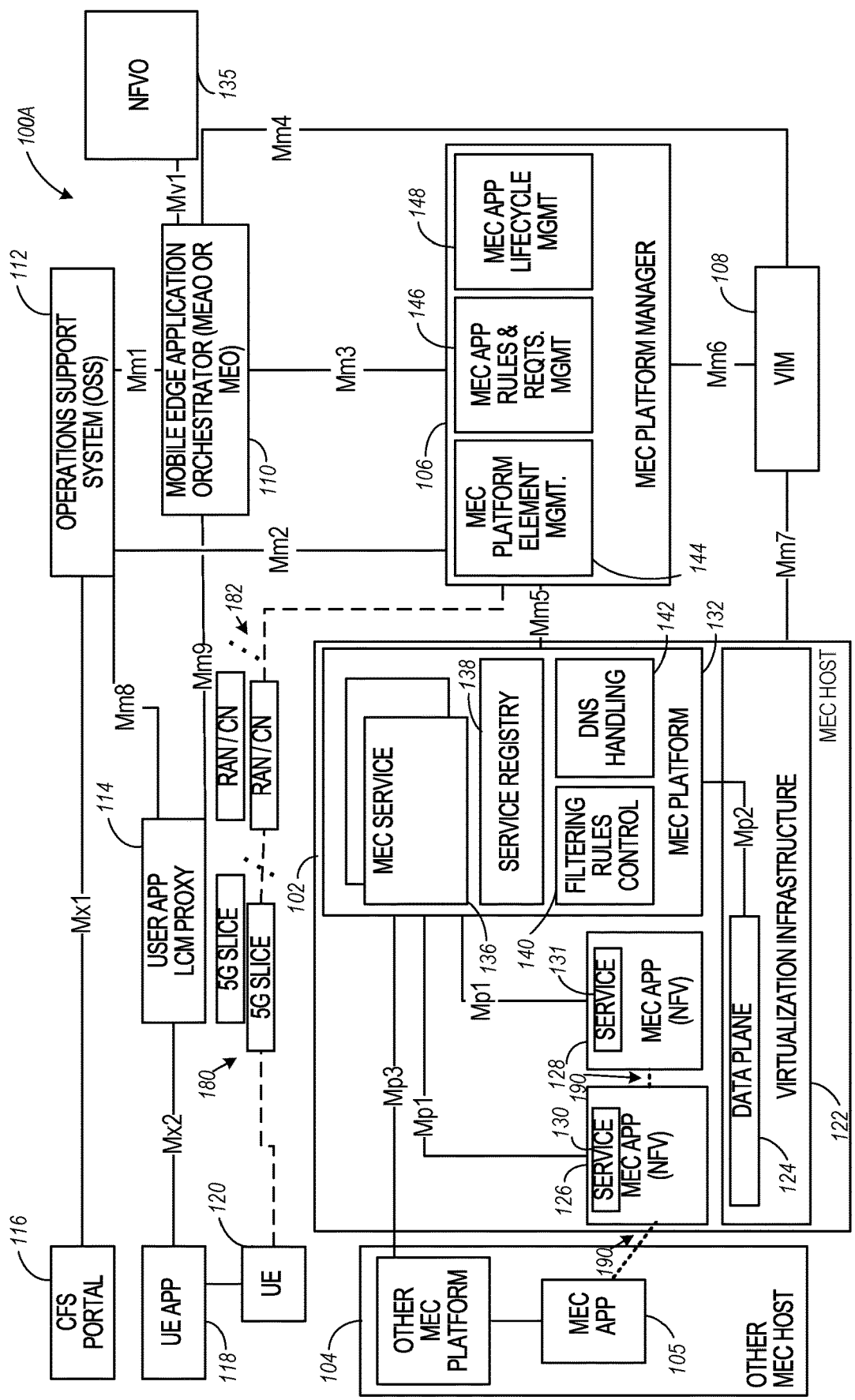
FIG. 1A illustrates a MEC network architecture with MEC API interoperability support for multiple message brokers, according to an example embodiment.

FIG. 1A illustrates a MEC network architecture with MEC API interoperability support for multiple message brokers, according to an example embodiment. FIG. 1A specifically illustrates a MEC architecture 100A with MEC hosts 102 and 104 providing functionalities per one or more ETSI MEC specifications (e.g., ETSI GS MEC 003, ETSI GS MEC 011, and ETSI GS MEC 030 specifications). Specifically, enhancements to the MEC platform 132 (e.g., as discussed in connection with FIGS. 2-5), as well as message signaling (e.g., message subscription signaling and message publication signaling), can be used for providing the MEC API interoperability support within the MEC architecture 100A.

Referring to FIG. 1A, the MEC architecture 100A includes MEC hosts 102 and 104, a virtualization infrastructure manager (VIM) 108, a MEC platform manager 106 (also referred to as Mobile Edge Platform Manager or MEPM), a Mobile Edge Application Orchestrator (MEAO) (also referred to as a MEC orchestrator or MEO) 110, an operations support system (OSS) 112, a user app proxy 114, a UE app 118 running on UE 120, and CFS portal 116. The MEC host 102 can include a MEC platform 132 with filtering rules control module 140, a DNS handling module 142, service registry 138, and MEC services 136. The MEC host 104 can include resources used to instantiate MEC apps 105. The MEC services 136 can include at least one scheduler 137, which can be used to select resources for instantiating MEC apps (or NFVs) 126 and 128 upon virtualization infrastructure 122 that includes a data plane 124.

The MEC apps 126 and 128 can be configured to provide services 130, 131, which can include processing network communications traffic of different types associated with one or more wireless connections. In some embodiments, the services 130, 131 include message broker services configured to support multiple application layer protocols used in the collection/distribution of data from/to multiple data sources across different MNOs. In this regard, services 130, 131 provided by MEC apps are also referred to as message brokers. In other embodiments, MEC apps 126 and 128 are used for message subscription (e.g., to subscribe to communications from message brokers) and message publication (e.g., to publish data to message brokers which can be distributed to message subscribers).

In some embodiments, a first MEC app (e.g., MEC app 105 in MEC host 104) can be configured as a message broker, while a second MEC app (e.g., MEC app 126 in MEC host 102) can be configured as a MEC message service subscriber/consumer. In this case, a communication link (e.g., a direct data connection) 190 may be established between two separate MEC apps (e.g., MEC apps in different MEC hosts or the same MEC host). In this regard, the message broker is a service-producing MEC app.

In other aspects, the message broker may be configured as a registered service of the MEC platform 132, as a producer of data. In other words, the message broker is part of a MEC platform's service registry. In this case, communication with a MEC app requesting a subscription to a messaging service is achieved, within the same MEC host, via the Mp1 interface and the connection to a common MEC platform. When the message broker service and the requestor MEC app are instantiated at different MEC hosts of the same MEC system, communication with a MEC app in another MEC host (in the same or different MNO) is achieved via the Mp3 interface (e.g., using a connection between MEC platforms in different MEC hosts). In case these different MEC hosts belong to different MEC systems of a MEC federation, then, instead of Mp3, MEC federation reference points are involved in this communication.

In some aspects, the message broker is a service-producing MEC application, either instantiated at the same MEC host as the MEC app requesting subscription to messages, or at another MEC host of the same or of another MEC system. In case of different locality (e.g., different MEC hosts), the Mp1 and Mp3/MEC federation interfaces are involved in communication. In case of the same locality (e.g., the same MEC host), the Mp1 interface will be only involved.

The MEC platform manager 106 can include MEC platform element management module 144, MEC app rules and requirements management module 146, and MEC app lifecycle management module 148.

In some aspects, UE 120 can be configured to communicate to one or more of the core networks 182 via one or more of the network slice instances (NSIs) 180. In some aspects, the core networks 182 can use slice management functions to dynamically configure NSIs 180, including dynamically assign a slice to a UE, configure network functions associated with the slice, configure a MEC app for communicating data using the slice, reassign a slice to a UE, dynamically allocate or reallocate resources used by one or more of the NSIs 180, or other slice related management functions. One or more of the functions performed in connection with slice management can be initiated based on user requests (e.g., via a UE), based on a request by a service provider, or may be triggered automatically in connection with an existing Service Level Agreement (SLA) specifying slice-related performance objectives.

Figure 1B:
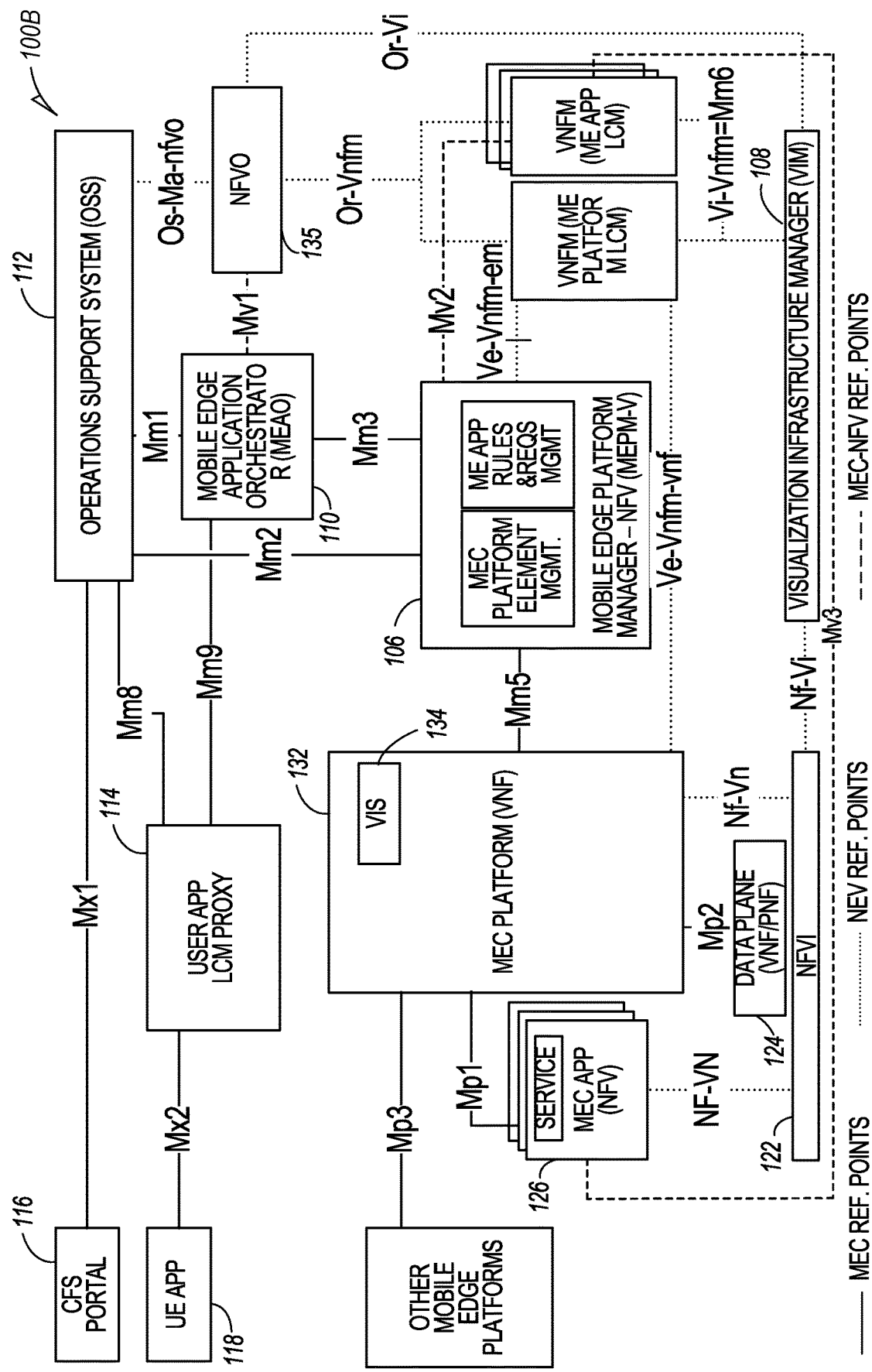
FIG. 1B illustrates a MEC reference architecture in a Network Function Virtualization (NFV) environment, according to an example.

FIG. 1B illustrates a MEC reference architecture 100B in a Network Function Virtualization (NFV) environment, according to an example. The MEC architecture 100B can be configured to provide functionalities according to an ETSI MEC specification, such as the ETSI GR MEC 017 specification.

In some aspects, ETSI MEC can be deployed in an NFV environment as illustrated in FIG. 1B which can also utilize MEC API interoperability support for multiple message brokers in a MEC infrastructure. In some aspects, the MEC platform is deployed as a virtualized network function (VNF). The MEC applications can appear like VNFs towards the ETSI NFV Management and Orchestration (MANO) components (e.g., VIM 108, MEAO 110, and NFVO 135). This allows the re-use of ETSI NFV MANO functionality. In some aspects, the full set of MANO functionality may be unused and certain additional functionality may be needed. Such a specific MEC application is denoted by the name "MEC app VNF" (or ME app VNF) as discussed herein. In some aspects, the virtualization infrastructure is deployed as an NFVI, and its virtualized resources are managed by the virtualized infrastructure manager (VIM). For that purpose, one or more of the procedures defined by ETSI NFV Infrastructure specifications (e.g., ETSI GS NFV-INF 003, ETSI GS NFV-INF 004, and ETSI GS NFV-INF 005) can be used.

In some aspects, the MEC app VNFs will be managed like individual VNFs, allowing that a MEC-in-NFV deployment can delegate certain orchestration and Life Cycle Management (LCM) tasks to the NFVO and VNFM functional blocks, as defined by ETSI NFV MANO. In some embodiments, the MEC app VNF can be configured as a message broker or as a app that consumes services in a MEC architecture (e.g., message subscription services provided by message brokers from different MNOs).

In some aspects, the Mobile Edge Platform Manager (MEPM) 106 can be transformed into a "Mobile Edge Platform Manager—NFV" (MEPM-V) that delegates the LCM part to one or more virtual network function managers (VNFM(s)). The Mobile Edge Orchestrator (MEO), as defined in the MEC reference architecture ETSI GS MEC-003, can be transformed into a "Mobile Edge Application Orchestrator" (MEAO) 110 that uses the NFVO 135 for resource orchestration, and orchestration of the set of MEC app VNFs as one or more NFV Network Services (NSs). In some embodiments, the MEAO 110 and the MEPM 106 can be configured to perform federation management functions, including communication between MEC systems in a federated MEC network.

In some aspects, the Mobile Edge Platform VNF, the MEPM-V, and the VNFM (ME platform LCM) can be deployed as a single package as per the ensemble concept in 3GPP TR 32.842. In further aspects the VNFM is a Generic VNFM as per ETSI GS NFV-IFA 009 and the Mobile Edge Platform VNF and the MEPM-V are provided by a single vendor.

In some aspects, the Mp1 reference point between a MEC application and the ME platform can be optional for the MEC application, unless it is an application that provides and/or consumes a ME service. Various MEC-related interfaces and reference points discussed herein are further defined in the following ETSI-related technical specifications: ETSI GS MEC-003 and ETSI GR MEC-024 specifications.

The Mp1 reference point is a reference point between the mobile edge platform and the mobile edge applications. The Mp1 reference point provides service registration, service discovery, and communication support for services. It also provides other functionality such as application availability, session state relocation support procedures, traffic rules, and DNS rules activation, access to persistent storage and time of day information, etc. This reference point can be used for consuming and providing service-specific functionality.

The Mp2 reference point is a reference point between the mobile edge platform and the data plane of the virtualization infrastructure. The Mp2 reference point is used to instruct the data plane on how to route traffic among applications, networks, services, etc.

The Mp3 reference point is a reference point between mobile edge platforms, and it is used for control communication between mobile edge platforms.

In some aspects, the Mm3 reference point between the MEAO 110 and the MEPM-V 106 is based on the Mm3 reference point, as defined by ETSI GS MEC 003. Changes may be configured to this reference point to cater to the split between MEPM-V and VNFM (MEC applications LCM).

In some aspects, the following new reference points (Mv1, Mv2, and Mv3) are introduced between elements of the ETSI MEC architecture and the ETSI NFV architecture to support the management of MEC app VNFs. The following reference points are related to existing NFV reference points, but only a subset of the functionality may be used for ETSI MEC, and extensions may be necessary: Mv1 (this reference point connects the MEAO and the NFVO: it is related to the Os-Ma-nfvo reference point, as defined in ETSI NFV): Mv2 (this reference point connects the VNF Manager that performs the LCM of the MEC app VNFs with the MEPM-V to allow LCM related notifications to be exchanged between these entities: it is related to the Ve-Vnfm-em reference point as defined in ETSI NFV, but may include additions, and might not use all functionality offered by Ve-Vnfm-em): Mv3 (this reference point connects the VNF Manager with the MEC app VNF instance, to allow the exchange of messages e.g., related to MEC application LCM or initial deployment-specific configuration: it is related to the Ve-Vnfm-vnf reference point, as defined in ETSI NFV, but may include additions, and might not use all functionality offered by Ve-Vnfm-vnf.

In some aspects, the following reference points are used as they are defined by ETSI NFV: Nf-Vn (this reference point connects each MEC app VNF with the NFVI): Nf-Vi (this reference point connects the NFVI and the VIM): Os-Ma-nfvo (this reference point connects the OSS and the NFVO. It is primarily used to manage NSs, i.e., several VNFs connected and orchestrated to deliver a service): Or-Vnfm (this reference point connects the NFVO and the VNFM: it is primarily used for the NFVO to invoke VNF LCM operations): Vi-Vnfm (this reference point connects the VIM and the VNFM: it is primarily used by the VNFM to invoke resource management operations to manage the cloud resources that are needed by the VNF: it is assumed in an NFV-based MEC deployment that this reference point corresponds 1:1 to Mm6); and Or-Vi (this reference point connects the NFVO and the VIM: it is primarily used by the NFVO to manage cloud resources capacity).

Figure 1C:
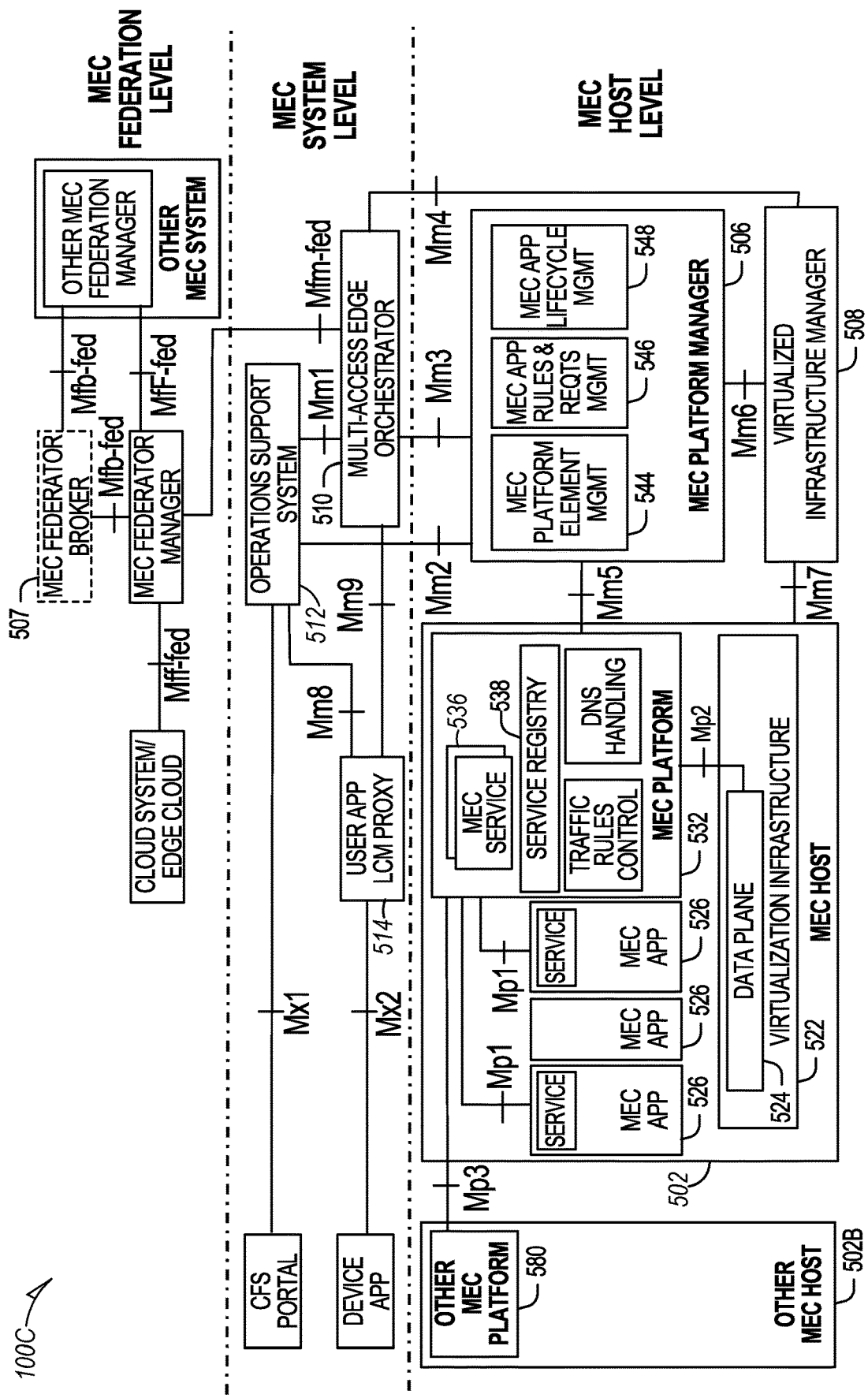
FIG. 1C illustrates a variant of the MEC network architecture of FIG. 1A configured with MEC federation, according to an example.

FIG. 1C illustrates a MEC architecture 100C that is a variant of the MEC network architecture of FIG. 1A configured with MEC federation, according to an example embodiment. Referring to FIG. 1C, the MEC host level, and the MEC system level of the MEC architecture 100C are the same as the corresponding MEC host and system levels of the MEC architecture 100A in FIG. 1A. The MEC architecture 100C further includes a MEC federation level with a MEC Federator block that includes a MEC federation manager configured to manage multiple MEC architectures (or MEC systems). In this regard, the MEC federation manager in FIG. 1C manages the MEC architecture (or system) 100C and one or more additional MEC systems (referenced in FIG. 1C as "Other MEC System"). The additional one or more MEC systems may be managed by the Other MEC Federation Manager, which is communicatively coupled to the MEC federation manager via an Mff-fed reference point. The MEC federation manager in the MEC federation level is further communicatively coupled via an Mff-fed reference point to a Cloud System (or Edge Cloud). The MEC federation manager and the Other MEC federation manager may be communicatively coupled to a MEC federation broker in the MEC Federator block via corresponding Mfb-fed reference points.

Figure 2:
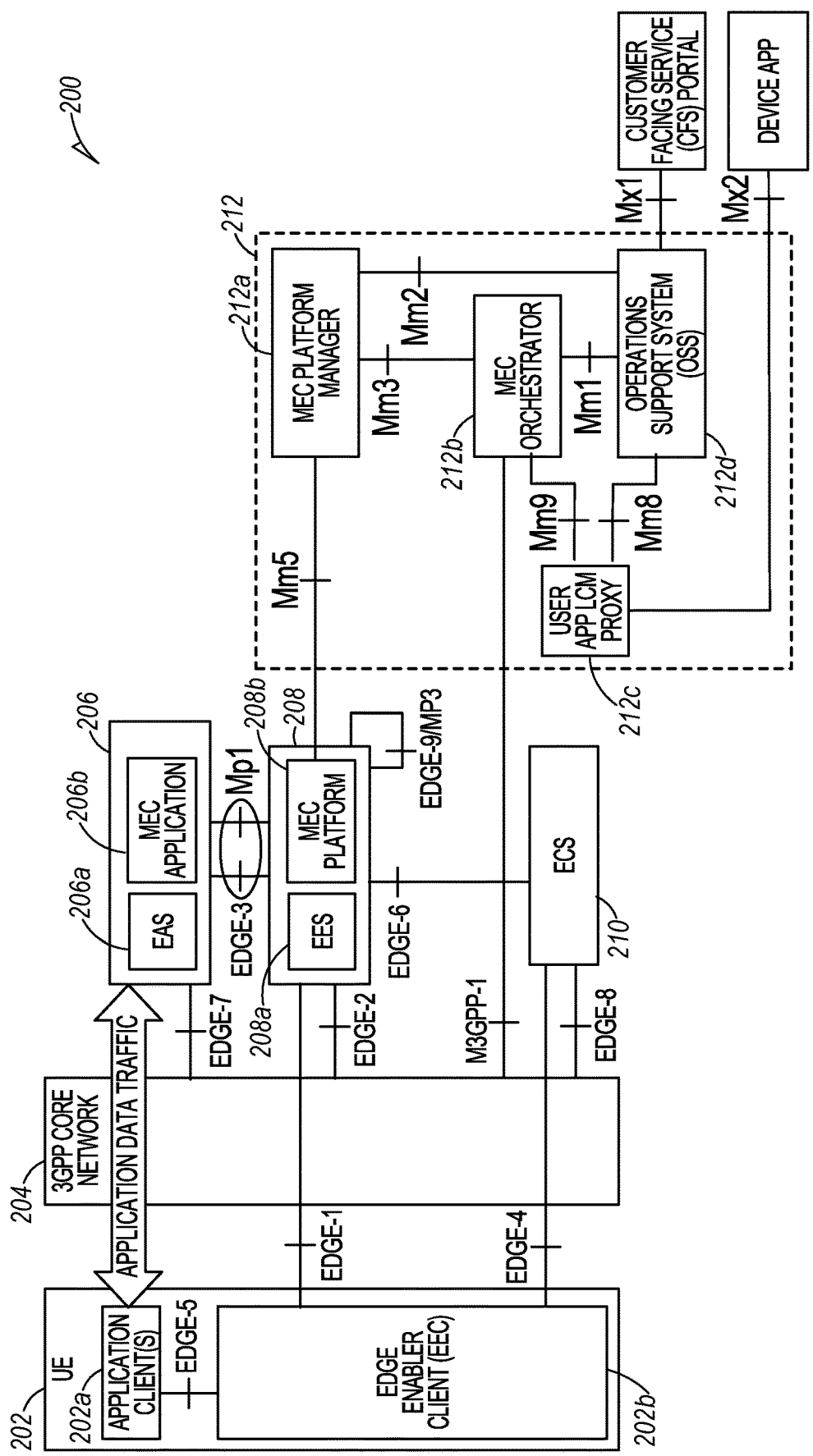
FIG. 2 illustrates an MEC architecture supported by 3GPP and ETSI Industry Specification Group (ISG) MEC, according to an example.

As above, it is desirable to determine the role of edge standards when edge computing is deployed in conjunction with mobile networks, as well as establish a synergized architecture which leverages the ETSI ISG MEC and 3GPP SA6 specifications. The architecture leveraging ETSI ISG MEC and 3GPP SA6 (EDGEAPP) specifications may allow the implementation of a single platform as product compliant with both standards. FIG. 2 illustrates a Mobile Edge Cloud architecture supported by 3GPP and ETSI ISG MEC, according to an example embodiment. The architecture 200 includes one or more application clients 202a of one or more UEs 202 connected to one or more EAS 206a-MEC application 206b pairs 206 through a 3GPP core network 204 using edge interfaces. An EEC 202b of the UE 202 is connected to one or more EES 208a-MEC platform 208 pairs 208 and one or more ECS 210 through the 3GPP core network 204 using edge interfaces. The MEC platform 208b may be connected to an MEC platform manager 212a of an MEC management and orchestration block 212. The MEC platform manager 212a may be connected with an MEC operations support system 212d and MEC orchestrator 212b of the MEC management and orchestration block 212. The MEC orchestrator 212b may be connected with the MEC operations support system 212d and a user app LCM proxy 212c of the MEC management and orchestration block 212. In general, three main "deployment variants" may be possible. In fact, depending on the various deployment options and customers desires, it may be desirable to provide a single product able to be compliant with either or both the 3GPP and ETSI standards.

To enable the third possibility ("MEC Dual Deployments", MDD, or equivalently EDD, "Edge Dual Deployments"), a joint mechanism for App registration is desired, at the same time allowing the other options to be used, i.e., an App registration under a single system/platform. This last is useful as the SDOs can have in principle mechanisms for single app registration while a dual deployment should be seen as optional from this perspective.

This synergy between ETSI MEC and 3GPP SA6 is driven by the desire to allow dual deployments, even if there are additional motivations, such as the MEC Federation. In fact, aspects related to the MEC Federation are not considered herein and independent from the formation of a federation among different entities. In fact, the mechanism of dual deployment is also valid for a single mobile operator owning two different edge systems (e.g., coming from different vendors, in the same country), which is something that is common in practical deployment cases. Note that the acronyms MDD and Edge Dual Deployment (EDD) are equivalent, and are used interchangeably herein, depending on the context.

Thus, as above, given EDD scenarios, including both 3GPP-compliant EESs and ETSI-compliant MEC platforms, under the same administrative domain or in different domains the questions are: how to enable these EDD scenarios, i.e., enabling an edge application to be connected both with an ETSI MEC platform and a 3GPP EES, how to ensure that the same edge application is able to consume both sets of APIs, and how to guarantee at the same time that the two SDOs can have in principle mechanisms for single app registration. To this end, a framework is defined that includes the following components:

MDD INITIALIZATION—The initialization of the dual ETSI/3GPP deployment: this can be done as a preliminary step before the actual registration as a mechanism to allow the two platforms (the EES and MEC platforms) to communicate directly. This may be used, for example, by the EES and MEC platforms to synch up on their mutual awareness.

MDD ESTABLISHMENT—A dual registration mechanism of the edge application in the EDD environment: for 3GPP EDGEAPP as the primary architecture, a mechanism in 3GPP (impacting 3GPP TS 23.558) to perform registration (indicating ETSI MEC as secondary system); for ETSI MEC as the primary architecture, a mechanism in ETSI MEC (impacting GS MEC 011) to perform registration (indicating 3GPP EDGEAPP as secondary system).

MDD UPDATE—An analogous registration update process, with both sub-cases.

MDD CLOSING—A similar de-registration process, with both sub-cases.

The framework may impact the 3GPP eEDGEAPP study item and ETSI MEC standard (e.g., ETSI GS MEC 011) related to Application Enablement APIs. Currently there are no interoperable solutions to allow registration of edge applications in a dual deployment, i.e., both under the domain of 3GPP SA6 EDGEAPP and ETSI MEC architectures. Single system solutions are provided separately by ETSI MEC and 3GPP, for the registration of MEC App and EAS (Edge Application Server) respectively. As a result, the full cross-system service and API footprint is currently not reachable by edge applications registered to either an Edge Enabler Server (EES) or to a MEC platform.

In more detail, from a 3GPP SA6 perspective, the edge applications are available only as EASs. To enable discovery of an EAS, the EAS registers with an EES. The EAS architecture defines information elements (IEs) to be used during registration, registration update, and de-registration of EAS:

TABLE 1

EAS Information Elements for registration,
registration update and de-registration

| Request/ Response Type | Information element | Status | Description |
| --- | --- | --- | --- |
| EAS Registration Request | EAS Profile | M | EAS Profile as described in Table 8.2.4-1 |
| | Security credentials | M | Security credentials of the EAS. |
| | Proposed expiration time | O | Proposed expiration time for the registration |

TABLE 1-continued

EAS Information Elements for registration, registration update and de-registration

| Request/Response Type | Information element | Status | Description |
|---|---|---|---|
| EAS Registration Response | Successful response | O | Indicates that the registration request was successful. |
| | > Registration ID | M | Identifier of the registration. |
| | > Expiration time | O | Indicates the expiration time of the registration. To maintain an active registration status, a registration update is required before the expiration time. If the Expiration time IE is not included, it indicates that the registration never expires. |
| | Failure response | O | Indicates that the registration request failed. |
| | > Cause | O | Indicates the cause of registration request failure |
| EAS Registration update Request | Registration ID | M | Identifier of the registration. |
| | Security credentials | M | Security credentials of the EAS |
| | Updated EAS Profile | O | EAS Profile as described in Table 8.2.4-1 with updated information. Included only if there is an update in EAS information. |
| | Proposed expiration time | O | Proposed expiration time for the registration |
| EAS Registration Update Response | Successful response | O | Indicates that the registration update request was successful. |
| | > Expiration time | O | Indicates the expiration time of the updated registration. To maintain an active registration status, a registration update is required before the expiration time. If the Expiration time IE is not included, it indicates that the updated registration never expires. |
| | Failure response | O | Indicates that the registration update request failed. |
| | > Cause | O | Indicates the cause of registration update request failure |
| EAS de-registration Request | Registration ID | M | Identifier of the registration. |
| | Security credentials | M | Security credentials of the EAS |
| EAS de-registration Response | Successful response | O | Indicates that the de-registration request was successful. |
| | Failure response | O | Indicates that the de-registration request failed. |
| | > Cause | O | Indicates the cause of de-registration request failure |

On receiving the registration request from the EAS, the EES stores EAS profile information to be used during EAS discovery at a later stage. The EAS profile contains some or all the IEs described in Table 2:

TABLE 2

List of Information Elements in EAS Profile

| Information element | Status | Description |
|---|---|---|
| EASID | M | The identifier of the EAS |
| EAS Endpoint | M | Endpoint information (e.g., URI, FQDN, IP address) used to communicate with the EAS. This information maybe discovered by EEC and exposed to ACs so that ACs can establish contact with the EAS. |
| ACID(s) | O | Identifies the AC(s) that can be served by the EAS |
| EAS Provider Identifier | O | The identifier of the ASP that provides the EAS. |
| EAS Type | O | The category or type of EAS (e.g. V2X) |
| EAS description | O | Human-readable description of the EAS |
| EAS Schedule | O | The availability schedule of the EAS (e.g., time windows) |
| EAS Geographical Service Area | O | The geographical service area that the EAS serves. ACs in UEs that are located outside that area shall not be served. |
| EAS Topological Service Area | O | The EAS serves UEs that are connected to the Core Network from one of the cells included in this service area. ACs in UEs that are located outside this area shall not be served. See possible formats in Table 8.2.7-1. |
| EAS Service KPIs | O | Service characteristics provided by EAS, detailed in Table 8.2.5-1 |
| EAS service permission level | O | Level of service permissions e.g., trial, gold-class supported by the EAS |
| EAS Feature(s) | O | Service features e.g., single vs. multi-player gaming service supported by the EAS |
| EAS Service continuity support | O | Indicates if the EAS supports service continuity or not. This IE also indicates which ACR scenarios are supported by the EAS. |
| List of EAS DNAI(s) | O | DNAI(s) associated with the EAS. This IE is used as Potential Locations of Applications in clause 5.6.7 of 3GPP TS 23.501. It is a subset of the DNAI(s) associated with the EDN where the EAS resides. |
| List of N6 Traffic Routing requirements | O | The N6 traffic routing information and/or routing profile ID corresponding to each EAS DNAI. |
| EAS Availability Reporting Period | O | The availability reporting period (i.e., heartbeat period) that indicates to the EES how often it needs to check the EAS's availability after a successful registration. |
| EAS Required Service APIs | O | A list of the Service APIs that are required by the EAS |
| EAS Status | O | The status of the EAS (e.g., enabled, disabled, etc.) |

On the other side, from an ETSI MEC perspective, the MEC App instantiation mechanism defines an Application Descriptor (AppD), containing a set of information elements and attributes for MEC App lifecycle management (see Table 3 below), however, these AppD attributes are not considering a dual deployment with EDGEAPP architecture.

TABLE 3

Attributes of AppD (ref. ETSI GS MEC 010-2)

| AppD attribute name | Description |
|---|---|
| appDId | Identifier of this MEC application descriptor. |
| appName | Name to identify the MEC application. |
| appProvider | Provider of the application and of the AppD. |

TABLE 3-continued

Attributes of AppD (ref. ETSI GS MEC 010-2)

| AppD attribute name | Description |
| --- | --- |
| appSoftVersion | Identifies the version of software of the MEC application. |
| appDVersion | Identifies the version of the application descriptor. |
| mecVersion | Identifies version(s) of MEC system compatible with the MEC App |
| appInfoName | Human readable name for the MEC application. |
| appDescription | Human readable description of the MEC application. |
| virtualComputeDescriptor | Describes CPU, Memory and acceleration requirements of the virtual machine. |
| swImageDescriptor | Describes the software image which is directly loaded on the VM |
| virtualStorageDescriptor | descriptors of virtual storage resources to be used by the MEC application. |
| appExtCpd | Describes external interface(s) exposed by this MEC application. |
| appServiceRequired | Describes services a MEC application requires to run. |
| appServiceOptional | Describes services a MEC application may use if available. |
| appServiceProduced | Describes services a MEC application is able to produce |
| appFeatureRequired | Describes features a MEC application requires to run. |
| appFeatureOptional | Describes features a MEC application may use if available. |
| transportDependencies | Transports that this application requires to be provided by the platform. |
| appTrafficRule | Describes traffic rules the MEC application requires. |
| appDNSRule | Describes DNS rules the MEC application requires. |
| appLatency | Describes the maximum latency tolerated by the MEC application. |
| terminateAppInstanceOpConfig | Configuration parameters for the Terminate application instance operation. |
| changeAppInstanceStateOpConfig | Configuration parameters for the change application instance state operation. |
| userContextTransferCapability | Only if the application supports the user context transfer capability |
| appNetworkPolicy | it represents the application network policy of carrying the application traffic. |

Finally, while modifying the flow diagrams for MEC application registration in ETSI MEC may be used, at present MEC App registration is not defined in ETSI MEC: nor is a dual registration mechanism defined that follows 3GPP SA6.

An interoperable mechanism to enable registration of edge applications in MEC dual deployments, in compliance with both SA6 EDGEAPP and ETSI MEC standards, is described herein. The interoperable mechanism allows the implementation of interoperable and portable applications in both technologies. This may permit network operators to scale their services and ensure portability and interoperability across a diverse ecosystem of technologies and systems. In addition, enabling dual deployments helps to avoid market fragmentation and permits to lower costs of adoption of MEC, with benefits for the whole edge industry value chain. Furthermore, a standard-based mechanism may facilitate the deployment, by positively impacting the data center market, as well as end users and application developers.

First Component: MDD INITIALIZATION

MDD initialization is the initialization of the dual deployment, which can be performed as a preliminary operation before the actual registration, as a mechanism to allow the two platforms (EES and MEC platform) to communicate directly, e.g., to synch mutual awareness. Alternatively, this initialization can be triggered by the actual request from the edge application, related to a preferred registration procedure (indicating the primary and secondary system to be registered).

While the actual registration of the edge application may be performed in the second component below, in order to allow dual registration, a preliminary mechanism may be used to allow the two platforms (EES and MEC platform) to communicate directly, e.g., to synch up on their mutual awareness. This link between EES and MEC platform is purely "formal" in case the actual physical device is the same (i.e., the hardware/software platform is the same, but appearing as two platforms from a standard perspective). Alternatively, the two platforms can be separate devices from a software perspective (i.e., running on the same or different network function virtual infrastructure (NFVI)) or also hardware perspective (i.e., in different edge point-of-presences (PoPs), whether or not co-located).

Figure 3:
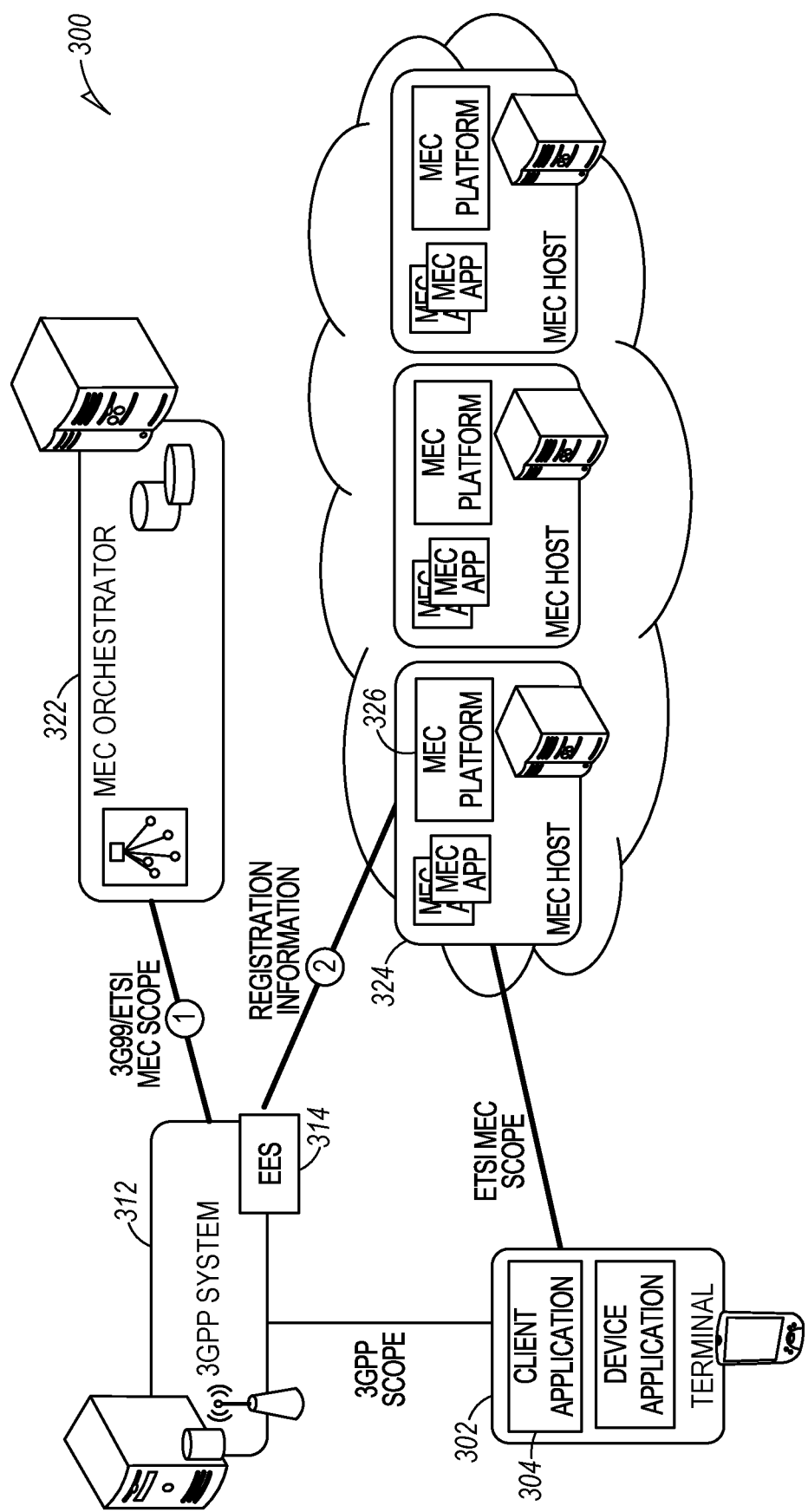
FIG. 3 illustrates MEC Dual Deployment (MDD) initialization, according to an example.

FIG. 3 illustrates MDD initialization, according to an example embodiment. The overall system 300 shown in FIG. 3 includes the UE 302 with a client application 304, the 3GPP system 312 that contains the EES 314, an MEC orchestrator 322 and at least one MEC host 324 that contains at least one MEC platform 326. The operations used in MDD initialization shown in FIG. 3 include: (1) mutual system discovery and (2) EES/MEC platform pairs selection, as suitable information for dual edge application registration between the peer EES/MEC platforms.

As a first operation (operation 1 in FIG. 3), mutual system discovery is carried out, as follows: the two systems start a dialogue (among MEC Orchestrator (MEO) 322 and the 3GPP management system (Operations Support System—OSS)) 312. This dialogue can be initiated either by the MEO or the 3GPP management system OSS 312: in both cases the dialogue aims at exchanging information among the systems, i.e., on the full set of available platforms (suitable for dual edge application registration) between the systems.

As an example, when the dialogue is initiated by the ETSI MEC system, the MEO 322 signals the OSS 312 to obtain updated information of all the available EESs 314. The updated information of each EES 314 may include, for example, the EES ID, location, available services, and other features. The MEO 322 may then share the same kind of information to the 3GPP management system 312. On the other hand, when the dialogue is initiated by the 3GPP system, the same discovery procedure may be carried out, with the difference being that the 3GPP OSS 312 triggers the signaling to obtain the MEC platform information from the MEC system.

The mutual awareness between the MEO 322 and 3GPP OSS 312 is implicit; the mutual awareness can be realized via direct connection in the same network or via pre-configuration of the respective IP addresses, as result of a business agreement between the stakeholders managing the systems. In any case, the manner in which the systems are made mutually aware at a high level is not described here. In addition, this operation may be performed for the sake of generality. The set can also be pre-filtered by the systems, e.g., for privacy reasons. As an example, one system can decide to not share its entire network of platforms to the other system for any reason, and vice-versa. Nevertheless, in this context it is assumed that an entire network or cluster of platforms is exchanged to enable dual deployment. The straightforward case is obviously when the actual devices are implementing both 3GPP and ETSI standards: this is the case where 3GPP EESs and ETSI MEC platforms are different only from an ID point of view.

As a second operation (operation 2 in FIG. 3), based on the full list of available platforms (operation 1), a list of selected EES/MEC Platform pairs (suitable for the actual dual edge application registration) may be identified and communicated between the systems. This selection (see exemplary Table 4 below) can be the result of a pre-configuration done by the owner(s) of the systems to allow the dual deployment. Alternatively, the selection can be performed "on-the-fly": that is, the list of platform pairs can be carried out by either the MEO or by the OSS.

TABLE 4

Example of selection of platforms pairs

| 3GPP EDGEAPP EESs | ETSI MEC Platforms |
|---|---|
| EES1 | MEP1 |
| EES3 | MEP7 |
| EES4 | MEP9 |

The EES/MEC Platform pair selection may depend on the deployment information exchanged between the systems, as well as from the registration criteria communicated by the edge application (e.g., availability of services for consumption). A typical case is one in which a single hardware entity, compliant with both 3GPP EDGEAP and ETSI MEC specifications hosts both an EES and a MEC Platform. However, another case may be one in which the EES and MEC Platform are hosted in different hardware entities.

In addition, at this stage (i.e., before the actual registration, performed in component #2) a single pair still cannot be identified as this choice depends on the actual location of the application itself.

Figure 4:
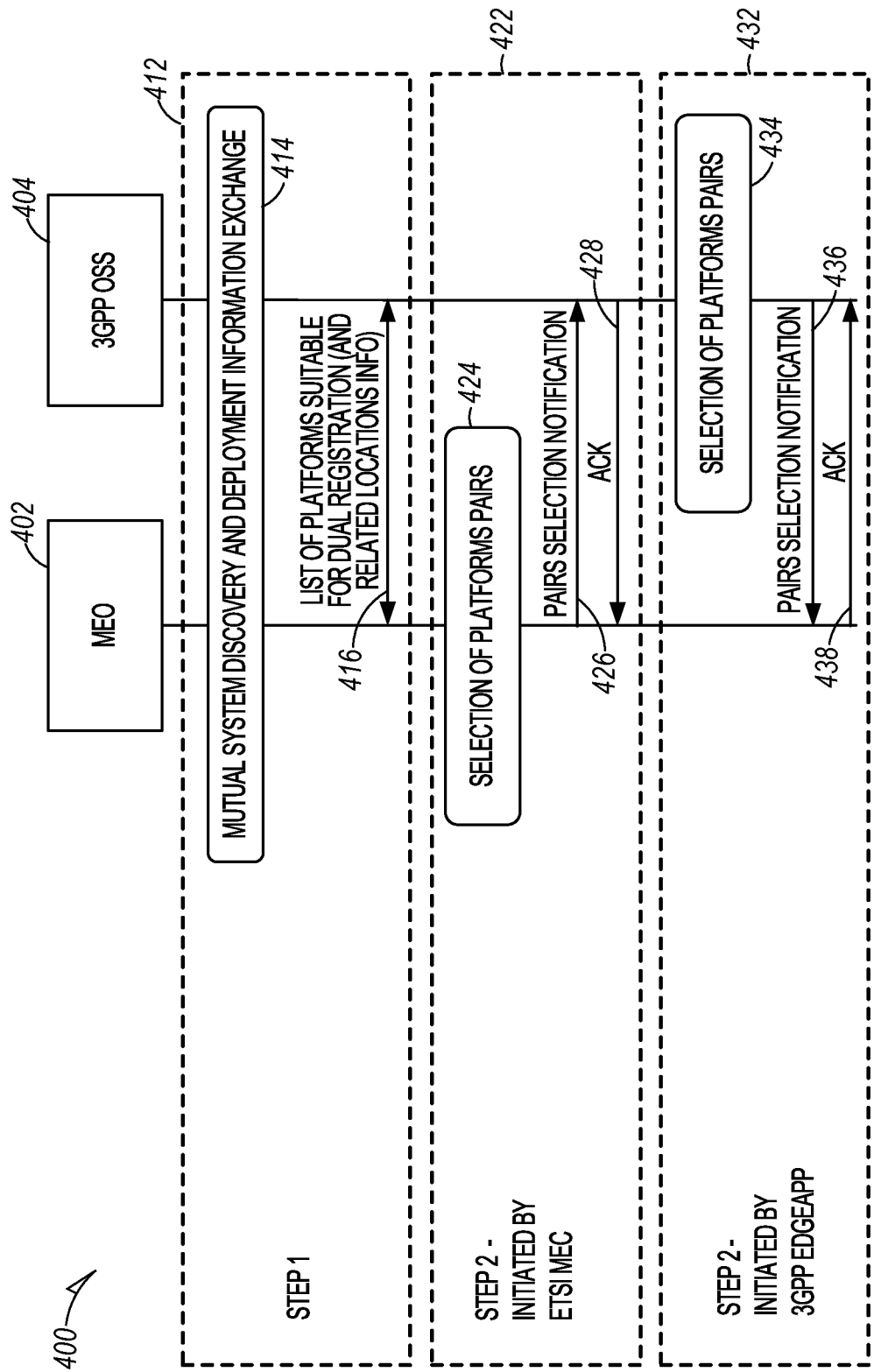
FIG. 4 illustrates the two-step MDD initialization procedure, according to an example.

FIG. 4 illustrates the two-step MDD initialization procedure, according to an example embodiment. As shown, FIG. 4 explains the two-step MDD initialization procedure 400 among the two systems, in both variants (i.e., dialogue is initiated by the ETSI MEC or 3GPP EDGEAPP). The interface connecting the MEO 402 and the 3GPP management system (3GPP OSS) 404 is M3GPP-1, as depicted in FIG. 2.

At operation 1 412, the MEO 402 and 3GPP OSS 404 engage in mutual system discovery 414 and exchange a list of platforms suitable for dual registration and related locations information 416.

Alternatively, the list of platform pairs (operation 2) can be carried out in the registration phase (component #2). In that case, the entity initiating the dialogue is the primary system. In some cases, although the platforms may be considered peer platforms, the primary system and second systems may be defined in some cases only as the initial and secondary registration platforms, or initializing and responding to the dialogue/registration, or to which the UE first requests registration. In other cases, other limitations may apply—e.g., only the primary system may manage the LCM of the edge application, while the secondary system may be used for API consumption.

In one example, if a MEC application is registering to the ETSI MEC as the primary system, operation 2 422 is performed at the registration phase and the dialogue is initiated by the MEO 402 at the registration phase. That is, the selection of platform pairs 424, notification of the pairs selection 426 and acknowledgment of the pairs selection 428 may be performed at operation 2 422 initiated by the MEO 402. On the other hand, if an EAS is registering to the 3GPP EDGEAPP as the primary system, operation 2 may be performed at the registration phase and the dialogue initiated by the 3GPP OSS 404. This alternative operation 2 432 is described in detail in component #2 below. That is, the selection of platform pairs 434, notification of the pairs selection 436 and acknowledgment of the pairs selection 438 may be performed at alternative operation 2 432 initiated by the 3GPP OSS 404.

Data Structures

In the context of MDD initialization, proper data structures are defined, in order to support dual deployment registration procedures. In each of the two systems (ETSI and 3GPP), the secondary system may only be optional, meaning that the actual dual deployment may not be mandated, per se.

Each message related to registration, in order to dually register an edge app to a MEC Platform and an EES, may be accompanied by enhanced versions of the EAS Profile (in case the edge app is an EAS) or the AppD (in case the edge app is a MEC App).

For example, in ETSI MEC the enhanced version of the AppD may be shown in Table 5:

TABLE 5

Attributes of enhanced AppD for dual application registration

| AppD attribute name | Description |
|---|---|
| appDId | Identifier of this MEC application descriptor. |
| appName | Name to identify the MEC application. |
| appProvider | Provider of the application and of the AppD. |
| appSoftVersion | Identifies the version of software of the MEC application. |
| appDVersion | Identifies the version of the application descriptor. |
| mecVersion | Identifies version(s) of MEC system compatible with the MEC App |
| edgeAppVersion | Identifies version(s) of EDGEAPP system compatible with the MEC App - Note: the field is optional, as it depends on the registration type (in case of "single" registration, this field is not present) |
| registrationType | Type of MEC application registration (single MEC or dual ETSI MEC/ 3GPP EDGEAPP) - mandatory field |
| appInfoName | Human readable name for the MEC application. |
| appDescription | Human readable description of the MEC application. |
| virtualComputeDescriptor | Describes CPU, Memory and acceleration requirements of the virtual machine. |
| swImageDescriptor | Describes the software image which is directly loaded on the VM |
| virtualStorageDescriptor | descriptors of virtual storage resources to be used by the MEC application. |
| appExtCpd | Describes external interface(s) exposed by this MEC application. |
| appServiceRequired | Describes services a MEC application requires to run. |
| appServiceOptional | Describes services a MEC application may use if available. |

TABLE 5-continued

Attributes of enhanced AppD for dual application registration

| AppD attribute name | Description |
|---|---|
| appServiceProduced | Describes services a MEC application is able to produce |
| appFeatureRequired | Describes features a MEC application requires to run. |
| appFeatureOptional | Describes features a MEC application may use if available. |
| transportDependencies | Transports that this application requires to be provided by the platform. |
| appTrafficRule | Describes traffic rules the MEC application requires. |
| appDNSRule | Describes DNS rules the MEC application requires. |
| appLatency | Describes the maximum latency tolerated by the MEC application. |
| terminateAppInstanceOpConfig | Configuration parameters for the Terminate application instance operation. |
| changeAppInstanceStateOpConfig | Configuration parameters for the change application instance state operation. |
| userContextTransferCapability | Only if the application supports the user context transfer capability |
| appNetworkPolicy | Represents the application network policy of carrying the application traffic. |

Similarly, in 3GPP an enhanced EAS profile may be included in all messages related to the 3GPP registration (see Table 6):

TABLE 6

List of Information Elements in EAS Profile

| Information element | Status | Description |
|---|---|---|
| EASID | M | The identifier of the EAS |
| EAS Endpoint | M | Endpoint information (e.g., URI, FQDN, IP address) used to communicate with the EAS. This information maybe discovered by EEC and exposed to ACs so that ACs can establish contact with the EAS. |
| ACID(s) | O | Identifies the AC(s) that can be served by the EAS |
| EAS Provider Identifier | O | The identifier of the ASP that provides the EAS. |
| EAS Type | O | The category or type of EAS (e.g., V2X) |
| EAS description | O | Human-readable description of the EAS |
| EAS Schedule | O | The availability schedule of the EAS (e.g., time windows) |
| EAS Geographical Service Area | O | The geographical service area that the EAS serves. ACs in UEs that are located outside that area shall not be served. |
| EAS Topological Service Area | O | The EAS serves UEs that are connected to the Core Network from one of the cells included in this service area. ACs in UEs that are located outside this area shall not be served. See possible formats in Table 8.2.7-1. |
| EAS Service KPIs | O | Service characteristics provided by EAS, detailed in Table 8.2.5-1 |
| EAS service permission level | O | Level of service permissions e.g., trial, gold-class supported by the EAS |
| EAS Feature(s) | O | Service features e.g., single vs. multi-player gaming service supported by the EAS |

TABLE 6-continued

List of Information Elements in EAS Profile

| Information element | Status | Description |
|---|---|---|
| EAS Service continuity support | O | Indicates if the EAS supports service continuity or not. This IE also indicates which ACR scenarios are supported by the EAS. |
| List of EAS DNAI(s) | O | DNAI(s) associated with the EAS. This IE is used as Potential Locations of Applications in clause 5.6.7 of 3GPP TS 23.501 [2]. It is a subset of the DNAI(s) associated with the EDN where the EAS resides. |
| List of N6 Traffic Routing requirements | O | The N6 traffic routing information and/or routing profile ID corresponding to each EAS DNAI. |
| EAS Availability Reporting Period | O | The availability reporting period (i.e., heartbeat period) that indicates to the EES how often it needs to check the EAS's availability after a successful registration. |
| EAS dual deployment | O | Indicates if the EAS supports dual deployment with ETSI MEC |
| Secondary system | O | The identifier of the secondary deployment system (for the purpose of API consumption). |
| EAS Required Service APIs | O | A list of the Service APIs that are required by the EAS. Note: this list can also include service APIs coming from ETSI MEC system. |
| EAS Status | O | The status of the EAS (e.g., enabled, disabled, etc.) |

Component #2: MDD ESTABLISHMENT

A dual registration mechanism of the edge application in the EDD environment:

When the 3GPP EDGEAPP is the primary architecture, a mechanism in 3GPP (impacting TS 23.558) may be used to perform registration (indicating ETSI MEC as secondary).

When the ETSI MEC is the primary architecture, a mechanism in ETSI MEC (impacting GS MEC 011) may be used to perform registration (indicating 3GPP EDGEAPP as secondary).

One starting point is to assume that a developer should not be obliged to develop an edge application twice (i.e., an app for EDGEAPP compliance and another one for ETSI MEC compliance). This means that the same app (referred to herein as "edge app" to retain generality) should be able to behave as an MEC App for the MEC system and an EAS for the EDGEAPP system. Consuming APIs means first of all reaching out the respective platforms, which uses the URIs of both the assigned EES and MEC platform. As a consequence, alternative cases are defined for the app registration: a first case in which the developer wants to preferably register his/her app as an EAS, and possibly be able to also consume MEC platform APIs, and a second case in which the developer wants to preferably register his/her app as an MEC app, and possibly be able to also consume EES APIs. In both of these cases, a registration may be established (to the preferred platform/system) indicating the secondary system: the registration may include the URI of the assigned platforms (primary, which is mandatory and secondary, which is optional). A developer may indicate a preferred system for primary edge app registration driven by business, skills, or ownership reasons. The primary (main) registration may indicate which system is managing the edge app (e.g., the MEO for MEC Apps, and the 3GPP management system for the EAS). The secondary registration may allow API consumption from the secondary system. In other words, the primary system "owns" the edge app, while the edge app can benefit from the secondary system, since an increased set of functionalities can be exploited to the benefit of edge app operation.

Secondly, a default application transport to consume APIs (for BOTH platforms) may be RESTful (i.e., based on HTTP requests), at least as a starting point, and a universal language may be used to allow dual API consumption of the Application from both systems. Additional transports may already be available for ETSI MEC. Once the URIs are available, the application can consume APIs from both platforms.

As already indicated, in a co-existence scenario, an application can choose to register with either the EES or MEC platform as the preferred platform. Nevertheless, the current 3GPP and ETSI standards on application registration do not handle such a hybrid scenario. Hence, the indication of the secondary system to be considered may be included in the registration information. This optional information may be included in the request and response APIs, to respectively manage dual registration when the primary system is 3GPP (case A) and or ETSI (case B), as indicated in more detail below:

Case A—3GPP System as the Primary System

Figure 5:
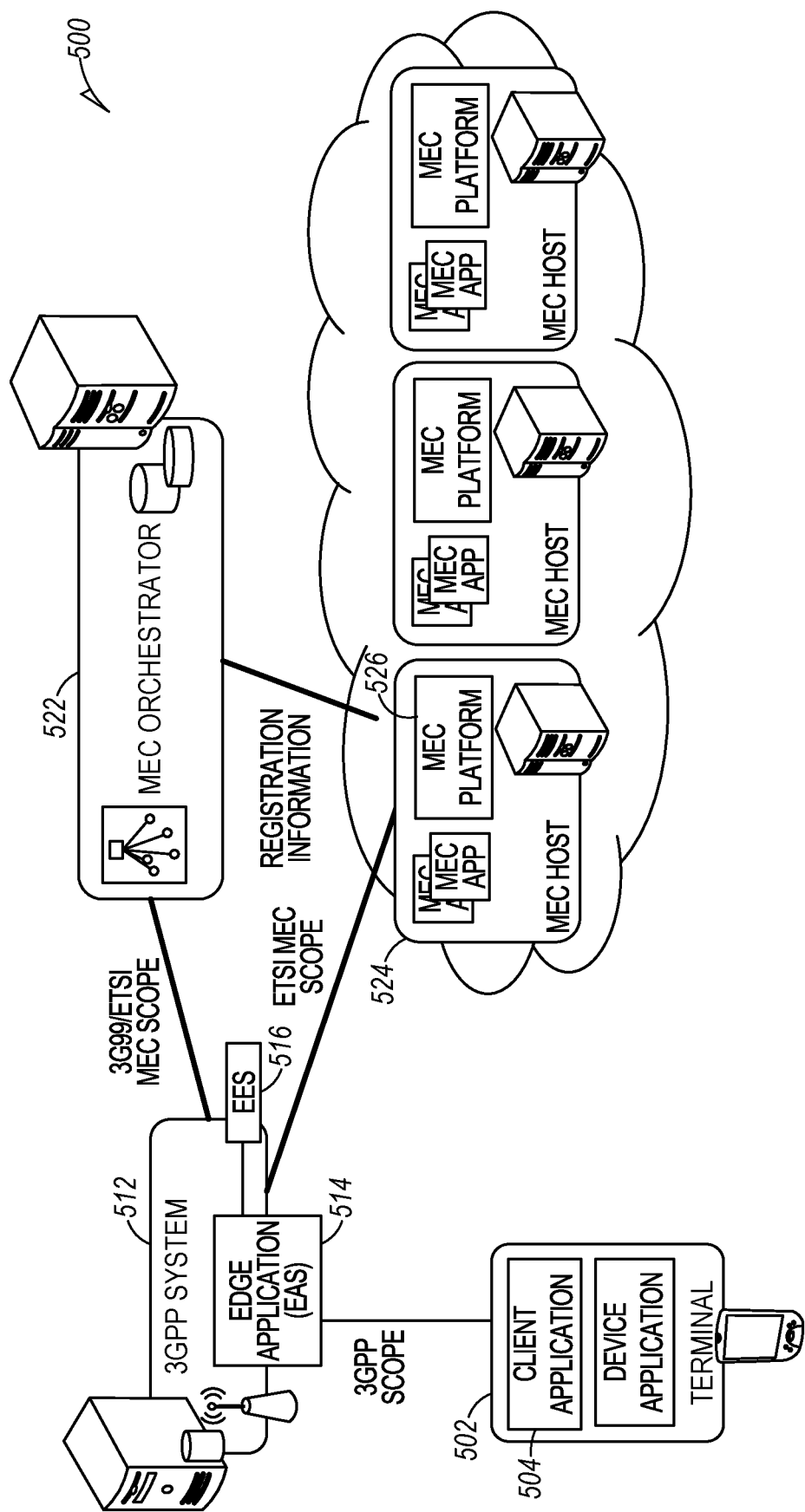
FIG. 5 illustrates MEC dual deployment with 3GPP as the primary system, according to an example.

FIG. 5 illustrates MEC dual deployment with 3GPP as the primary system, according to an example embodiment. FIG. 5 shows a dual deployment 500 with the 3GPP system 512 as primary system, in which the client application of the UE 502 is communicating with the EAS 514. The EAS 514 is connected to the EES 516 as the preferred platform and also consuming APIs from the ETSI MEC platform 526 in the MEC host 524 (controlled by the MEC orchestrator 522). In order to realize this dual deployment, led by the 3GPP system 512, the application 504 is registered as an EAS 514 according to the EDGEAPP architecture, and also indicates ETSI MEC 524 as the secondary system. After the dual registration, the edge application 504 may be able to consume an API from the 3GPP system 512 (as the primary system) and then with ETSI MEC 524 (as the secondary system) via the respective standard interfaces.

This dual registration is then realized in the 3GPP system 512 by using an enhanced EAS profile that included in all messages related to the 3GPP registration as provided in Table 7:

TABLE 7

List of Information Elements in EAS Profile allowing dual registration

| Request/Response Type | Information element | Status | Description |
| --- | --- | --- | --- |
| EAS Registration Request | EAS Profile | M | EAS Profile as described in Table 2 |
| | EAS Primary | M | Primary Registration platform (EES) |
| | Dual Deployment | O | Secondary system (default: ETSI MEC) |
| | Security credentials | M | Security credentials of the EAS. |
| | Proposed expiration time | O | Proposed expiration time for the registration |
| EAS Registration Response | Successful response | O | Indicates that the registration request was successful. |
| | > Primary Registration Platform | O | EES identifier |
| | > Secondary Registration Platform | | MEC Platform identifier (default) |

TABLE 7-continued

List of Information Elements in EAS Profile allowing dual registration

| Request/Response Type | Information element | Status | Description |
| --- | --- | --- | --- |
| | > Registration ID | O | App Identifier of the dual registration to both EES and MEC Platform |
| | > Expiration time | O | Indicates the expiration time of the registration. To maintain an active registration status, a registration update is required before the expiration time. If the Expiration time IE is not included, it indicates that the registration never expires. |
| | Failure response | O | Indicates that the registration request failed. |
| | > Cause | O | Indicates the cause of registration request failure |

Figure 6:
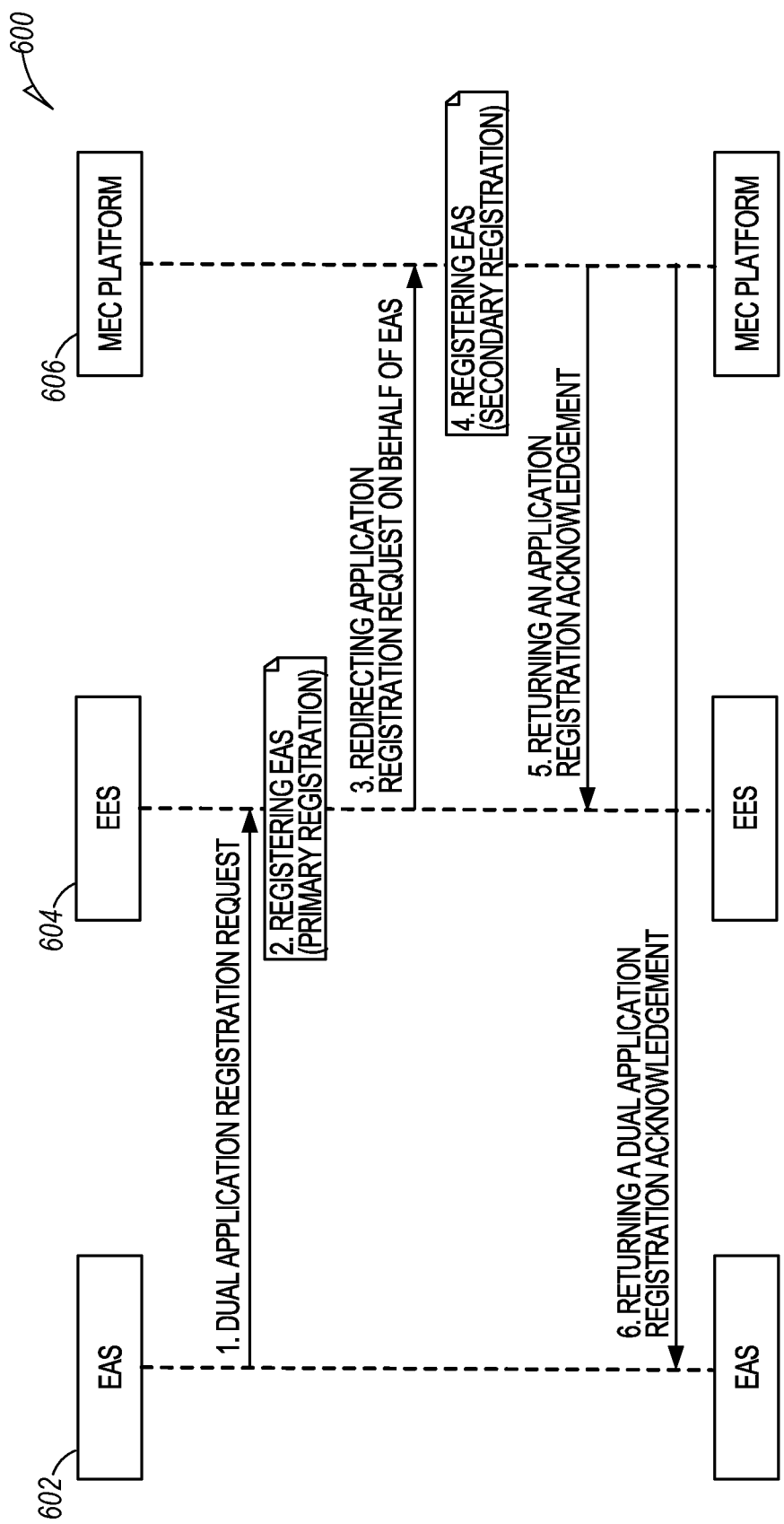
FIG. 6 illustrates a flow diagram for dual registration with 3GPP as the primary system, according to an example.

FIG. 6 illustrates a flow diagram for dual registration with the 3GPP system as the primary system, according to an example embodiment. On receiving the request from the EAS 602 at operation 1, the 3GPP system can identify not only the EES 604 (and send the dual application registration request to the EES 604), but also the desired target MEC platform 606. Here, the secondary system is ETSI MEC, thus the target MEC platform identifier may also be sent to the EAS 602. The EES registers the EAS 602 at operation 2 and may redirect the registration request to the MEC platform 606 on behalf of the EAS 602 at operation 3. The MEC platform 606 may, in turn, register the EAS at operation 4 and return the registration status from the MEC platform 606 to the EAS 602 accordingly at operation 5. The EES 604 then returns an acknowledgment of the registration status of both platforms to the EAS 602 at operation 6.

Case B—MEC System as the Primary System

Figure 7:
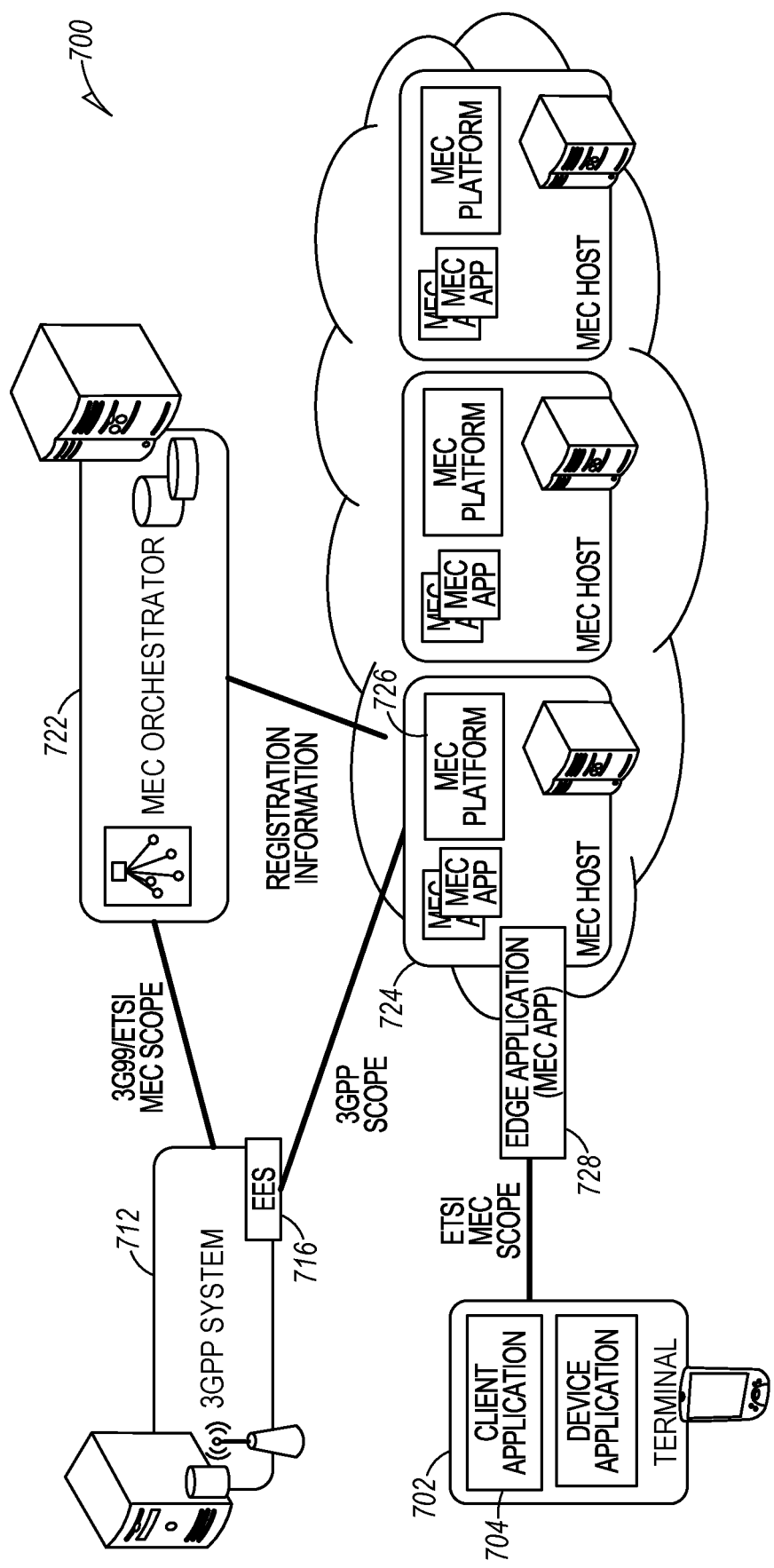
FIG. 7 illustrates MEC dual deployment with ETSI as the primary system, according to an example.

FIG. 7 illustrates MEC dual deployment with ETSI as the primary system, according to an example embodiment. FIG. 7 shows a dual deployment 700, with the ETSI MEC 724 as primary system. In this case, the client application 704 of the UE 702 is communicating with the MEC App 728, which is connected to the MEC Platform 726 as preferred platform, and also consuming APIs from the EES 716. In order to realize this dual deployment, led by the ETSI MEC management system (orchestrator) 722, the client application 704 may be registered as an MEC App according to the ETSI MEC standard, and also indicate the 3GPP EDGEAPP as secondary system. After the dual registration, the edge application may be able to consume an API from the ETSI MEC (as the primary system) and then with 3GPP system 712 (as the secondary system) via the respective standard interfaces.

In order to realize this dual deployment, the MEC Application may be registered with both systems. In embodiments in which the ETSI MEC system is the primary system, the application is first registered with the ETSI MEC (as the primary system) and then with 3GPP (as the secondary system) via the respective standard interfaces. This dual registration may then be realized in the ETSI MEC by using enhanced data types that included in all messages related to the MEC App registration.

Figure 8:
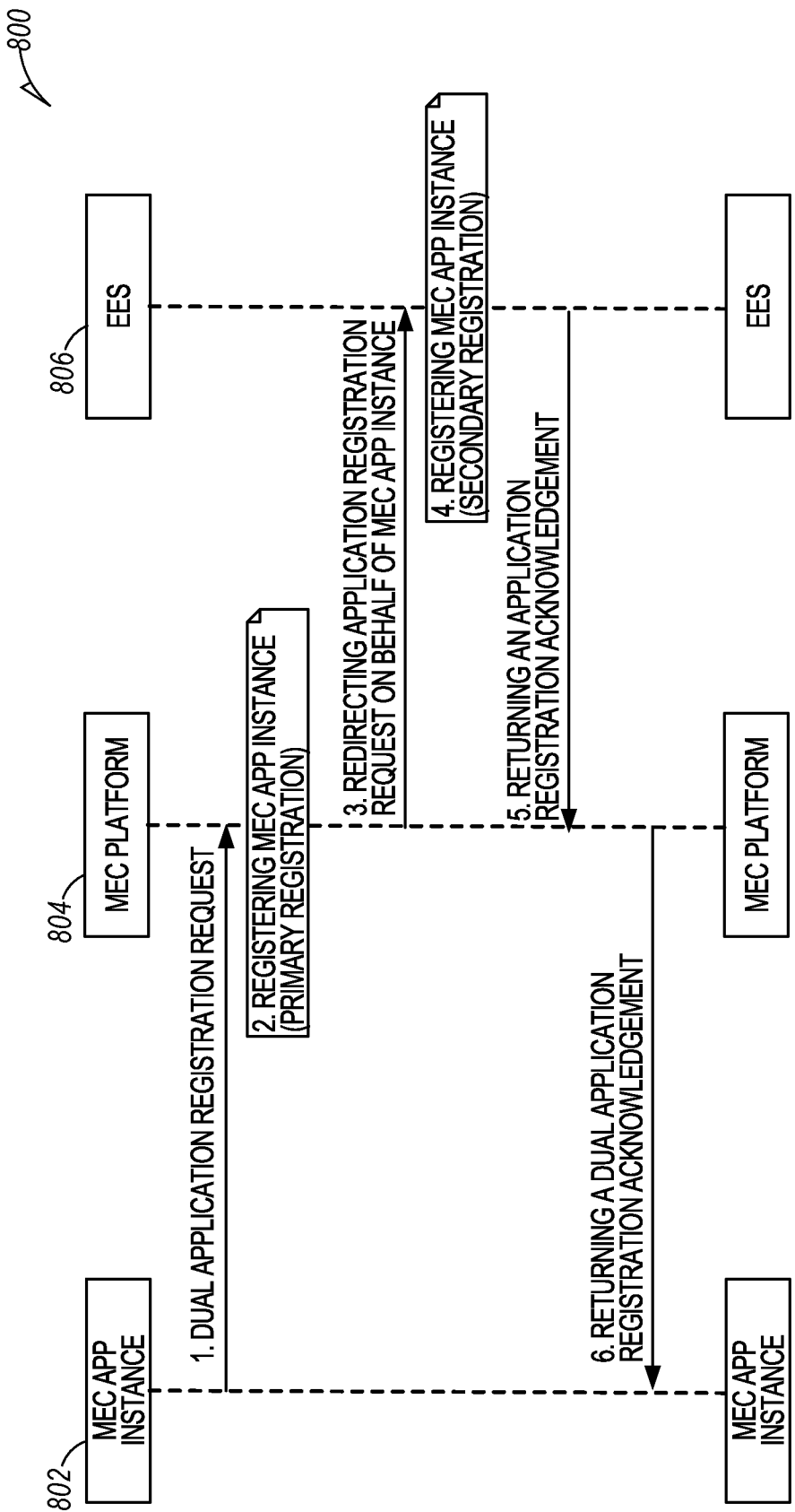
FIG. 8 illustrates a flow diagram for dual registration with ETSI as the primary system, according to an example.

FIG. 8 illustrates a flow diagram for dual registration with ETSI as the primary system, according to an example embodiment. On receiving the request from the MEC App instance 802 at operation 1, the ETSI MEC system can identify not only the MEC platform 804 (and send the dual application registration request to the MEC platform 804) but also the desired target EES platform 806. In this case, the secondary system is 3GPP, thus the target EES platform identifier is also sent to the MEC app. The MEC platform 804 registers the MEC App instance 802 at operation 2 and may redirect the registration request to the EES 806 on behalf of the MEC App instance 802 at operation 3. The EES 806 may, in turn, register the MEC App instance 802 at operation 4 and return the registration status to the MEC platform 804 accordingly at operation 5. The MEC platform 804 then returns an acknowledgment of the registration status of both platforms to the MEC App instance 802 at operation 6.

Component #3: MDD UPDATE

Figure 9:
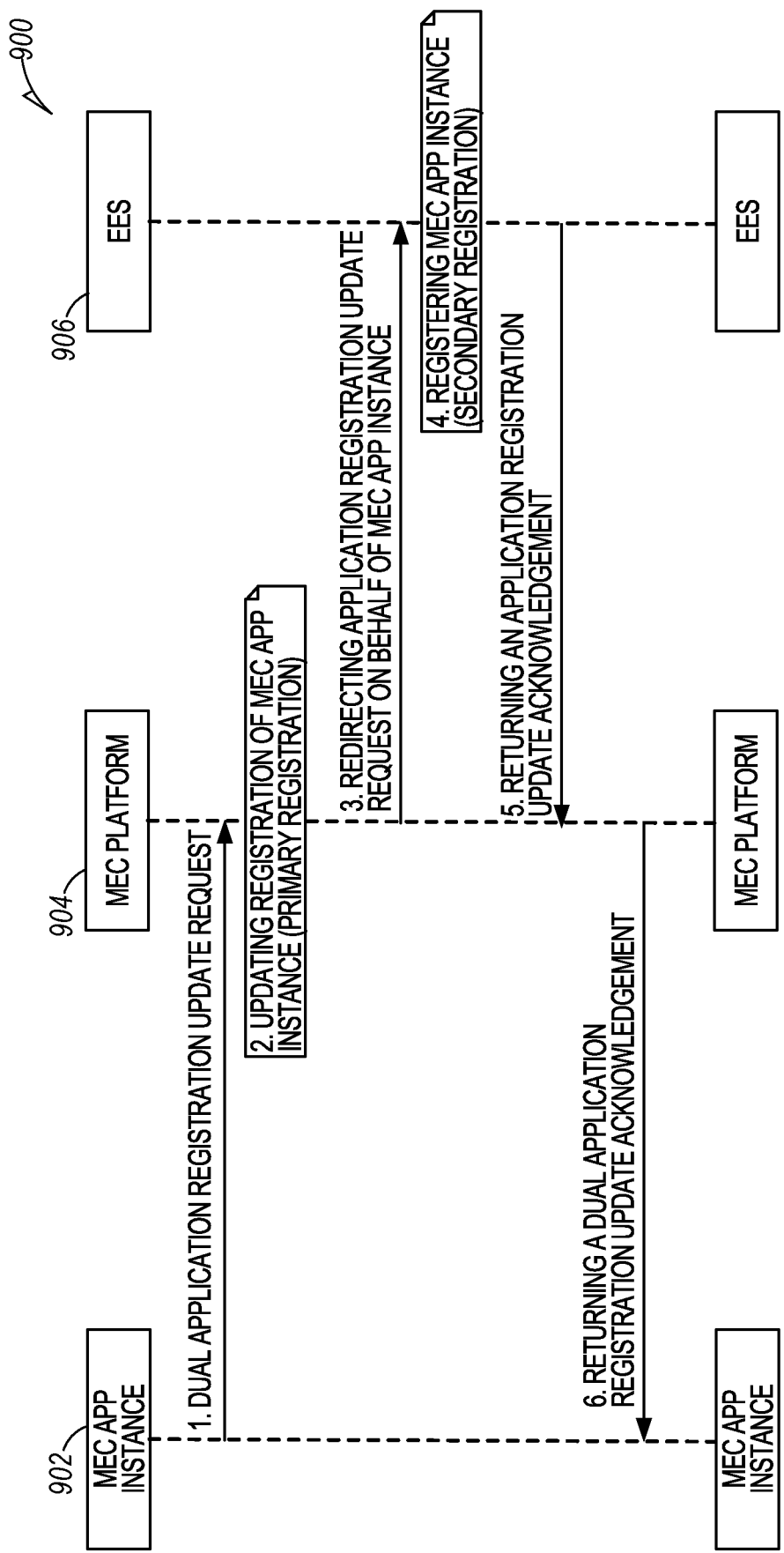
FIG. 9 illustrates a flow diagram for dual registration update with ETSI as the primary system, according to an example.

FIG. 9 illustrates a flow diagram for dual registration update with ETSI as the primary system, according to an example embodiment. An analogous registration update process (similar to registration) may exist for both of the above cases, although FIG. 9 only shows the update process 900 in which the MEC platform is the primary platform. After a dual edge app registration has been performed following the operations of the previous component (MDD establishment), there may be a change in requirements or information relating to the running edge app instance. In this case, the edge app instance may use an application registration update procedure to update the MEC Platform and EES to which the edge app instance is registered.

Specifically, on receiving the update request from the MEC App instance 902 at operation 1, the ETSI MEC system can identify not only the MEC platform 904 (and send the dual application registration update request to the MEC platform 904) but also the desired target EES platform 906. The MEC platform 904 updates the registration of the MEC App instance 902 at operation 2 and may redirect the update request to the EES 906 on behalf of the MEC App instance 902 at operation 3. The EES 906 may, in turn, update the registration of the MEC App instance 902 at operation 4 and return the update status to the MEC platform 904 in an acknowledgment accordingly at operation 5. The MEC platform 904 then returns an acknowledgment of the update status of both platforms to the MEC App instance 902 at operation 6.

The information element for the 3GPP case is provided below. In some cases, registration to only one of the two system entities (MEC Platform/EES) may be updated. As an example, the list of services from the secondary system may be enhanced.

TABLE 8

3GPP Case

| Request/Response Type | Information element | Status | Description |
|---|---|---|---|
| EAS Registration update Request | Registration ID | O | App Identifier of the dual registration to both EES and MEC Platform |
| | > Primary Registration Platform | O | EES identifier |
| | > Secondary Registration Platform | O | MEC Platform identifier (default) |
| | Security credentials | M | Security credentials of the EAS |

TABLE 8-continued

3GPP Case

| Request/Response Type | Information element | Status | Description |
|---|---|---|---|
| | Updated EAS Profile | O | EAS Profile as described in Table 8.2.4-1 with updated information. Included only if there is an update in EAS information. |
| | Proposed expiration time | O | Proposed expiration time for the registration |
| EAS Registration Update Response | Successful response | O | Indicates that the registration update request was successful. |
| | > Expiration time | O | Indicates the expiration time of the updated registration. To maintain an active registration status, a registration update is required before the expiration time. If the Expiration time IE is not included, it indicates that the updated registration never expires. |
| | Failure response | O | Indicates that the registration update request failed. |
| | > Cause | O | Indicates the cause of registration update request failure |

Component #4: CLOSING

An analogous deregistration process (similar to registration) exists with both of the above cases. After a dual edge app registration has been performed following the operations of the previous component (MDD establishment), the edge app instance may choose to remove the edge app instance information from the MEC Platform and/or EES to which the edge app instance is registered. In this case, the edge app instance may use an application de-registration procedure for information removal. The information element for the 3GPP case is provided below. Different edge app de-registration (closing) variants may exist: the edge app developer chooses to de-register from the MEC Platform/EES of only the secondary system or from both the MEC Platform and EES of both of the systems.

Figure 10:
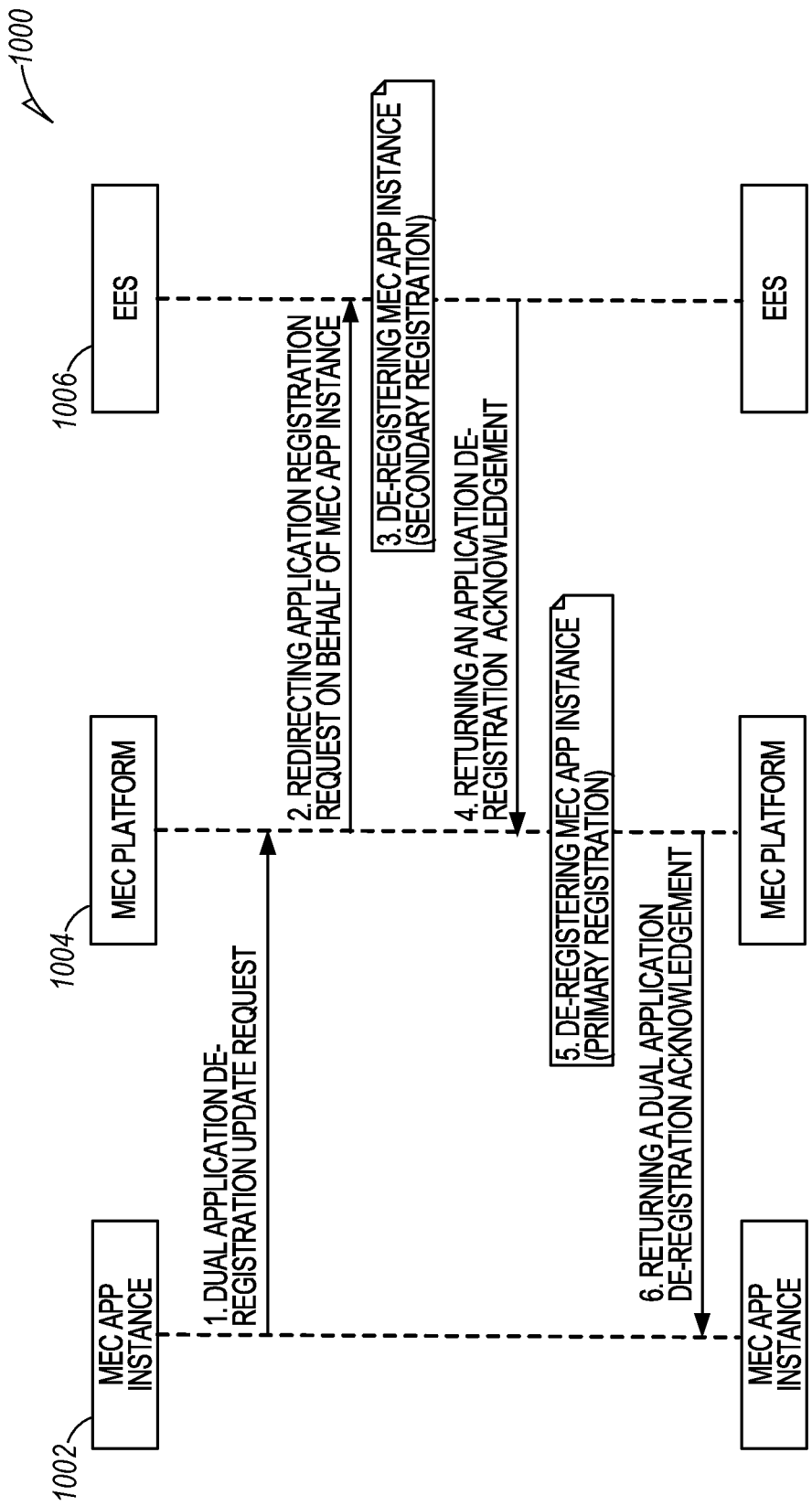
FIG. 10 illustrates a flow diagram for dual de-registration with ETSI as the primary system, according to an example.

FIG. 10 illustrates a flow diagram for dual de-registration with ETSI as the primary system, according to an example embodiment. FIG. 10 only shows the de-registration process 1000 in which the MEC platform is the primary platform. Specifically, on receiving the de-registration request from the MEC App instance 1002 at operation 1, the ETSI MEC system can identify not only the MEC platform 1004 (and send the dual application registration de-registration request to the MEC platform 1004) but also the desired target EES platform 1006. The MEC platform 1004 redirects the de-registration request to the EES 1006 on behalf of the MEC App instance 1002 at operation 2. The EES 1006 may, in turn, de-register the registration of the MEC App instance 1002 at operation 3 and return the de-registration status to the MEC platform 1004 in an acknowledgment accordingly at operation 4. The MEC platform 1004 then de-register the registration of the MEC App instance 1002 at operation 5 and returns an acknowledgment of the de-registration status of both platforms to the MEC App instance 1002 at operation 6.

TABLE 9

3GPP Case

| Request/Response Type | Information element | Status | Description |
|---|---|---|---|
| EAS de-registration Request | Registration ID | O | App Identifier of the dual registration to both EES and MEC Platform |
| | > Primary Registration Platform | O | EES identifier |
| | > Secondary Registration Platform | O | MEC Platform identifier (default |
| | Security credentials | M | Security credentials of the EAS |
| EAS de-registration Response | Successful response | O | Indicates that the de-registration request was successful. |
| | Failure response | O | Indicates that the de-registration request failed. |
| | > Cause | O | Indicates the cause of de-registration request failure |

Separated App Registration Procedures

In this embodiment, separated registrations may be established from the application developer side. In this case, the application may first send a primary registration request to the preferred system (with legacy parameters), and then separately send a secondary registration request to the secondary system. The secondary registration request may specify that the request is a secondary application registration and with a "simplified management" (i.e., only the primary system is managing the LCM of the application, while the secondary system is just for API consumption).

After the registration requests are received (and perhaps acknowledged), the systems may subsequently synch up properly, and everything works similarly to the first embodiment. While the primary registration request may be a traditional registration request, with legacy parameters, the primary system may not know that there is a secondary system. Instead, the secondary application registration request (to the secondary system) may use a proper field added in the data structures, i.e., to identify the latter request as for a secondary registration.

In the following there are the data structures supporting this "secondary registration", both from ETSI and 3GPP sides, respectively.

TABLE 10

Attributes of proposed enhanced AppD for dual and secondary application registration

| AppD attribute name | Description |
|---|---|
| appDId | Identifier of this MEC application descriptor. |
| appName | Name to identify the MEC application. |
| appProvider | Provider of the application and of the AppD. |
| appSoftVersion | Identifies the version of software of the MEC application. |
| appDVersion | Identifies the version of the application descriptor. |
| mecVersion | Identifies version(s) of MEC system compatible with the MEC App |
| edgeAppVersion | Identifies version(s) of EDGEAPP system compatible with the MEC App - Note: the field is optional, as it depends on the registration type (in case of "single" registration, this field is not present) |
| registrationType | Type of MEC application registration (single MEC or dual ETSI MEC/3GPP EDGEAPP or MEC as secondary registration) - mandatory field |
| appInfoName | Human readable name for the MEC application. |
| appDescription | Human readable description of the MEC application. |
| virtualComputeDescriptor | Describes CPU, Memory and acceleration requirements of the virtual machine. |
| swImageDescriptor | Describes the software image which is directly loaded on the VM |
| virtualStorageDescriptor | descriptors of virtual storage resources to be used by the MEC application. |
| appExtCpd | Describes external interface(s) exposed by this MEC application. |
| appServiceRequired | Describes services a MEC application requires to run. |
| appServiceOptional | Describes services a MEC application may use if available. |
| appServiceProduced | Describes services a MEC application is able to produce |
| appFeatureRequired | Describes features a MEC application requires to run. |
| appFeatureOptional | Describes features a MEC application may use if available. |
| transportDependencies | Transports that this application requires to be provided by the platform. |
| appTrafficRule | Describes traffic rules the MEC application requires. |
| appDNSRule | Describes DNS rules the MEC application requires. |
| appLatency | Describes the maximum latency tolerated by the MEC application. |
| terminateAppInstanceOpConfig | Configuration parameters for the Terminate application instance operation. |
| changeAppInstanceStateOpConfig | Configuration parameters for the change application instance state operation. |
| userContextTransferCapability | Only if the application supports the user context transfer capability |
| appNetworkPolicy | Represents the application network policy of carrying the application traffic. |

Similarly, an enhanced EAS profile in the 3GPP system may be included in all messages related to the 3GPP registration (see Table 11 below). supporting both dual and secondary registration.

TABLE 11

List of Information Elements in EAS Profile, supporting dual and secondary registration

| Information element | Status | Description |
|---|---|---|
| EASID | M | The identifier of the EAS |
| EAS Endpoint | M | Endpoint information (e.g., URI, FQDN, IP address) used to communicate with the EAS. This information maybe discovered by EEC and exposed to ACs so that ACs can establish contact with the EAS. |
| ACID(s) | O | Identifies the AC(s) that can be served by the EAS |
| EAS Provider Identifier | O | The identifier of the ASP that provides the EAS. |
| EAS Type | O | The category or type of EAS (e.g. V2X) |
| EAS description | O | Human-readable description of the EAS |
| EAS Schedule | O | The availability schedule of the EAS (e.g., time windows) |
| EAS Geographical Service Area | O | The geographical service area that the EAS serves. ACs in UEs that are located outside that area shall not be served. |
| EAS Topological Service Area | O | The EAS serves UEs that are connected to the Core Network from one of the cells included in this service area. ACs in UEs that are located outside this area shall not be served. See possible formats in Table 8.2.7-1. |
| EAS Service KPIs | O | Service characteristics provided by EAS, detailed in Table 8.2.5-1 |
| EAS service permission level | O | Level of service permissions e.g., trial, gold-class supported by the EAS |
| EAS Feature(s) | O | Service features e.g., single vs. multi-player gaming service supported by the EAS |
| EAS Service continuity support | O | Indicates if the EAS supports service continuity or not. This IE also indicates which ACR scenarios are supported by the EAS. |
| List of EAS DNAI(s) | O | DNAI(s) associated with the EAS. This IE is used as Potential Locations of Applications in clause 5.6.7 of 3GPP TS 23.501 [2]. It is a subset of the DNAI(s) associated with the EDN where the EAS resides. |
| List of N6 Traffic Routing requirements | O | The N6 traffic routing information and/or routing profile ID corresponding to each EAS DNAI. |
| EAS Availability Reporting Period | O | The availability reporting period (i.e., heartbeat period) that indicates to the EES how often it needs to check the EAS's availability after a successful registration. |
| EAS dual deployment | O | Indicates if the EAS supports dual deployment with ETSI MEC |
| Secondary system | O | The identifier of the secondary deployment system (for the purpose of API consumption). Note: if EES is selected, then 3GPP is the secondary system. |
| EAS Required Service APIs | O | A list of the Service APIs that are required by the EAS. Note: this list can also include service APIs coming from ETSI MEC system. |
| EAS Status | O | The status of the EAS (e.g., enabled, disabled, etc.) |

Exemplary flow diagrams of the separated App Registration procedures for both cases of primary system are described below.

3GPP system as the primary system

In a first embodiment, the EAS may first register with the BES as the primary system, and then register with the ETSI MEC platform as the secondary system. In some embodiments, only the primary system may manage the LCM of the EAS, while the secondary system may be used for API consumption.

Figure 11:
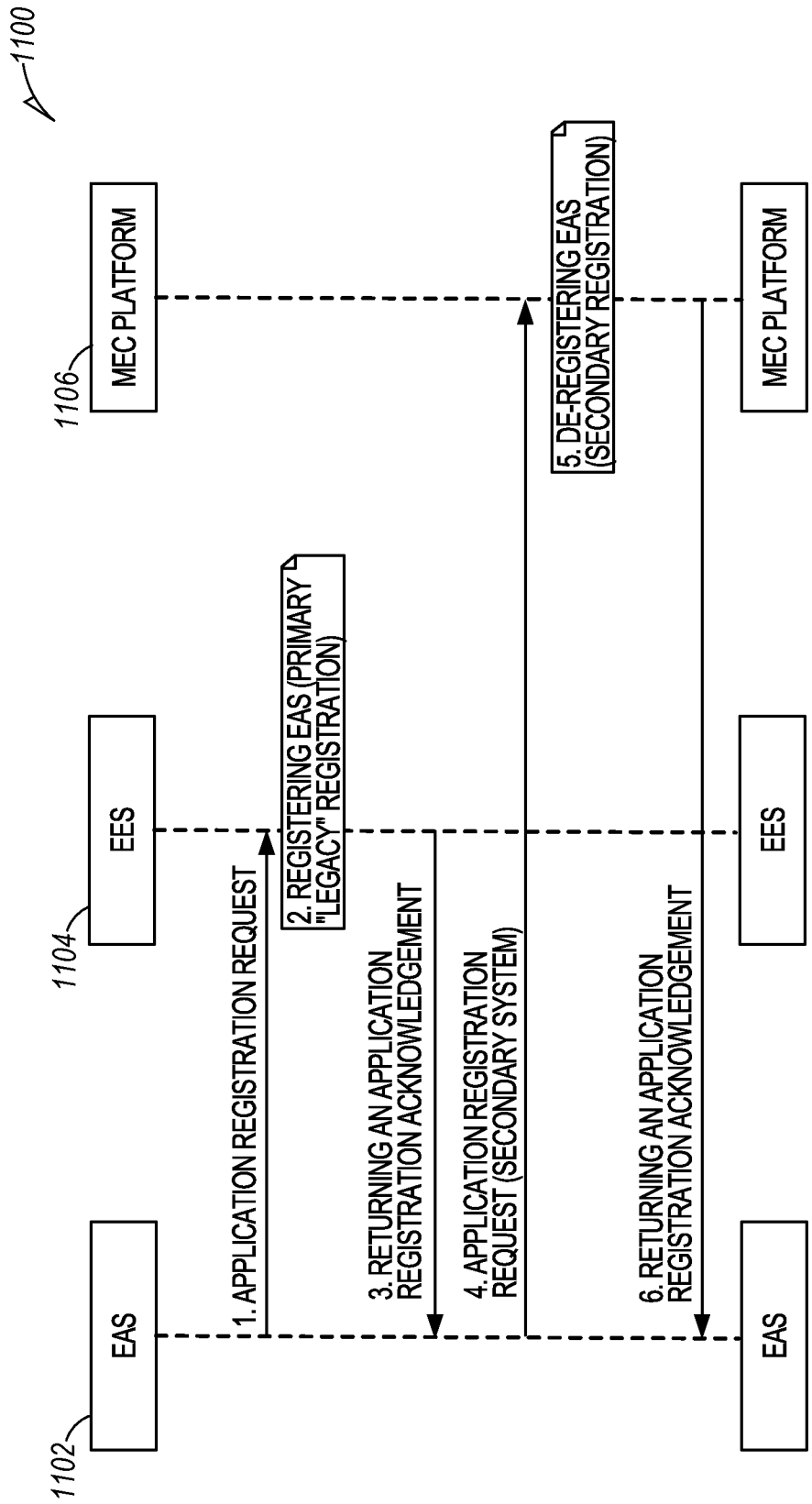
FIG. 11 illustrates a flow diagram for EAS app registration with 3GPP as the primary system, according to an example.

FIG. 11 illustrates a flow diagram for EAS app registration with 3GPP as the primary system, according to an example embodiment. The app registration process 1100 in FIG. 11 shows the 3GPP platform is the primary platform. Specifically, on receiving the registration request from the EAS 1102 at operation 1, the 3GPP platform can identify the desired target EES 1104 and send the application registration request to the EES 1104. The EES 1104 registers the EAS 1102 at operation 2 and may return the registration status to the EAS 1102 in an acknowledgment accordingly at operation 3. The EAS 1102 may at operation 4 then send another application registration request to the MEC platform 1106, which may indicate the secondary status of the MEC platform 1106. The MEC platform 1106 registers the EAS 1102 at operation 5 and may return the registration status to the EAS 1102 in an acknowledgment accordingly at operation 6.

MEC System as the Primary System

In a first embodiment, the MEC App may first register with the ETSI MEC platform as the primary system, and then may register with the EES as the secondary system. In some embodiments, only the primary system may manage the LCM of the MEC App, while the secondary system may be used for API consumption.

Figure 12:
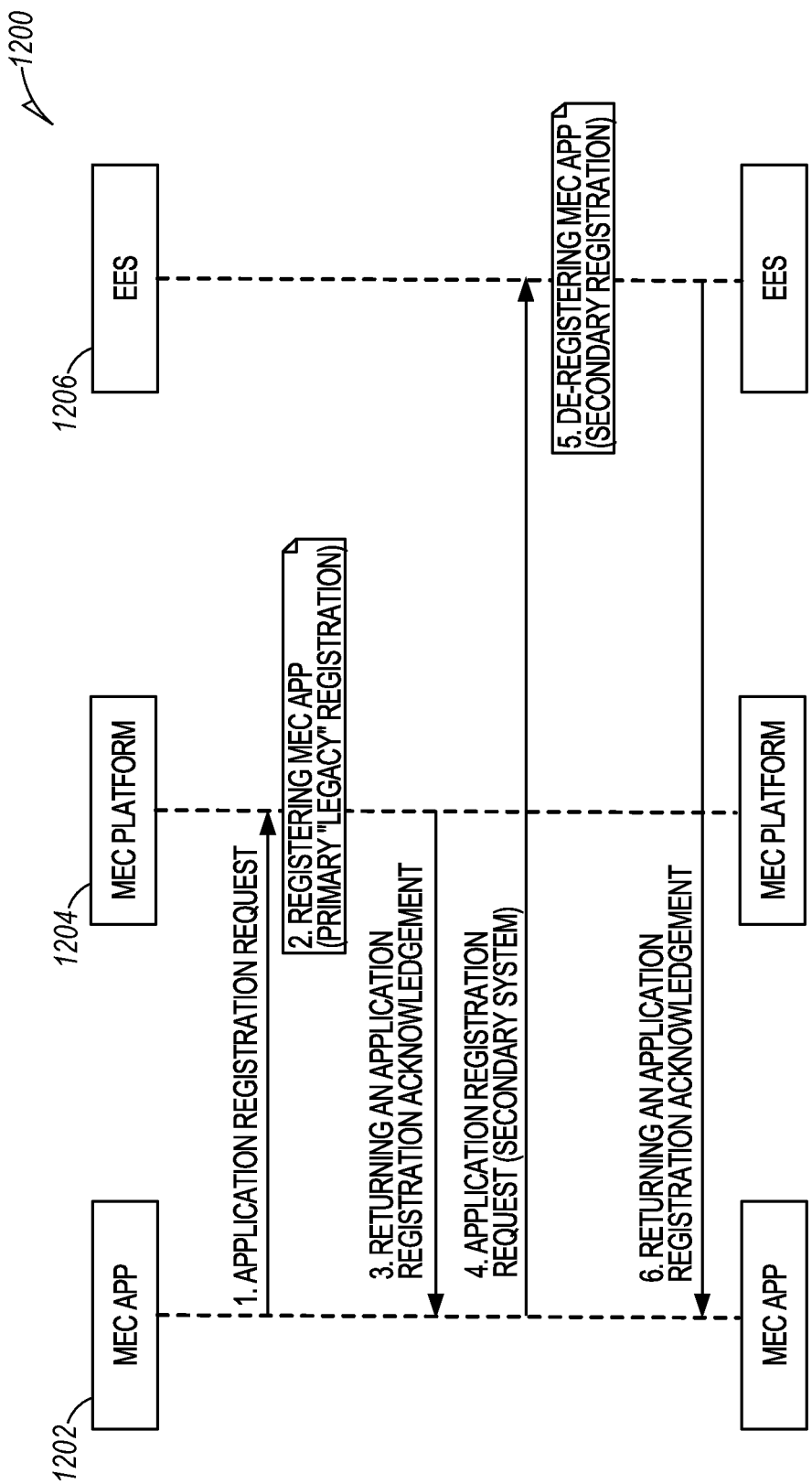
FIG. 12 illustrates a flow diagram for MEC app registration with ETSI as the primary system, according to an example.

FIG. 12 illustrates a flow diagram for MEC app registration with ETSI as the primary system, according to an example embodiment. The app registration process 1200 in FIG. 12 shows the MEC system is the primary platform. Specifically, the MEC app 1202 may send the application registration request to the MEC platform 1204. The MEC platform 1204 registers the MEC app 1202 at operation 2 and may return the registration status to the MEC app 1202 in an acknowledgment accordingly at operation 3. The MEC app 1202 may at operation 4 then send another application registration request to the EES 1206, which may indicate the secondary status of the EES 1206. The EES 1206 registers the MEC app 1202 at operation 5 and may return the registration status to the MEC app 1202 in an acknowledgment accordingly at operation 6.

Note that the above embodiments describe a dual MEC/3GPP system. In other embodiments, similar functionality may be extended to a trinary (or more) system in which initialization and LCM may be similar to the above binary system. That is, in one embodiment, the dual platform interactions may be updated if a third platform is added, with the updated interactions (e.g., pairings) between the platforms determined and subsequently stored in one or more of the platforms (e.g., MEC/3GPP/3GPP2 for older systems). Registration of an edge application may be forwarded (for the case of a tertiary system) from the primary platform to the secondary platform and tertiary platform, or daisy-chained from the primary platform to the secondary platform and then from the secondary platform to the tertiary platform. Similar functionality may be used for updates and de-registration, as described above, and modified as described herein.

Implementation in Edge Computing Scenarios

It will be understood that the present techniques associated with MEC API interoperability support for multiple message brokers may be integrated with many aspects of edge computing strategies and deployments. Edge computing, at a general level, refers to the transition of compute and storage resources closer to endpoint devices (e.g., consumer computing devices, user equipment, etc.) to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

In the context of satellite communication networks, edge computing operations may occur, as discussed above, by moving workloads onto compute equipment at satellite vehicles: using satellite connections to offer backup or (redundant) links and connections to lower-latency services: coordinating workload processing operations at terrestrial access points or base stations: providing data and content via satellite networks: and the like. Thus, many of the same edge computing scenarios that are described below for mobile networks and mobile client devices are equally applicable when using a non-terrestrial network.

Figure 13:
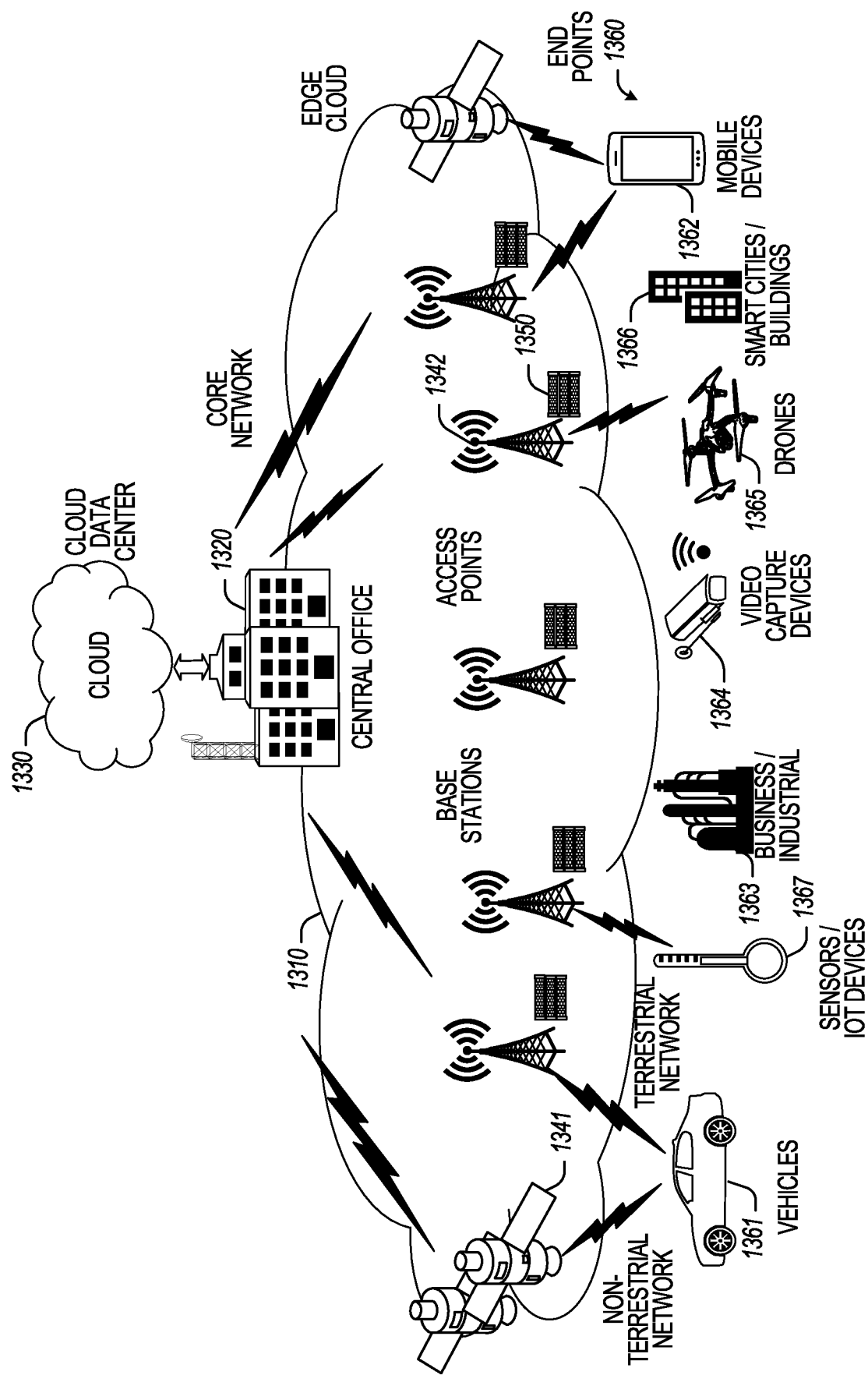
FIG. 13 illustrates an overview of an edge cloud configuration for edge computing, according to an example.

FIG. 13 is a block diagram 1300 showing an overview of a configuration for edge computing, which includes a layer of processing referenced in many of the current examples as an "edge cloud". This network topology, which may include several conventional networking layers (including those not shown herein), may be extended through the use of the satellite and non-terrestrial network communication arrangements discussed herein.

As shown, the edge cloud 1310 is co-located at an edge location, such as a satellite vehicle 1341, a base station 1342, a local processing hub 1350, or a central office 1320, and thus may include multiple entities, devices, and equipment instances. The edge cloud 1310 is located much closer to the endpoint (consumer and producer) data sources 1360 (e.g., autonomous vehicles 1361, user equipment 1362, business and industrial equipment 1363, video capture devices 1364, drones 1365, smart cities, and building devices 1366, sensors and IoT devices 1367, etc.) than the cloud data center 1330. Compute, memory, and storage resources which are offered at the edges in the edge cloud 1310 are critical to providing ultra-low or improved latency response times for services and functions used by the endpoint data sources 1360 as well as reduce network backhaul traffic from the edge cloud 1310 toward cloud data center 1330 thus improving energy consumption and overall network usages among other benefits.

Compute, memory, and storage are scarce resources, and generally decrease depending on the edge location (e.g., fewer processing resources being available at consumer end point devices than at a base station or a central office). However, the closer that the edge location is to the endpoint (e.g., UEs), the more that space and power are constrained. Thus, edge computing, as a general design principle, attempts to minimize the number of resources needed for network services, through the distribution of more resources that are located closer both geographically and in-network access time. In the scenario of the non-terrestrial network, distance and latency may be far from the satellite, but data processing may be better accomplished at edge computing hardware in the satellite vehicle rather than requiring additional data connections and network backhaul to and from the cloud.

In an example, an edge cloud architecture extends beyond typical deployment limitations to address restrictions that some network operators or service providers may have in their infrastructures. These include a variety of configurations based on the edge location (because edges at a base station level, for instance, may have more constrained performance): configurations based on the type of compute, memory, storage, fabric, acceleration, or like resources available to edge locations, tiers of locations, or groups of locations: the service, security, and management and orchestration capabilities: and related objectives to achieve usability and performance of end services.

Edge computing is a developing paradigm where computing is performed at or closer to the "edge" of a network, typically through the use of a compute platform implemented at base stations, gateways, network routers, or other devices which are much closer to the end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Likewise, within edge computing deployments, there may be scenarios in services in which the compute resource will be "moved" to the data, as well as scenarios in which the data will be "moved" to the compute resource. Or as an example, a base station (or satellite vehicle) compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

In contrast to the network architecture of FIG. 13, traditional endpoint (e.g., UE, vehicle-to-vehicle (V2V), vehicle-to-everything (V2X), etc.) applications are reliant on local devices or remote cloud data storage and processing to exchange and coordinate information. A cloud data arrangement allows for long-term data collection and storage but is not optimal for highly time-varying data, such as a collision, traffic light change, etc., and may fail in attempting to meet latency challenges. The extension of satellite capabilities within an edge computing network provides even more possible permutations of managing compute, data, bandwidth, resources, service levels, and the like.

Depending on the real-time requirements in a communications context, a hierarchical structure of data processing and storage nodes may be defined in an edge computing deployment involving satellite connectivity. For example, such a deployment may include local ultra-low-latency processing, regional storage, and processing as well as remote cloud data-center-based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally to meet latency requirements. Higher layer data such as Application Layer data is typically less time-critical and may be stored and processed in a remote cloud data center.

Figure 14:
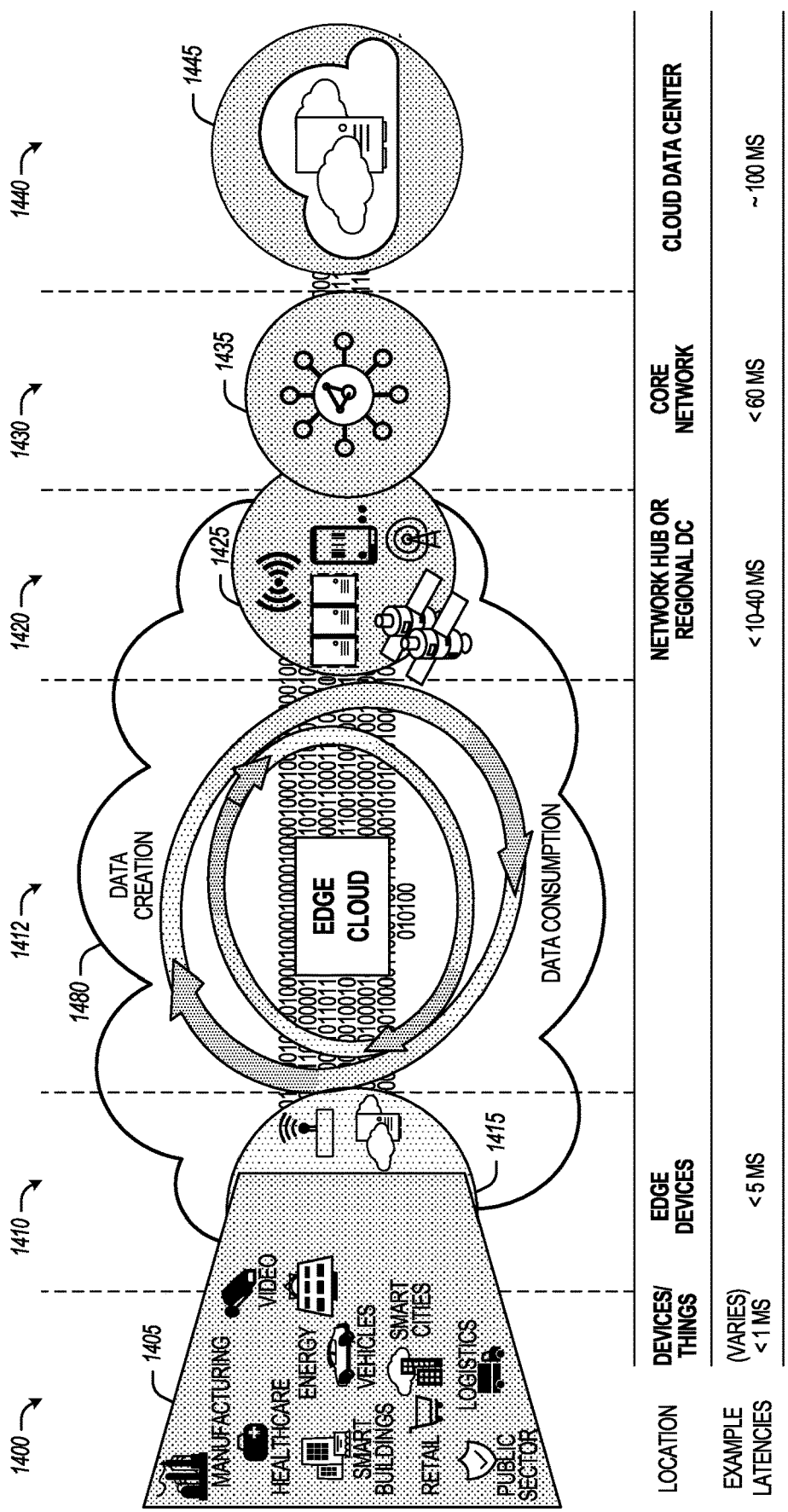
FIG. 14 illustrates an overview of layers of distributed compute deployed among an edge computing system, according to an example.

FIG. 14 illustrates operational layers among endpoints, an edge cloud, and cloud computing environments. Specifically, FIG. 14 depicts examples of computational use cases 1405, utilizing the edge cloud 1480 among multiple illustrative layers of network computing. The layers begin at an endpoint (devices and things) layer 1400, which accesses the edge cloud 1480 to conduct data creation, analysis, and data consumption activities. The edge cloud 1480 may span multiple network layers, such as an edge devices layer 1410 having gateways, on-premise servers, or network equipment (nodes 1415) located in physically proximate edge systems: a network access layer 1420, encompassing base stations, radio processing units, network hubs, regional data centers (DC), or local network equipment (equipment 1425): and any equipment, devices, or nodes located therebetween (in layer 1412, not illustrated in detail). The network communications within the edge cloud 1480 and among the various layers may occur via any number of wired or wireless mediums, including via connectivity architectures and technologies not depicted.

Examples of latency with terrestrial networks, resulting from network communication distance and processing time constraints, may range from less than a millisecond (ms) when among the endpoint layer 1400, under 5 ms at the edge devices layer 1410, to even between 10 to 40 ms when communicating with nodes at the network access layer 1420. (Variation to these latencies is expected with the use of non-terrestrial networks). Beyond the edge cloud are core network 1430 and cloud data center 1440 layers, each with increasing latency (e.g., between 50-60 ms at the core network layer 1430, to 100 or more ms at the cloud data center layer). As a result, operations at a core network data center 1435 or a cloud data center 1445, with latencies of at least 50 to 100 ms or more, will not be able to accomplish many time-critical functions of the use cases 1405. Each of these latency values is provided for purposes of illustration and contrast: it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1435 or a cloud data center 1445, a central office or content data network may be considered as being located within a "near edge" layer ("near" to the cloud, having high latency values when communicating with the devices and endpoints of the use cases 1405), whereas an access point, base station, on-premise server, or network gateway may be considered as located within a "far edge" layer ("far" from the cloud, having low latency values when communicating with the devices and endpoints of the use cases 1405). It will be understood that other categorizations of a particular network layer as constituting a "close", "local", "near", "middle", or "far" edge may be based on latency, distance, a number of network hops, or other measurable characteristics, as measured from a source in any of the network layers 1400-1440.

The various use cases 1405 may access resources under usage pressure from incoming streams, due to multiple services utilizing the edge cloud. To achieve results with low latency, the services executed within the edge cloud 1480 balance varying requirements in terms of (a) Priority (throughput or latency) and Quality of Service (QOS) (e.g., traffic for an autonomous car may have higher priority than a temperature sensor in terms of response time requirement: or, a performance sensitivity/bottleneck may exist at a compute/accelerator, memory, storage, or network resource, depending on the application): (b) Reliability and Resiliency (e.g., some input streams need to be acted upon and the traffic routed with mission-critical reliability, where as some other input streams may tolerate an occasional failure, depending on the application): and (c) Physical constraints (e.g., power, cooling, and form-factor).

The end-to-end service view for these use cases involves the concept of a service flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real-time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1480 may provide the ability to serve and respond to multiple applications of the use cases 1405 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), etc.), which cannot leverage conventional cloud computing due to latency or other limitations. This is especially relevant for applications that require connection via satellite, and the additional latency that trips via satellite would require to the cloud.

However, with the advantages of edge computing come the following caveats. The devices located at the edge are often resource-constrained and therefore there is pressure on the usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 1480 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1480 (network layers 1400-1440), which provide coordination from the client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, circuitry, device, appliance, or other things capable of communicating as a producer or consumer of data. Further, the label "node" or "device" as used in the edge computing system does not necessarily mean that such node or device operates in a client or agent/minion/follower role: rather, any of the nodes or devices in the edge computing system refer to individual entities, nodes, or subsystems which include discrete or connected hardware or software configurations to facilitate or use the edge cloud 1480.

As such, the edge cloud 1480 is formed from network components and functional features operated by and within edge gateway nodes, edge aggregation nodes, or other edge compute nodes among network layers 1410-1430. The edge cloud 1480 thus may be embodied as any type of network that provides edge computing and/or storage resources that are proximately located to radio access network (RAN) capable endpoint devices (e.g., mobile computing devices, IoT devices, smart devices, etc.), which are discussed herein. In other words, the edge cloud 1480 may be envisioned as an "edge" that connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1480 may be servers, multi-tenant servers, appliance computing devices, and/or any other type of computing device. For example, a node of the edge cloud 1480 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input device such as user interface hardware (e.g., buttons, switches, dials, sliders, etc.). In some circumstances, example housings include output devices contained in, carried by, embedded therein, and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent of other networked devices and may be provided with a housing having a form factor suitable for its primary purpose: yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 17B. The edge cloud 610 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code, or scripts may execute while being isolated from one or more other applications, software, code, or scripts.

Figure 15:
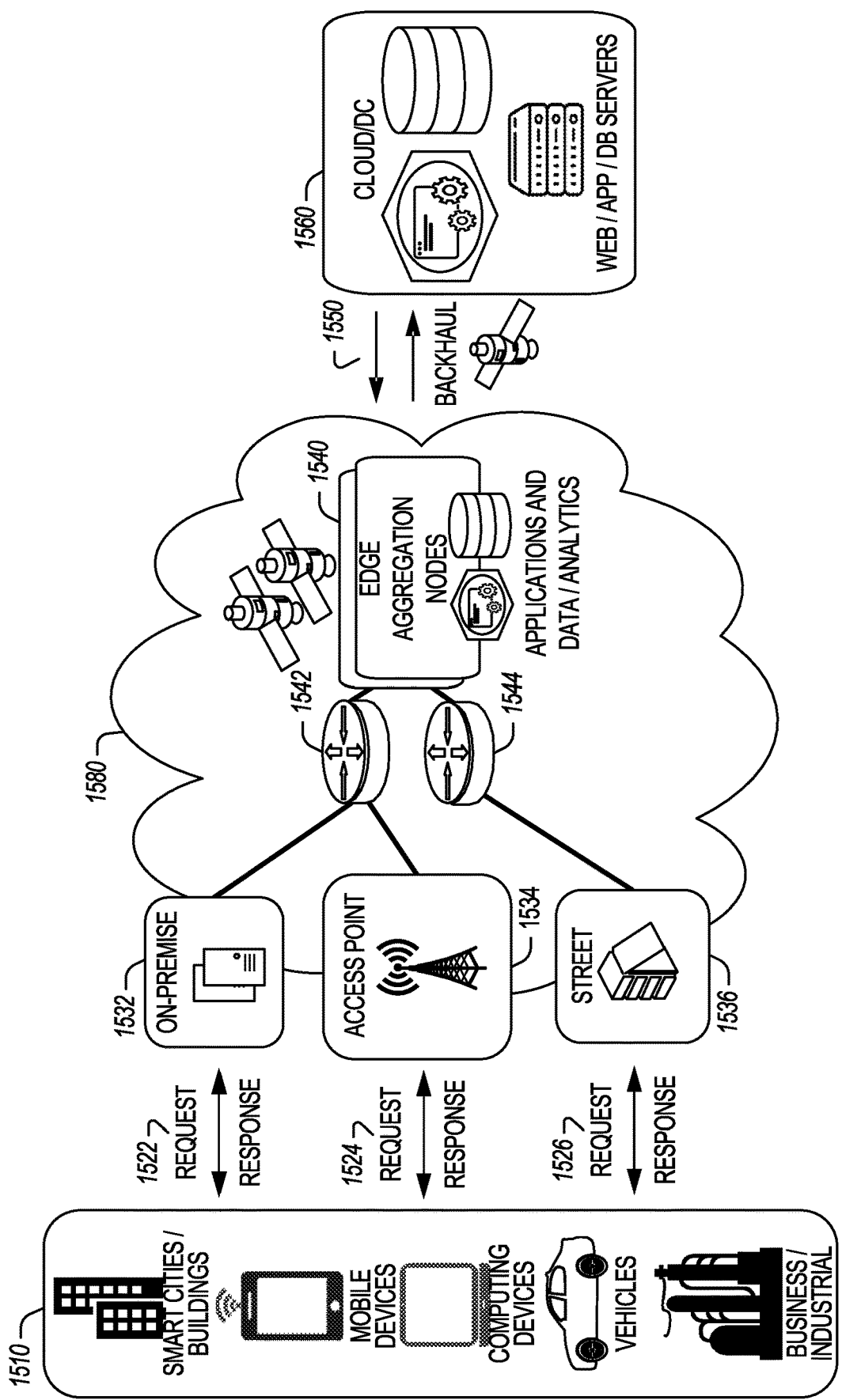
FIG. 15 illustrates operational layers among endpoints, an edge cloud, and cloud computing environments, according to an example.

In FIG. 15, various client endpoints 1510 (in the form of mobile devices, computers, autonomous vehicles, business computing equipment, industrial processing equipment) exchange requests and responses that are specific to the type of endpoint network aggregation. For instance, client endpoints 1510 may obtain network access via a wired broadband network, by exchanging requests and responses 1522 through an on-premise network system 1532. Some client endpoints 1510, such as mobile computing devices, may obtain network access via a wireless broadband network, by exchanging requests and responses 1524 through an access point (e.g., cellular network tower) 1534. Some client endpoints 1510, such as autonomous vehicles may obtain network access for requests and responses 1526 via a wireless vehicular network through a street-located network system 1536. However, regardless of the type of network access, the TSP may deploy aggregation points 1542, 1544 within the edge cloud 1580 to aggregate traffic and requests. Thus, within the edge cloud 1580, the TSP may deploy various compute and storage resources, such as at edge aggregation nodes 1540 (including those located at satellite vehicles), to provide requested content. The edge aggregation nodes 1540 and other systems of the edge cloud 1580 are connected to a cloud or data center 1560, which uses a backhaul network 1550 (such as a satellite backhaul) to fulfill higher-latency requests from a cloud/data center for websites, applications, database servers, etc. Additional or consolidated instances of the edge aggregation nodes 1540 and the aggregation points 1542, 1544, including those deployed on a single server framework, may also be present within the edge cloud 1580 or other areas of the TSP infrastructure.

Figure 16:
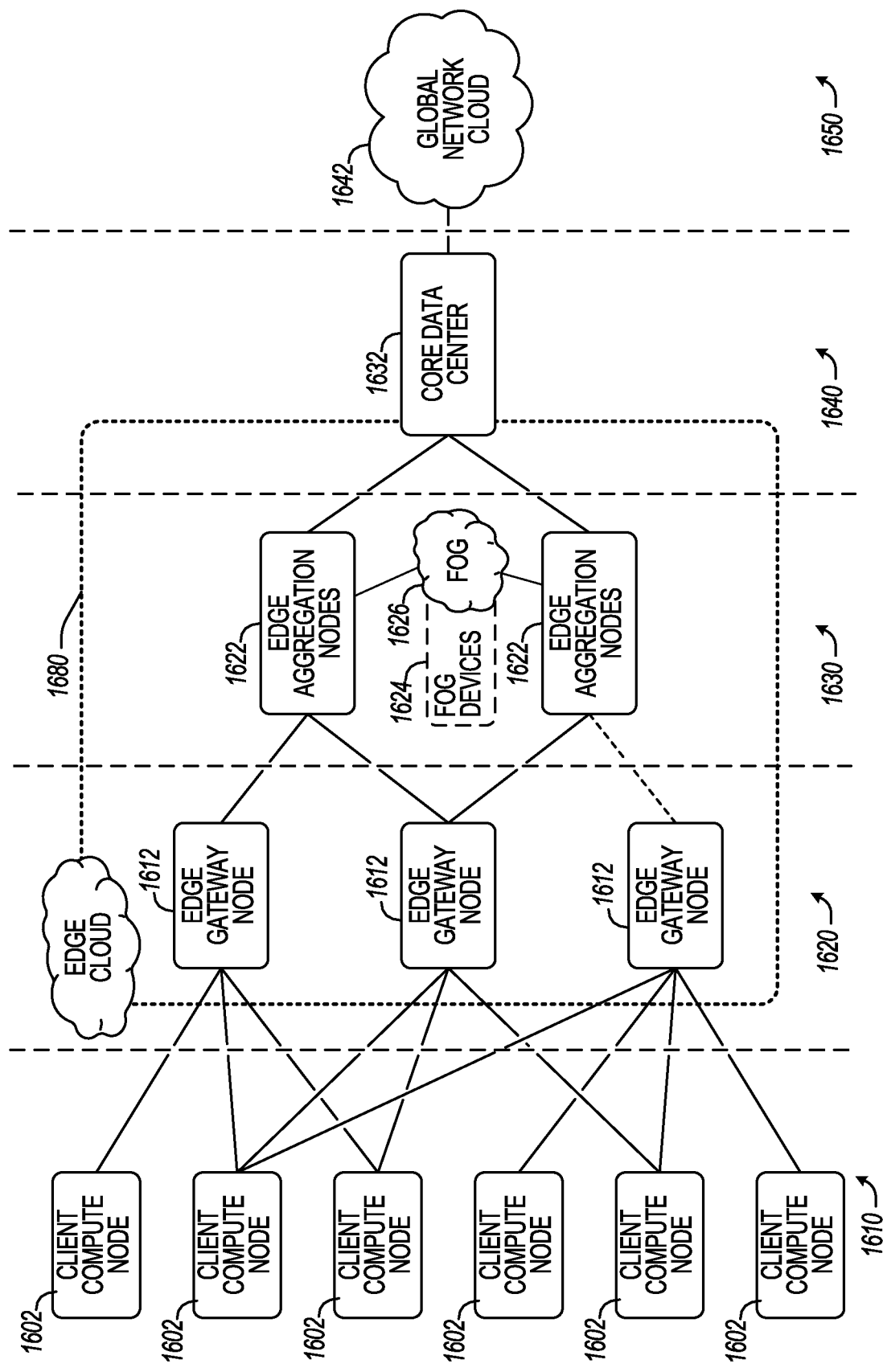
FIG. 16 illustrates an example approach for networking and services in an edge computing system, according to an example.

At a more generic level, an edge computing system may be described to encompass any number of deployments operating in the edge cloud 1580, which provide coordination from the client and distributed computing devices. FIG. 16 provides a further abstracted overview of layers of distributed compute deployed among an edge computing environment for purposes of illustration.

FIG. 16 generically depicts an edge computing system for providing edge services and applications to multi-stakeholder entities, as distributed among one or more client compute nodes 1602, one or more edge gateway nodes 1612, one or more edge aggregation nodes 1622, one or more core data centers 1632, and a global network cloud 1642, as distributed across layers 1610, 1620, 1630, 1640, and 1650 of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer (of layers 1610, 1620, 1630, 1640, and 1650) corresponding to layers 1410, 1420, 1430, 1440. For example, the client compute nodes 1602 are each located at an endpoint layer 1410, while each of the edge gateway nodes 1612 are located at an edge devices layer 1420 (local level) of the edge computing system. Additionally, each of the edge aggregation nodes 1622 (and/or fog devices 1624, if arranged or operated with or among a fog networking configuration 1626) are located at a network access layer 1430 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein: many of the edge computing aspects discussed herein apply to fog networks, fogging, and fog configurations. Further, aspects of the edge computing systems discussed herein may be configured as a fog, or aspects of fog may be integrated into an edge computing architecture.

The core data center 1632 is located at a core network layer 1430 (e.g., a regional or geographically-central level), while the global network cloud 1642 is located at a cloud data center layer 1440 (e.g., a national or global layer). The use of "core" is provided as a term for a centralized network location—deeper in the network-which is accessible by multiple edge nodes or components: however, a "core" does not necessarily designate the "center" or the deepest location of the network. Accordingly, the core data center 1632 may be located within, at, or near the edge cloud 1680.

Although an illustrative number of client compute nodes 1602, edge gateway nodes 1612, edge aggregation nodes 1622, core data centers 1632, global network clouds 1642 are shown in FIG. 16, it should be appreciated that the edge computing system may include more or fewer devices or systems at each layer. Additionally, as shown in FIG. 14, the number of components of each layer 1410, 1420, 1430, 1440, generally increases at each lower level (i.e., when moving closer to endpoints). As such, one edge gateway node 1612 may service multiple client compute nodes 1602, and one edge aggregation node 1622 may service multiple edge gateway nodes 1612.

Consistent with the examples provided herein, each client compute node 1602 may be embodied as any type of endpoint component, device, appliance, or "thing" capable of communicating as a producer or consumer of data. Further, the label "node" or "device" as used in the edge computing system 1600 does not necessarily mean that such node or device operates in a client or agent/minion/follower role: rather, any of the nodes or devices in the edge computing system 1600 refer to individual entities, nodes, or subsystems which include discrete or connected hardware or software configurations to facilitate or use the edge cloud 1680.

As such, the edge cloud 1680 is formed from network components and functional features operated by and within the edge gateway nodes 1612 and the edge aggregation nodes 1622 of layers 1420, 1430, respectively. The edge cloud 1680 may be embodied as any type of network that provides edge computing and/or storage resources that are proximately located to radio access network (RAN) capable endpoint devices (e.g., mobile computing devices, IoT devices, smart devices, etc.), which are shown in FIG. 14 as the client compute nodes 1602. In other words, the edge cloud 1680 may be envisioned as an "edge" that connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 1680 may form a portion of or otherwise provide an ingress point into or across a fog networking configuration 1626 (e.g., a network of fog devices 1624, not shown in detail), which may be embodied as a system-level horizontal and distributed architecture that distributes resources and services to perform a specific function. For instance, a coordinated and distributed network of fog devices 1624 may perform computing, storage, control, or networking aspects in the context of an IoT system arrangement. Other networked, aggregated, and distributed functions may exist in the edge cloud 1680 between the cloud data center layer 1440 and the client endpoints (e.g., client compute nodes 1602). Some of these are discussed in the following sections in the context of network functions or service virtualization, including the use of virtual edges and virtual services which are orchestrated for multiple stakeholders.

The edge gateway nodes 1612 and the edge aggregation nodes 1622 cooperate to provide various edge services and security to the client compute nodes 1602. Furthermore, because each client compute node 1602 may be stationary or mobile, each edge gateway node 1612 may cooperate with other edge gateway devices to propagate presently provided edge services and security as the corresponding client compute node 1602 moves about a region. To do so, each of the edge gateway nodes 1612 and/or edge aggregation nodes 1622 may support multiple tenancies and multiple stakeholder configurations, in which services from (or hosted for) multiple service providers and multiple consumers may be supported and coordinated across a single or multiple compute devices.

In further examples, any of the compute nodes or devices discussed with reference to the present computing systems and environment may be fulfilled based on the components depicted in FIGS. 17A and 17B. Each compute node may be embodied as a type of device, appliance, computer, or other "thing" capable of communicating with other edge, networking, or endpoint components.

Figure 17A:
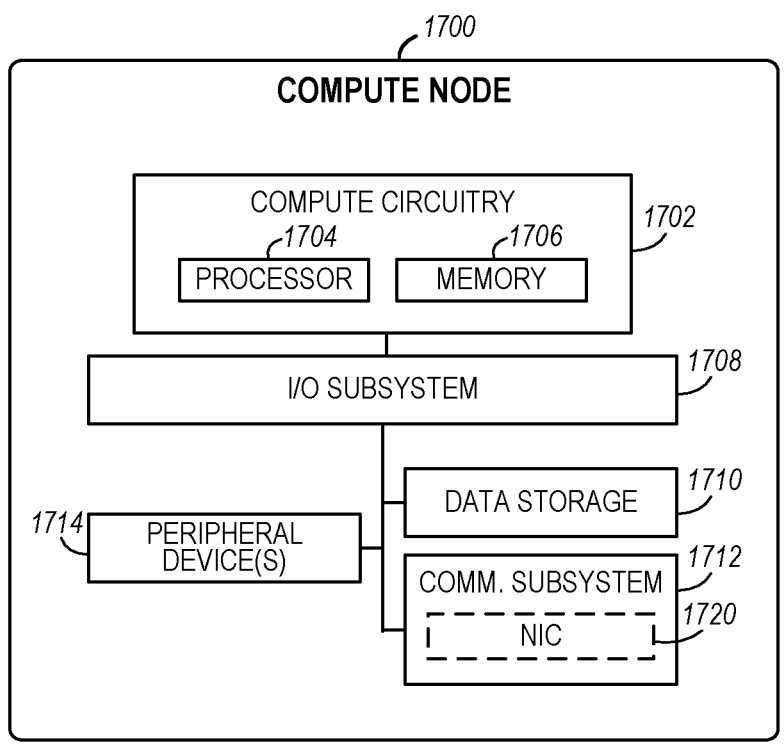
FIG. 17A illustrates an overview of example components deployed at a compute node system, according to an example.

In the simplified example depicted in FIG. 17A, an edge compute node 1700 includes a compute engine (also referred to herein as "compute circuitry") 1702, an input/output (I/O) subsystem 1708, data storage 1710, a communication circuitry subsystem 1712, and, optionally, one or more peripheral devices 1714. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1700 may be embodied as any type of engine, device, or collection of devices capable of performing various compute functions. In some examples, the compute node 1700 may be embodied as a single device such as an integrated circuit, an embedded system, a field-programmable gate array (FPGA), a system-on-a-chip (SOC), or other integrated system or device. In the illustrative example, the compute node 1700 includes or is embodied as a processor 1704 and a memory 1706. The processor 1704 may be embodied as any type of processor capable of performing the functions described herein (e.g., executing an application). For example, the processor 1704 may be embodied as a multi-core processor(s), a microcontroller, or other processor or processing/controlling circuit. In some examples, the processor 1704 may be embodied as, include, or be coupled to an FPGA, an application-specific integrated circuit (ASIC), reconfigurable hardware or hardware circuitry, or other specialized hardware to facilitate the performance of the functions described herein.

The main memory 1706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 1706 may be integrated into the processor 1704. The main memory 1706 may store various software and data used during operation such as one or more applications, data operated on by the application(s), libraries, and drivers.

The compute circuitry 1702 is communicatively coupled to other components of the compute node 1700 via the I/O subsystem 1708, which may be embodied as circuitry and/or components to facilitate input/output operations with the compute circuitry 1702 (e.g., with the processor 1704 and/or the main memory 1706) and other components of the compute circuitry 1702. For example, the I/O subsystem 1708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1708 may form a portion of a system-on-a-chip (SoC) and be incorporated, along with one or more of the processor 1704, the main memory 1706, and other components of the compute circuitry 1702, into the compute circuitry 1702.

The one or more illustrative data storage devices 1710 may be embodied as any type of devices configured for short-term or long-term storage of data such as, for example, memory devices and circuits, memory cards, hard disk drives, solid-state drives, or other data storage devices. Each data storage device 1710 may include a system partition that stores data and firmware code for the data storage device 1710. Each data storage device 1710 may also include one or more operating system partitions that store data files and executables for operating systems depending on, for example, the type of compute node 1700.

The communication circuitry 1712 may be embodied as any communication circuit, device, or collection thereof, capable of enabling communications over a network between the compute circuitry 1702 and another compute device (e.g., an edge gateway node 1612 of the edge computing system 1610). The communication circuitry 1712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 1712 includes a network interface controller (NIC) 1720, which may also be referred to as a host fabric interface (HFI). The NIC 1720 may be embodied as one or more add-in-boards, daughter cards, network interface cards, controller chips, chipsets, or other devices that may be used by the compute node 1700 to connect with another compute device (e.g., an edge gateway node 1612). In some examples, the NIC 1720 may be embodied as part of a system-on-a-chip (SoC) that includes one or more processors or included on a multichip package that also contains one or more processors. In some examples, the NIC 1720 may include a local processor (not shown) and/or a local memory (not shown) that are both local to the NIC 1720. In such examples, the local processor of the NIC 1720 may be capable of performing one or more of the functions of the compute circuitry 1702 described herein. Additionally, the local memory of the NIC 1720 may be integrated into one or more components of the client compute node at the board level, socket level, chip level, and/or other levels.

Additionally, in some examples, each compute node 1700 may include one or more peripheral devices 1714. Such peripheral devices 1714 may include any type of peripheral device found in a compute device or server such as audio input devices, a display, other input/output devices, interface devices, and/or other peripheral devices, depending on the particular type of the compute node 1700. In further examples, the compute node 1700 may be embodied by a respective edge compute node in an edge computing system (e.g., client compute node 1602, edge gateway node 1612, edge aggregation node 1622) or like forms of appliances, computers, subsystems, circuitry, or other components.

Figure 17B:
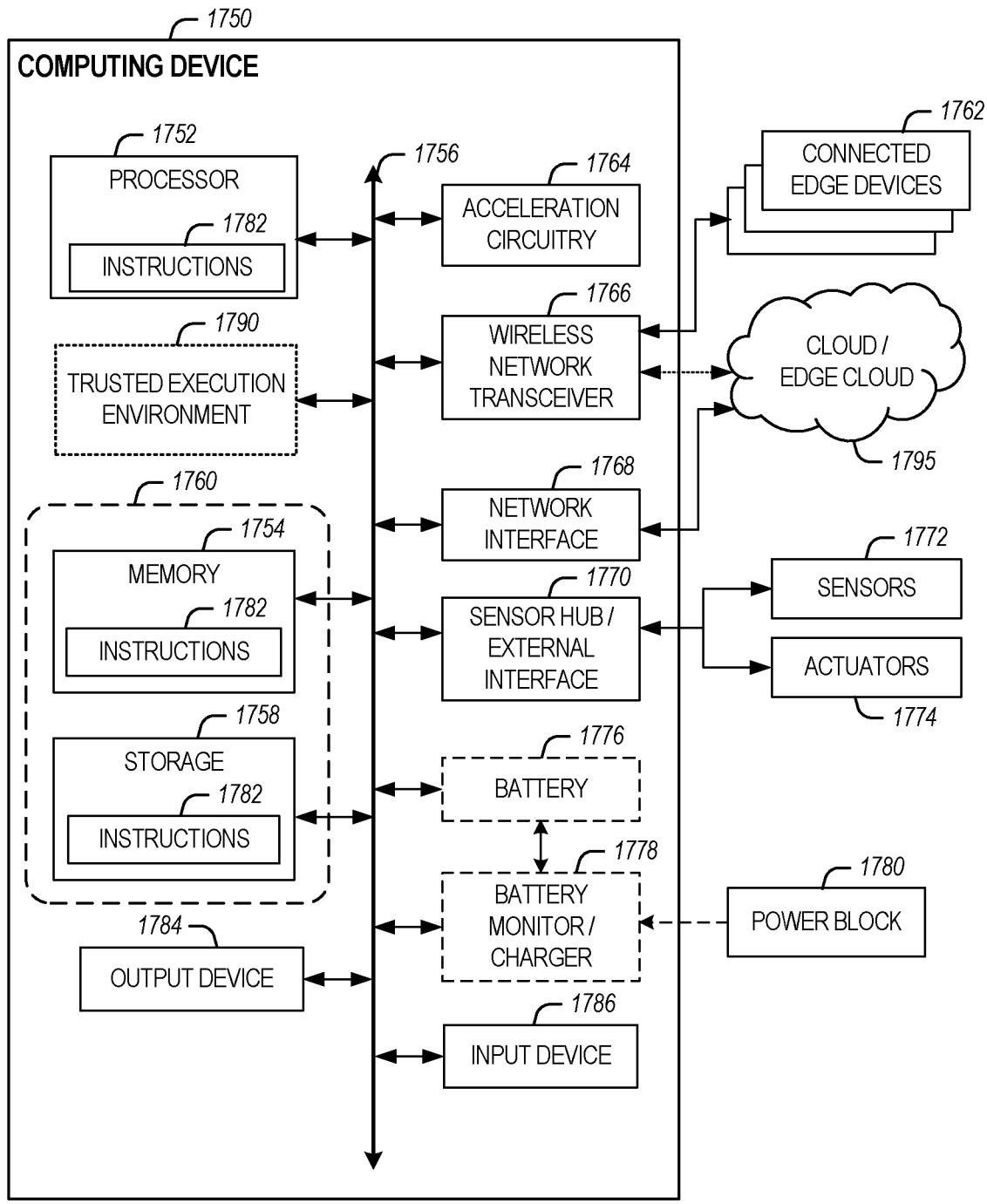
FIG. 17B illustrates a further overview of example components within a computing device, according to an example.

In a more detailed example, FIG. 17B illustrates a block diagram of an example of components that may be present in an edge computing node 1750 for implementing the techniques (e.g., operations, processes, methods, and methodologies) described herein. The edge computing node 1750 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 1750, or as components otherwise incorporated within a chassis of a larger system. Further, to support the security examples provided herein, a hardware ROT (e.g., provided according to a DICE architecture) may be implemented in each IP block of the edge computing node 1750 such that any IP Block could boot into a mode where an RoT identity could be generated that may attest its identity and its current booted firmware to another IP Block or an external entity.

The edge computing node 1750 may include processing circuitry in the form of a processor 1752, which may be a microprocessor, a multi-core processor, a multithreaded processor, an ultra-low voltage processor, an embedded processor, or other known processing elements. The processor 1752 may be a part of a system on a chip (SoC) in which the processor 1752 and other components are formed into a single integrated circuit, or a single package, such as the Edison™ or Galileo™ SoC boards from Intel Corporation, Santa Clara, California. As an example, the processor 1752 may include an Intel® Architecture Core™ based processor, such as a Quark™, an Atom™, a Xeon™ an i3, an i5, an i7, an i9, or an MCU-class processor, or another such processor available from Intel®. However, any number of other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A13 processor from AppleR Inc., a Snapdragon™ processor from Qualcomm® Technologies, Inc., or an OMAP™ processor from Texas Instruments, Inc.

The processor 1752 may communicate with a system memory 1754 over an interconnect 1756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 1758 may also couple to the processor 1752 via the interconnect 1756. In an example, the storage 1758 may be implemented via a solid-state disk drive (SSDD). Other devices that may be used for the storage 1758 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low-power implementations, the storage 1758 may be on-die memory or registers associated with the processor 1752. However, in some examples, the storage 1758 may be implemented using a micro hard disk drive (HDD). Further, any number of new technologies may be used for the storage 1758 in addition to, or instead of, the technologies described, such as resistance change memories, phase change memories, holographic memories, or chemical memories, among others.

The components may communicate over the interconnect 1756. The interconnect 1756 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 1756 may be a proprietary bus, for example, used in an SoC-based system. Other bus systems may be included, such as an I2C interface, an SPI interface, point-to-point interfaces, and a power bus, among others.

The interconnect 1756 may couple the processor 1752 to a transceiver 1766, for communications with the connected edge devices 1762. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBeeR standard, among others. Any number of radios, configured for a particular wireless communication protocol, may be used for the connections to the connected edge devices 1762. For example, a wireless local area network (WLAN) unit may be used to implement Wi-FiR communications in accordance with the Institute of Electrical and Electronics Engineers (IEEE) 802.11 standard. Also, wireless wide area communications, e.g., according to a cellular or other wireless wide area protocol, may occur via a wireless wide area network (WWAN) unit.

The wireless network transceiver 1766 (or multiple transceivers) may communicate using multiple standards or radios for communications at a different range. For example, the edge computing node 1750 may communicate with close devices, e.g., within about 10 meters, using a local transceiver based on BLE, or another low power radio, to save power. More distant connected edge devices 1762, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1766 (e.g., a radio transceiver) may be included to communicate with devices or services in the edge cloud 1790 via local or wide area network protocols. The wireless network transceiver 1766 may be an LPWA transceiver that follows the IEEE 802.15.4, or IEEE 802.15.4g standards, among others. The edge computing node 1750 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802. 15.4e specification may be used.

Any number of other radio communications and protocols may be used in addition to the systems mentioned for the wireless network transceiver 1766, as described herein. For example, the transceiver 1766 may include a cellular transceiver that uses spread spectrum (SPA/SAS) communications for implementing high-speed communications. Further, any number of other protocols may be used, such as Wi-FiR networks for medium-speed communications and provision of network communications. The transceiver 1766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1768 may be included to provide a wired communication to nodes of the edge cloud 1790 or other devices, such as the connected edge devices 1762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1768 may be included to enable connecting to a second network, for example, a first NIC 1768 providing communications to the cloud over Ethernet, and a second NIC 1768 providing communications to other devices over another type of network.

Given the variety of types of applicable communications from the device to another component or network, applicable communications circuitry used by the device may include or be embodied by any one or more of components 1764, 1766, 1768, or 1770. Accordingly, in various examples, applicable means for communicating (e.g., receiving, transmitting, etc.) may be embodied by such communications circuitry.

The edge computing node 1750 may include or be coupled to acceleration circuitry 1764, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1756 may couple the processor 1752 to a sensor hub or external interface 1770 that is used to connect additional devices or subsystems. The devices may include sensors 1772, such as accelerometers, level sensors, flow sensors, optical light sensors, camera sensors, temperature sensors, global positioning system (GPS) sensors, pressure sensors, barometric pressure sensors, and the like. The hub or interface 1770 further may be used to connect the edge computing node 1750 to actuators 1774, such as power switches, valve actuators, an audible sound generator, a visual warning device, and the like.

In some optional examples, various input/output (I/O) devices may be present within or connected to, the edge computing node 1750. For example, a display or other output device 1784 may be included to show information, such as sensor readings or actuator position. An input device 1786, such as a touch screen or keypad may be included to accept input. An output device 1784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1750.

A battery 1776 may power the edge computing node 1750, although, in examples in which the edge computing node 1750 is mounted in a fixed location, it may have a power supply coupled to an electrical grid. The battery 1776 may be a lithium-ion battery, or a metal-air battery, such as a zinc-air battery, an aluminum-air battery, a lithium-air battery, and the like.

A battery monitor/charger 1778 may be included in the edge computing node 1750 to track the state of charge (SoCh) of the battery 1776. The battery monitor/charger 1778 may be used to monitor other parameters of the battery 1776 to provide failure predictions, such as the state of health (SoH) and the state of function (SoF) of the battery 1776. The battery monitor/charger 1778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1778 may communicate the information on the battery 1776 to the processor 1752 over the interconnect 1756. The battery monitor/charger 1778 may also include an analog-to-digital (ADC) converter that enables the processor 1752 to directly monitor the voltage of the battery 1776 or the current flow from the battery 1776. The battery parameters may be used to determine actions that the edge computing node 1750 may perform, such as transmission frequency, mesh network operation, sensing frequency, and the like.

A power block 1780, or other power supply coupled to a grid, may be coupled with the battery monitor/charger 1778 to charge the battery 1776. In some examples, the power block 1780 may be replaced with a wireless power receiver to obtain the power wirelessly, for example, through a loop antenna in the edge computing node 1750. A wireless battery charging circuit, such as an LTC4020 chip from Linear Technologies of Milpitas, California, among others, may be included in the battery monitor/charger 1778. The specific charging circuits may be selected based on the size of the battery 1776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1758 may include instructions 1782 in the form of software, firmware, or hardware commands to implement the techniques described herein. Although such instructions 1782 are shown as code blocks included in the memory 1754 and the storage 1758, it may be understood that any of the code blocks may be replaced with hardwired circuits, for example, built into an application-specific integrated circuit (ASIC).

In an example, the instructions 1782 provided via the memory 1754, the storage 1758, or the processor 1752 may be embodied as a non-transitory, machine-readable medium 1760 including code to direct the processor 1752 to perform electronic operations in the edge computing node 1750. The processor 1752 may access the non-transitory, machine-readable medium 1760 over the interconnect 1756. For instance, the non-transitory, machine-readable medium 1760 may be embodied by devices described for the storage 1758 or may include specific storage units such as optical disks, flash drives, or any number of other hardware devices. The non-transitory, machine-readable medium 1760 may include instructions to direct the processor 1752 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices: magnetic disks such as internal hard disks and removable disks: magneto-optical disks: and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 17A and 17B are intended to depict a high-level view of components of a device, subsystem, or arrangement of an edge computing node. However, it will be understood that some of the components shown may be omitted, additional components may be present, and a different arrangement of the components shown may occur in other implementations.

Figure 18:
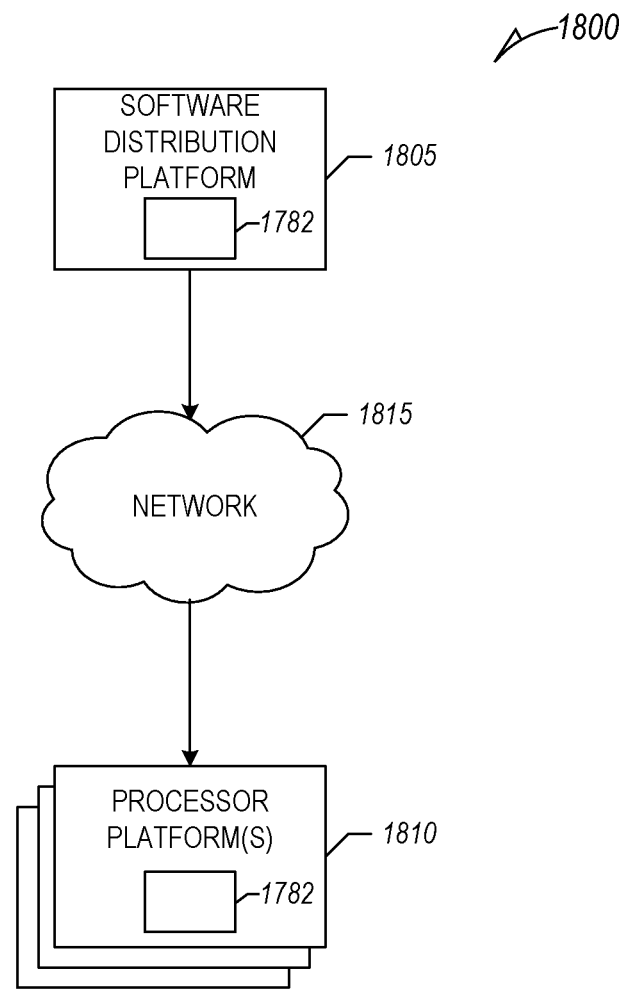
FIG. 18 illustrates a software distribution platform to distribute software instructions and derivatives, according to an example.

FIG. 18 illustrates an example software distribution platform 1805 to distribute software, such as the example computer-readable instructions 1782 of FIG. 17B, to one or more devices, such as processor platform(s) 1810 and/or other example connected edge devices or systems discussed herein. The example software distribution platform 1805 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 1805). Example connected edge devices may operate in commercial and/or home automation environments. In some examples, a third party is a developer, a seller, and/or a licensor of software such as the example computer-readable instructions 1782 of FIG. 17B. The third parties may be consumers, users, retailers, OEMs, etc, that purchase and/or license the software for use and/or re-sale and/or sub-licensing. In some examples, distributed software causes the display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 18, the software distribution platform 1805 includes one or more servers and one or more storage devices that store the computer-readable instructions 1782. The one or more servers of the example software distribution platform 1805 are in communication with a network 1815, which may correspond to any one or more of the Internet and/or any of the example networks described above. In some examples, one or more servers are responsive to requests to transmit the software to a requesting party as part of a commercial transaction. Payment for the delivery, sale, and/or license of the software may be handled by one or more servers of the software distribution platform and/or via a third-party payment entity. The servers enable purchasers and/or licensors to download the computer-readable instructions 1782 from the software distribution platform 1805. For example, the software, which may correspond to example computer-readable instructions, may be downloaded to the example processor platform(s), which is/are to execute the computer-readable instructions 1782. In some examples, one or more servers of the software distribution platform 1805 are communicatively connected to one or more security domains and/or security devices through which requests and transmissions of the example computer-readable instructions 1782 must pass. In some examples, one or more servers of the software distribution platform 1805 periodically offer, transmit, and/or force updates to the software (e.g., the example computer-readable instructions 1782 of FIG. 17B) to ensure improvements, patches, updates, etc, are distributed and applied to the software at the end-user devices.

In the illustrated example of FIG. 18, the computer-readable instructions 1782 are stored on storage devices of the software distribution platform 1805 in a particular format. A format of computer-readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.). In some examples, the computer-readable instructions 1782 stored in the software distribution platform 1805 are in a first format when transmitted to the example processor platform(s) 1810. In some examples, the first format is an executable binary in which particular types of the processor platform(s) 1810 can execute. However, in some examples, the first format is uncompiled code that requires one or more preparation tasks to transform the first format to a second format to enable execution on the example processor platform(s) 1810. For instance, the receiving processor platform(s) 1810 may need to compile the computer-readable instructions 1782 in the first format to generate executable code in a second format that is capable of being executed on the processor platform(s) 1810. In still other examples, the first format is interpreted code that, upon reaching the processor platform(s) 1810, is interpreted by an interpreter to facilitate the execution of instructions.

Figure 19:
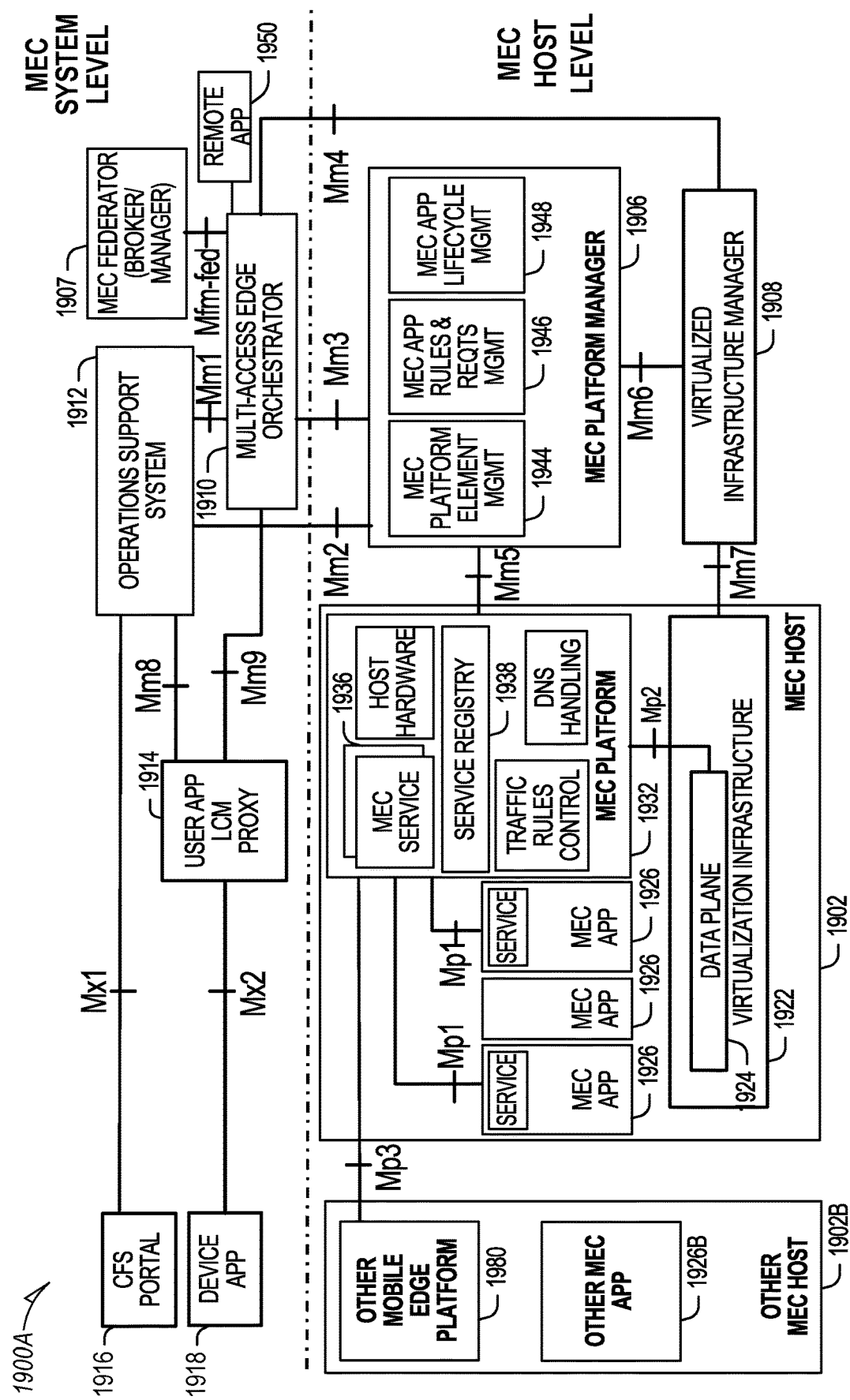
FIG. 19 illustrates a MEC system reference architecture variant, according to an example.

FIG. 19 illustrates a MEC system reference architecture variant, according to an example. Draft ETSI GS MEC 003 v3.0.4 includes a reference architecture variant for MEC federation. The difference between this variant and the MEC reference system architecture is the addition of two MEC Federation functional entities, namely, a MEC Federation Manager (MEFM) and—optionally—a MEC Federation Broker (MEFB) and a number of MEC federation reference points, i.e.: Mfb-fed, connecting the MEC system's MEFM to the MEFB (of the latter is present): Mff-fed, connecting two federated MEC systems' MEFM entities: and Mfm-fed, connecting the MEC system's MEFM to its MEO.

Figure 20:
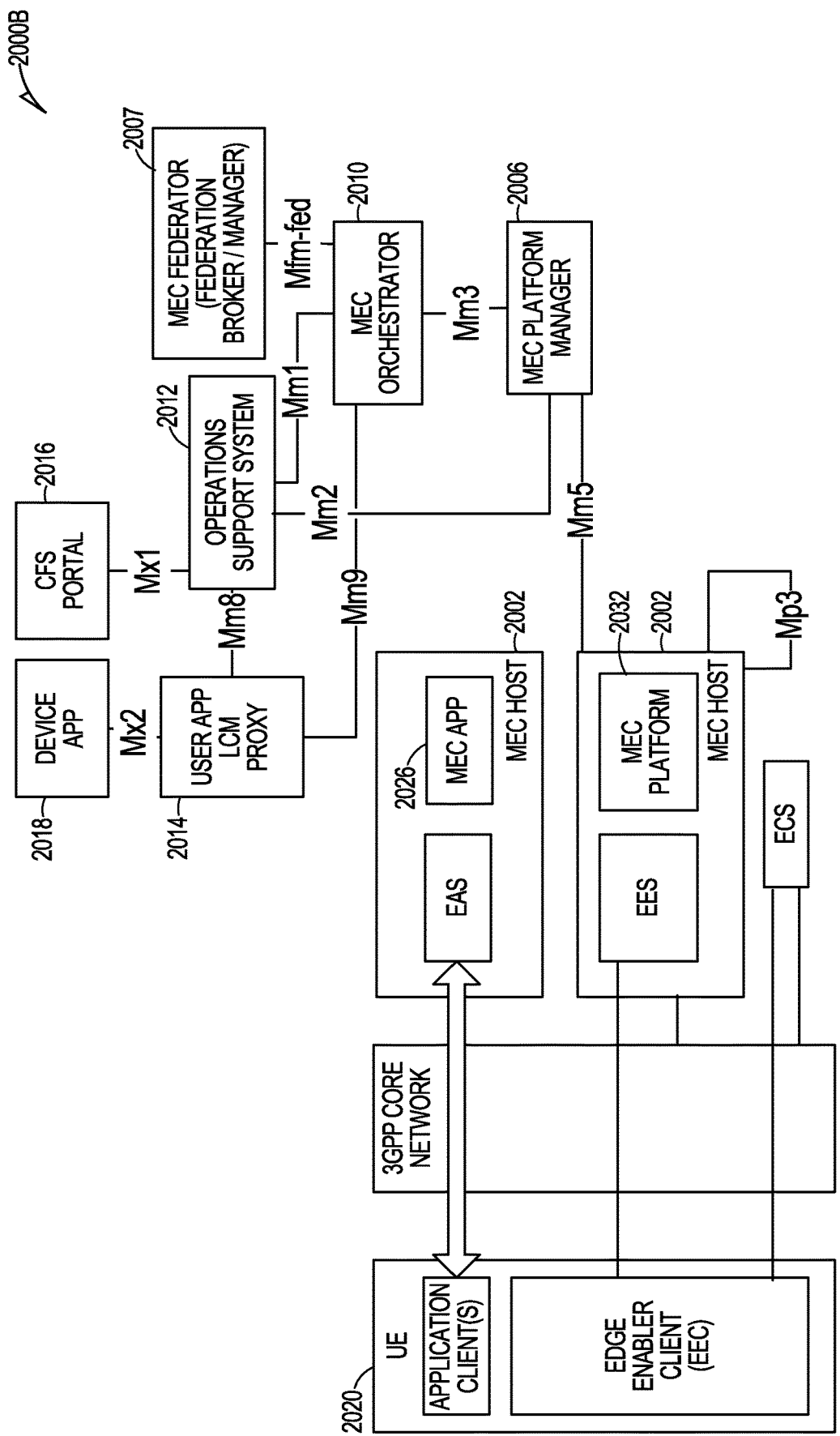
FIG. 20 illustrates an MEC architecture, according to an example.
Figure 21:
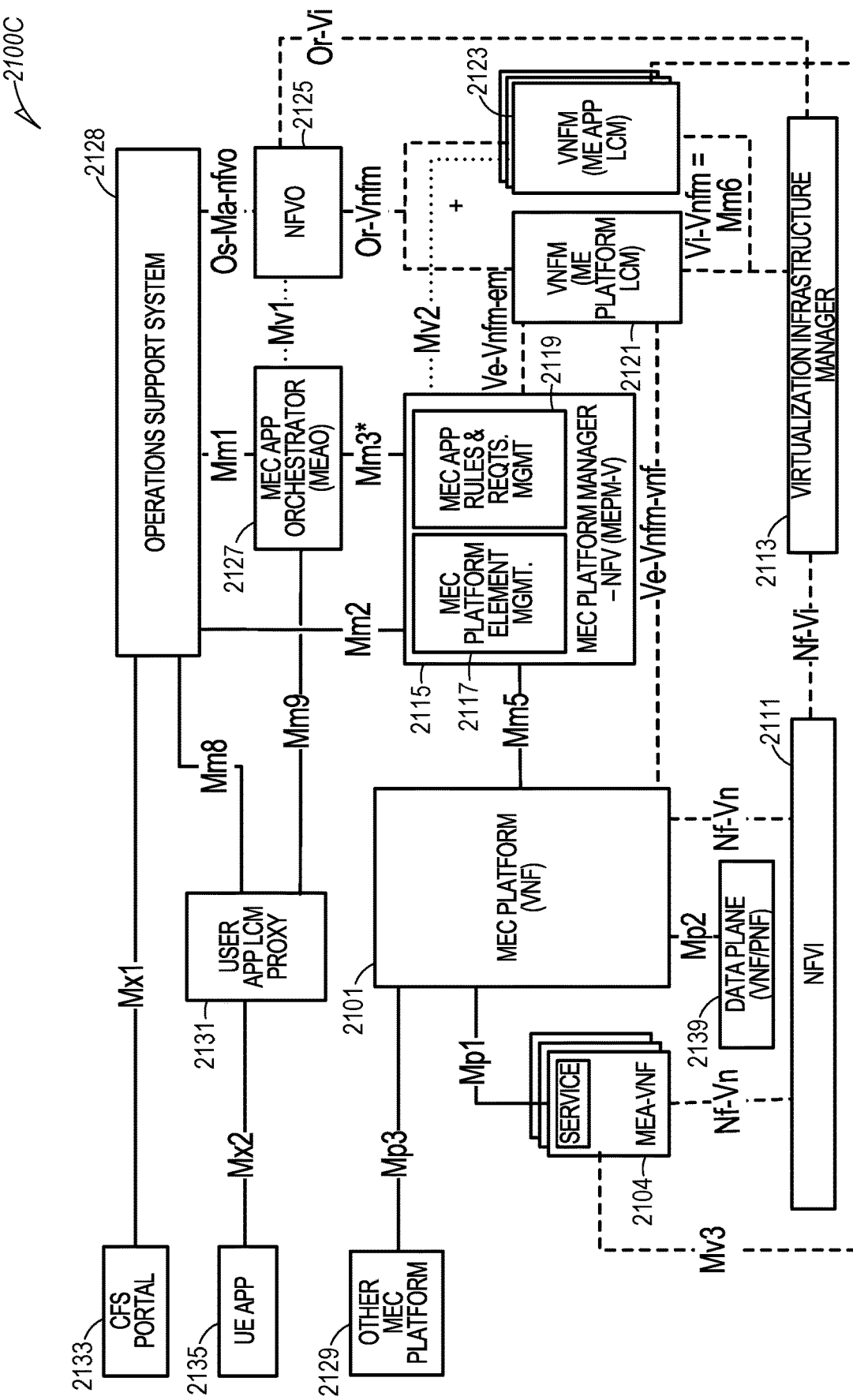
FIG. 21 illustrates a multi-access edge system reference architecture variant for MEC in NFV, according to an example.

FIG. 20 illustrates an architecture, according to an example. FIG. 20 shows an architecture leveraging ETSI ISG MEC and 3GPP (SA6 EDGEAPP) specifications. FIG. 21 illustrates a multi-access edge system reference architecture variant for MEC in network function virtualization (NFV), according to an example. FIG. 21 illustrates a synergized architecture, taking into account the MEC Federation variant of the reference MEC architecture and the 3GPP EDGEAPP architecture specified in TS 23.558.

Figure 22:
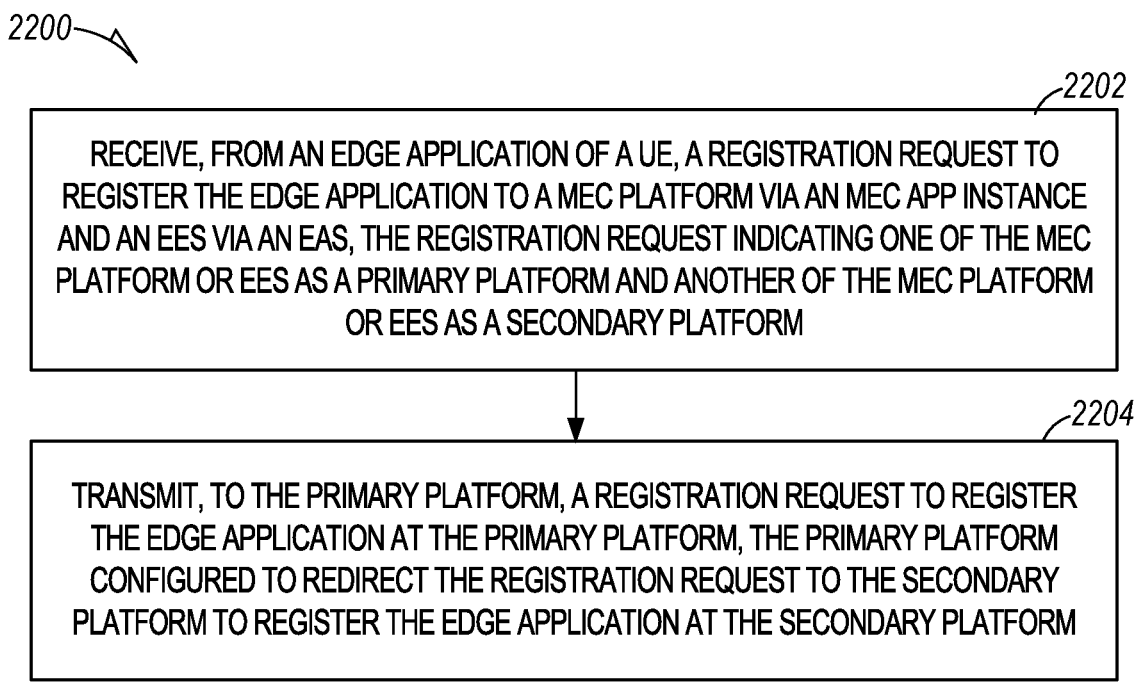
FIG. 22 illustrates a method of Edge Dual Deployment (EDD), according to an example.

FIG. 22 illustrates a method of Edge Dual Deployment (EDD), according to an example. Only some of the operations described above are shown, for convenience. At operation 2202 of the method 2200, a registration request to register the edge application to a MEC platform via an MEC App instance and an EES via an EAS may be received from an edge application of a UE. The registration request indicates one of the MEC platform or EES as a primary platform and another of the MEC platform or EES as a secondary platform. At operation 2204, a registration request to register the edge application at the primary platform may be transmitted to the primary platform. The primary platform is configured to redirect the registration request to the secondary platform to register the edge application at the secondary platform.

Figure 23:
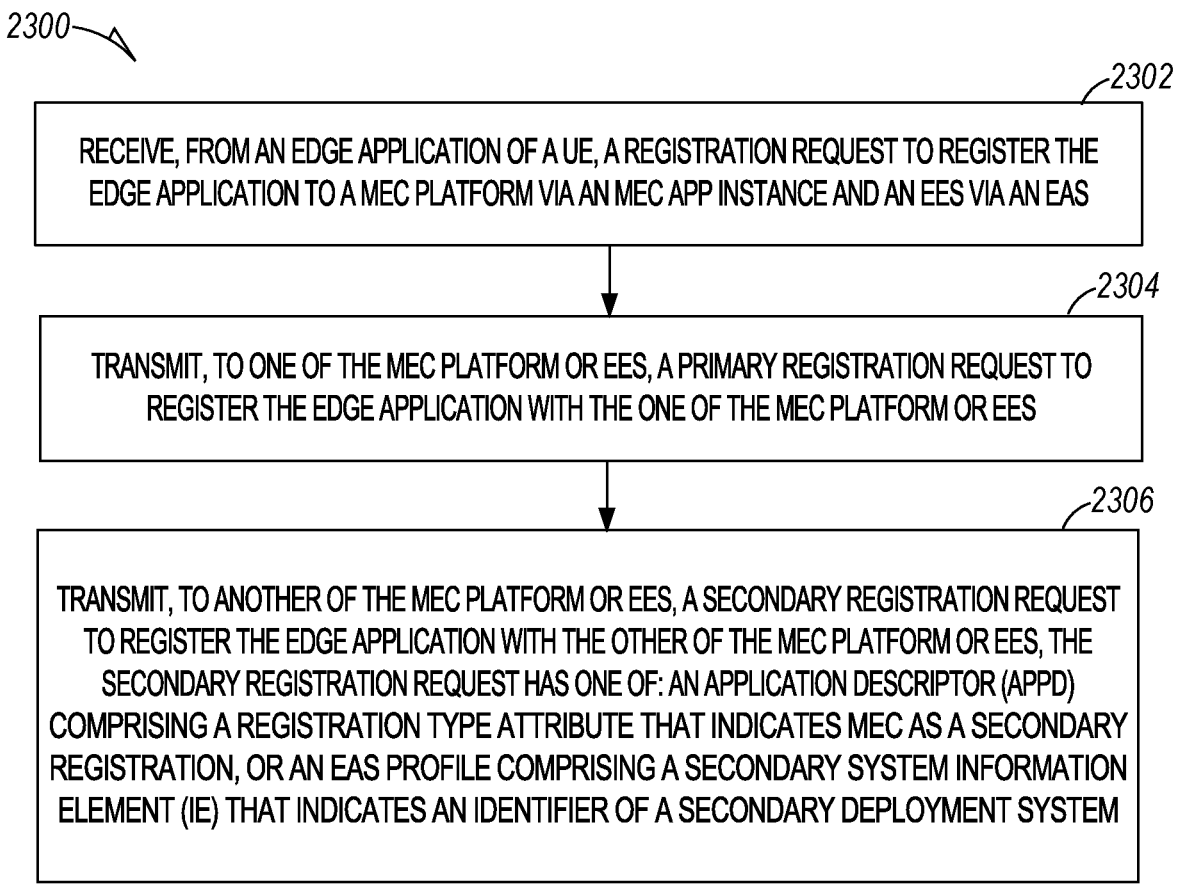
FIG. 23 illustrates another method of EDD, according to an example.

FIG. 23 illustrates another method of EDD, according to an example. Only some of the operations described above are shown, for convenience. At operation 2302 of the method 2300, a registration request to register the edge application to a MEC platform via an MEC App instance and an EES via an EAS may be received from an edge application of a UE. At operation 2304, a primary registration request to register the edge application with the one of the MEC platform or EES may be transmitted to one of the MEC platform or EES. At operation 2306, a secondary registration request to register the edge application with another of the MEC platform or EES may be transmitted to the other of the MEC platform or EES. The secondary registration request has one of: an Application Descriptor (AppD) comprising a registration type attribute that indicates MEC as a secondary registration, or an EAS profile comprising a secondary system information element (IE) that indicates an identifier of a secondary deployment system.

The following are incorporated by reference in their entirety: ETSI White Paper #36, "Harmonizing standards for edge computing—A synergized architecture leveraging ETSI ISG MEC and 3GPP specifications", July 2020. ETSI GS MEC 011 V2.2.1 (2020-12), "Multi-access Edge Computing (MEC): Edge Platform Application Enablement". ETSI GS MEC 010-2, "Multi-access Edge Computing (MEC): MEC Management: Part 2: Application lifecycle, rules and requirements management", V2.1.1, Nov. 2019. 3GPP TS 23.558, "Architecture for enabling Edge Applications: (Release 17)", V17.0.0, June 2021. ETSI GS MEC 003: "Multi-access Edge Computing (MEC); Framework and Reference Architecture", v3.0.4 (draft), May 2021. S6-211858—Study on enhanced architecture for enabling Edge Applications. S6-211896—New Key Issue on EAS and MEC Application Alignment. S6-211897 New Key Issue on EES and MEC Platform Alignment. S6-211922—New Key Issue—Alignment of APIs between ETSI MEC and EDGEAPP. MEC(21)000153r1, "MEC011_MEC application registration", ETSI MEC contribution, April 2021. GSMA Permanent Reference Document (PRD), "Operator Platform Telco Edge Requirements", v1.0, Jun. 2021.

Although these implementations have been described concerning specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Examples

Example 1 is a device comprising: processing circuitry: and a memory including instructions embodied thereon, wherein the instructions, which when executed by the processing circuitry, configure the processing circuitry to: receive, from an edge application of a user equipment (UE), a registration request to register the edge application to a Multi-access Edge Computing (MEC) platform via an MEC App instance and an Edge Enabler Server (EES) via an edge application server (EAS) of a 3rd generation partnership project (3GPP) system, the registration request indicating one of the MEC platform or EES as a primary platform and another of the MEC platform or EES as a secondary platform: and transmit, to the primary platform, a registration request to register the edge application at the primary platform, the primary platform configured to redirect the registration request to the secondary platform to register the edge application at the secondary platform.

In Example 2, the subject matter of Example 1 includes, wherein: the registration request is received at the EAS, an EAS profile of a dual application registration request with the EES to register the edge application with the EES comprises a first information element (IE) that indicates the EES is the primary platform and a second IE that indicates dual deployment is to occur with the MEC platform, and an EAS profile of an EAS registration response from the EES to the EAS in response to the EAS registration request comprises a third IE that provides an EES identifier of the EES, a fourth IE that provides a MEC platform identifier of the MEC platform, and a fifth IE that provides a registration identifier of the edge application for identification to the EES and the MEC platform.

In Example 3, the subject matter of Example 2 includes, wherein in response to reception of the dual application registration request from the EAS, the EES is configured to: register the EAS, identify the MEC platform, redirect the dual application registration request to the MEC platform as an application registration request, receive, in response to transmission of the application registration request to the MEC platform, an application registration request acknowledgment from the MEC platform that includes a registration status of the edge application with the MEC platform, and transmit, in response to reception of the application registration request acknowledgment from the MEC platform, a dual application registration request acknowledgment to the EAS that includes the registration status.

In Example 4, the subject matter of Examples 1-3 includes, wherein: the registration request is received at the MEC App instance, the MEC App instance is configured to transmit a dual application registration request to the MEC platform in response to reception of the registration request, and in response to reception of the dual application registration request from the MEC App instance, the MEC platform is configured to: register the MEC App instance, identify the EES, redirect the dual application registration request to the EES as an application registration request, receive, in response to transmission of the application registration request to the EES, an application registration request acknowledgment from the EES that includes a registration status of the edge application with the EES, and transmit, in response to reception of the application registration request acknowledgment from the EES, a dual application registration request acknowledgment to the MEC App instance that includes the registration status.

In Example 5, the subject matter of Examples 1-4 includes, wherein: an update request to update information of the edge application is received at the EAS, an EAS profile of the update request comprises a first information element (IE) that indicates an EES identifier of the EES, a second IE that indicates a MEC platform identifier of the MEC platform, and a third IE that indicates a registration identifier of the edge application for identification to the EES and the MEC platform, and in response to reception of the update request from the EAS, the EES is configured to: update information of the edge application: redirect the update request to the MEC platform, receive, in response to transmission of the update request to the MEC platform, an update request acknowledgment from the MEC platform that includes an update status of the edge application with the MEC platform, and transmit, in response to reception of the update request acknowledgment from the MEC platform, another update request acknowledgment to the EAS that includes the update status.

In Example 6, the subject matter of Examples 1-5 includes, wherein: an update request to update information of the edge application is received at the MEC App instance, the MEC App instance is configured to transmit the update request to the MEC platform in response to reception of the update request, and in response to reception of the update request from the MEC App instance, the MEC platform is configured to: redirect the update request to the EES, receive, in response to transmission of the update request to the EES, an update request acknowledgment from the EES that includes a update status of the edge application with the EES, and transmit, in response to reception of the update request acknowledgment from the EES, another update acknowledgment to the MEC App instance that includes the update status.

In Example 7, the subject matter of Examples 1-6 includes, wherein: a deregister request to deregister the edge application from the EES and MEC platform is received at the EAS, an EAS profile of the deregister request comprises a first information element (IE) that indicates an EES identifier of the EES, a second IE that indicates a MEC platform identifier of the MEC platform, and a third IE that indicates a registration identifier of the edge application for identification to the EES and the MEC platform, and in response to reception of the deregister request from the EAS, the EES is configured to: redirect the deregister request to the MEC platform, receive, in response to transmission of the deregister request to the MEC platform, a deregister request acknowledgment from the MEC platform that includes a deregister status of the edge application with the MEC platform, and transmit, in response to reception of the deregister request acknowledgment from the MEC platform, another deregister request acknowledgment to the EAS that includes the deregister status.

In Example 8, the subject matter of Examples 1-7 includes, wherein: a deregister request to deregister the edge application from the EES and MEC platform is received at the MEC App instance, the MEC App instance is configured to transmit the deregister request to the MEC platform in response to reception of the deregister request, and in response to reception of the deregister request from the MEC App instance, the MEC platform is configured to: redirect the deregister request to the EES, receive, in response to transmission of the deregister request to the EES, an deregister request acknowledgment from the EES that includes a deregister status of the edge application with the EES, and transmit, in response to reception of the deregister request acknowledgment from the EES, another deregister acknowledgment to the MEC App instance that includes the deregister status.

In Example 9, the subject matter of Examples 1-8 includes, wherein the instructions, which when executed by the processing circuitry, configure the processing circuitry to initialize dual deployment with the EES and MEC platform prior to reception of the registration request to allow the EES and MEC platform to communicate directly.

In Example 10, the subject matter of Example 9 includes, 3GPP platform to obtain MEC Platform information.

In Example 11, the subject matter of Example 10 includes, wherein EES and MEC platform pairs are created for the dual deployment during initialization.

In Example 12, the subject matter of Example 11 includes, wherein: the EES and MEC platform pairs are selected by the MEO, a pair selection notification that includes the EES and MEC platform pairs is transmitted from the MEO to the OSS, and the OSS provides an acknowledgment to the MEO in response to the pair selection notification.

In Example 13, the subject matter of Examples 11-12 includes, wherein: the EES and MEC platform pairs are selected by the OSS, a pair selection notification that includes the EES and MEC platform pairs is transmitted from the to OSS the MEO, and the MEO provides an acknowledgment to the OSS in response to the pair selection notification.

In Example 14, the subject matter of Examples 10-13 includes, wherein EES and MEC platform pairs are created for the dual deployment during the registration.

In Example 15, the subject matter of Examples 9-14 includes, wherein an Application Descriptor (AppD) for initialization comprises: a registration type attribute that indicates which of single MEC or dual MEC and 3GPP registration is requested by the MEC, and when the registration type attribute indicates dual MEC and 3GPP registration is requested by the MEC, an edge application version attribute that indicates at least one version of an edge application server (EAS) compatible with the MEC App.

In Example 16, the subject matter of Examples 9-15 includes, wherein an EAS profile for initialization comprises an EAS dual deployment information element (IE) that indicates whether the EAS supports dual deployment with the MEC, and a secondary system IE that contains an identifier of a secondary deployment system for application programming interface (API) consumption.

Example 17 is a device comprising: processing circuitry: and a memory including instructions embodied thereon, wherein the instructions, which when executed by the processing circuitry, configure the processing circuitry to: receive, from an edge application of a user equipment (UE), a registration request to register the edge application to a Multi-access Edge Computing (MEC) platform via an MEC App instance and an Edge Enabler Server (EES) of a 3rd generation partnership project (3GPP) system via an edge application server (EAS): and in response to the registration request: transmit, to one of the MEC platform or EES, a primary registration request to register the edge application with the one of the MEC platform or EES, and transmit, to another of the MEC platform or EES, a secondary registration request to register the edge application with the other of the MEC platform or EES, wherein the secondary registration request has one of: an Application Descriptor (AppD) comprising a registration type attribute that indicates MEC as a secondary registration, or an EAS profile comprising a secondary system information element (IE) that indicates an identifier of a secondary deployment system.

In Example 18, the subject matter of Example 17 includes, wherein the instructions, when executed by the processing circuitry, configure the processing circuitry to transmit the secondary registration request after reception of an acknowledgment of the primary registration request from the one of the MEC platform or EES.

Example 19 is a method of Edge Dual Deployment (EDD), the method comprising: receiving, from an edge application of a user equipment (UE), a registration request to register the edge application to a Multi-access Edge Computing (MEC) platform via an MEC App instance and an Edge Enabler Server (EES) via an edge application server (EAS) of a 3rd generation partnership project (3GPP) system, the registration request indicating one of the MEC platform or EES as a primary platform and another of the MEC platform or EES as a secondary platform: and transmitting, to the primary platform, a registration request to register the edge application at the primary platform, the primary platform configured to redirect the registration request to the secondary platform to register the edge application at the secondary platform.

In Example 20, the subject matter of Example 19 includes, wherein: the registration request is received at the EAS, an EAS profile of a dual application registration request with the EES to register the edge application with the EES comprises a first information element (IE) that indicates the EES is the primary platform and a second IE that indicates dual deployment is to occur with the MEC platform, and an EAS profile of an EAS registration response from the EES to the EAS in response to the EAS registration request comprises a third IE that provides an EES identifier of the EES, a fourth IE that provides a MEC platform identifier of the MEC platform, and a fifth IE that provides a registration identifier of the edge application for identification to the EES and the MEC platform.

In Example 21, the subject matter of Example 20 includes, wherein in response to reception of the dual application registration request from the EAS, the method further comprises the EES: registering the EAS, identifying the MEC platform, redirecting the dual application registration request to the MEC platform as an application registration request, receiving, in response to transmission of the application registration request to the MEC platform, an application registration request acknowledgment from the MEC platform that includes a registration status of the edge application with the MEC platform, and transmitting, in response to reception of the application registration request acknowledgment from the MEC platform, a dual application registration request acknowledgment to the EAS that includes the registration status.

In Example 22, the subject matter of Examples 19-21 includes, wherein: the registration request is received at the MEC App instance, the MEC App instance is configured to transmit a dual application registration request to the MEC platform in response to reception of the registration request, and in response to reception of the dual application registration request from the MEC App instance, the method further comprises the MEC platform is configured to: registering the MEC App instance, identifying the EES, redirecting the dual application registration request to the EES as an application registration request, receiving, in response to transmission of the application registration request to the EES, an application registration request acknowledgment from the EES that includes a registration status of the edge application with the EES, and transmitting, in response to reception of the application registration request acknowledgment from the EES, a dual application registration request acknowledgment to the MEC App instance that includes the registration status.

In Example 23, the subject matter of Examples 19-22 includes, wherein: an update request to update information of the edge application is received at the EAS, an EAS profile of the update request comprises a first information element (IE) that indicates an EES identifier of the EES, a second IE that indicates a MEC platform identifier of the MEC platform, and a third IE that indicates a registration identifier of the edge application for identification to the EES and the MEC platform, and in response to reception of the update request from the EAS, the method further comprises the EES: updating information of the edge application: redirecting the update request to the MEC platform, receiving, in response to transmission of the update request to the MEC platform, an update request acknowledgment from the MEC platform that includes an update status of the edge application with the MEC platform, and transmitting, in response to reception of the update request acknowledgment from the MEC platform, another update request acknowledgment to the EAS that includes the update status.

In Example 24, the subject matter of Examples 19-23 includes, wherein: an update request to update information of the edge application is received at the MEC App instance, the MEC App instance is configured to transmit the update request to the MEC platform in response to reception of the update request, and in response to reception of the update request from the MEC App instance, the method further comprises the MEC platform: redirecting the update request to the EES, receiving, in response to transmission of the update request to the EES, an update request acknowledgment from the EES that includes a update status of the edge application with the EES, and transmitting, in response to reception of the update request acknowledgment from the EES, another update acknowledgment to the MEC App instance that includes the update status.

In Example 25, the subject matter of Examples 19-24 includes, wherein: a deregister request to deregister the edge application from the EES and MEC platform is received at the EAS, an EAS profile of the deregister request comprises a first information element (IE) that indicates an EES identifier of the EES, a second IE that indicates a MEC platform identifier of the MEC platform, and a third IE that indicates a registration identifier of the edge application for identification to the EES and the MEC platform, and in response to reception of the deregister request from the EAS, the method further comprises the EES: redirecting the deregister request to the MEC platform, receiving, in response to transmission of the deregister request to the MEC platform, a deregister request acknowledgment from the MEC platform that includes a deregister status of the edge application with the MEC platform, and transmitting, in response to reception of the deregister request acknowledgment from the MEC platform, another deregister request acknowledgment to the EAS that includes the deregister status.

In Example 26, the subject matter of Examples 19-25 includes, wherein: a deregister request to deregister the edge application from the EES and MEC platform is received at the MEC App instance, the MEC App instance is configured to transmit the deregister request to the MEC platform in response to reception of the deregister request, and in response to reception of the deregister request from the MEC App instance, the method further comprises the MEC platform: redirecting the deregister request to the EES, receiving, in response to transmission of the deregister request to the EES, an deregister request acknowledgment from the EES that includes a deregister status of the edge application with the EES, and transmitting, in response to reception of the deregister request acknowledgment from the EES, another deregister acknowledgment to the MEC App instance that includes the deregister status.

In Example 27, the subject matter of Example 26 includes, the method further comprises initializing dual deployment with the EES and MEC platform prior to reception of the registration request to allow the EES and MEC platform to communicate directly.

In Example 28, the subject matter of Example 27 includes, 3GPP platform to obtain MEC Platform information.

In Example 29, the subject matter of Example 28 includes, wherein EES and MEC platform pairs are created for the dual deployment during initialization.

In Example 30, the subject matter of Example 29 includes, wherein: the EES and MEC platform pairs are selected by the MEO, a pair selection notification that includes the EES and MEC platform pairs is transmitted from the MEO to the OSS, and the OSS provides an acknowledgment to the MEO in response to the pair selection notification.

In Example 31, the subject matter of Examples 29-30 includes, wherein: the EES and MEC platform pairs are selected by the OSS, a pair selection notification that includes the EES and MEC platform pairs is transmitted from the to OSS the MEO, and the MEO provides an acknowledgment to the OSS in response to the pair selection notification.

In Example 32, the subject matter of Examples 28-31 includes, wherein EES and MEC platform pairs are created for the dual deployment during the registration.

In Example 33, the subject matter of Examples 27-32 includes, wherein an Application Descriptor (AppD) for initialization comprises: a registration type attribute that indicates which of single MEC or dual MEC and 3GPP registration is requested by the MEC, and when the registration type attribute indicates dual MEC and 3GPP registration is requested by the MEC, an edge application version attribute that indicates at least one version of an edge application server (EAS) compatible with the MEC App.

In Example 34, the subject matter of Examples 27-33 includes, wherein an EAS profile for initialization comprises an EAS dual deployment information element (IE) that indicates whether the EAS supports dual deployment with the MEC, and a secondary system IE that contains an identifier of a secondary deployment system for application programming interface (API) consumption.

Example 35 is a method of Edge Dual Deployment (EDD), the method comprising: receiving, from an edge application of a user equipment (UE), a registration request to register the edge application to a Multi-access Edge Computing (MEC) platform via an MEC App instance and an Edge Enabler Server (EES) of a 3rd generation partnership project (3GPP) system via an edge application server (EAS): and in response to the registration request: transmitting, to one of the MEC platform or EES, a primary registration request to register the edge application with the one of the MEC platform or EES, and transmitting, to another of the MEC platform or EES, a secondary registration request to register the edge application with the other of the MEC platform or EES, wherein the secondary registration request has one of: an Application Descriptor (AppD) comprising a registration type attribute that indicates MEC as a secondary registration, or an EAS profile comprising a secondary system information element (IE) that indicates an identifier of a secondary deployment system.

In Example 36, the subject matter of Example 35 includes, the method further comprises transmitting the secondary registration request after reception of an acknowledgment of the primary registration request from the one of the MEC platform or EES.

Example 37 is an apparatus comprising: means for receiving, from an edge application of a user equipment (UE), a registration request to register the edge application to a Multi-access Edge Computing (MEC) platform via an MEC App instance and an Edge Enabler Server (EES) via an edge application server (EAS) of a 3rd generation partnership project (3GPP) system, the registration request indicating one of the MEC platform or EES as a primary platform and another of the MEC platform or EES as a secondary platform: and means for transmitting, to the primary platform, a registration request to register the edge application at the primary platform, the primary platform configured to redirect the registration request to the secondary platform to register the edge application at the secondary platform.

In Example 38, the subject matter of Example 37 includes, wherein: the registration request is received at the EAS, an EAS profile of a dual application registration request with the EES to register the edge application with the EES comprises a first information element (IE) that indicates the EES is the primary platform and a second IE that indicates dual deployment is to occur with the MEC platform, and an EAS profile of an EAS registration response from the EES to the EAS in response to the EAS registration request comprises a third IE that provides an EES identifier of the EES, a fourth IE that provides a MEC platform identifier of the MEC platform, and a fifth IE that provides a registration identifier of the edge application for identification to the EES and the MEC platform.

In Example 39, the subject matter of Example 38 includes, wherein in response to reception of the dual application registration request from the EAS, the apparatus further comprises for the EES: means for registering the EAS, means for identifying the MEC platform, means for redirecting the dual application registration request to the MEC platform as an application registration request, means for receiving, in response to transmission of the application registration request to the MEC platform, an application registration request acknowledgment from the MEC platform that includes a registration status of the edge application with the MEC platform, and means for transmitting, in response to reception of the application registration request acknowledgment from the MEC platform, a dual application registration request acknowledgment to the EAS that includes the registration status.

In Example 40, the subject matter of Examples 38-39 includes, wherein: the registration request is received at the MEC App instance, the MEC App instance is configured to transmit a dual application registration request to the MEC platform in response to reception of the registration request, and in response to reception of the dual application registration request from the MEC App instance, the apparatus further comprises for the MEC platform: means for registering the MEC App instance, means for identifying the EES, means for redirecting the dual application registration request to the EES as an application registration request, means for receiving, in response to transmission of the application registration request to the EES, an application registration request acknowledgment from the EES that includes a registration status of the edge application with the EES, and means for transmitting, in response to reception of the application registration request acknowledgment from the EES, a dual application registration request acknowledgment to the MEC App instance that includes the registration status.

In Example 41, the subject matter of Examples 38-40 includes, wherein: an update request to update information of the edge application is received at the EAS, an EAS profile of the update request comprises a first information element (IE) that indicates an EES identifier of the EES, a second IE that indicates a MEC platform identifier of the MEC platform, and a third IE that indicates a registration identifier of the edge application for identification to the EES and the MEC platform, and in response to reception of the update request from the EAS, the apparatus further comprises for the EES: means for updating information of the edge application: means for redirecting the update request to the MEC platform, means for receiving, in response to transmission of the update request to the MEC platform, an update request acknowledgment from the MEC platform that includes an update status of the edge application with the MEC platform, and means for transmitting, in response to reception of the update request acknowledgment from the MEC platform, another update request acknowledgment to the EAS that includes the update status.

In Example 42, the subject matter of Examples 38-41 includes, wherein: an update request to update information of the edge application is received at the MEC App instance, the MEC App instance is configured to transmit the update request to the MEC platform in response to reception of the update request, and in response to reception of the update request from the MEC App instance, the apparatus further comprises for the MEC platform: means for redirecting the update request to the EES, means for receiving, in response to transmission of the update request to the EES, an update request acknowledgment from the EES that includes a update status of the edge application with the EES, and means for transmitting, in response to reception of the update request acknowledgment from the EES, another update acknowledgment to the MEC App instance that includes the update status.

In Example 43, the subject matter of Examples 38-42 includes, wherein: a deregister request to deregister the edge application from the EES and MEC platform is received at the EAS, an EAS profile of the deregister request comprises a first information element (IE) that indicates an EES identifier of the EES, a second IE that indicates a MEC platform identifier of the MEC platform, and a third IE that indicates a registration identifier of the edge application for identification to the EES and the MEC platform, and in response to reception of the deregister request from the EAS, the apparatus further comprises for the EES: means for redirecting the deregister request to the MEC platform, means for receiving, in response to transmission of the deregister request to the MEC platform, a deregister request acknowledgment from the MEC platform that includes a deregister status of the edge application with the MEC platform, and means for transmitting, in response to reception of the deregister request acknowledgment from the MEC platform, another deregister request acknowledgment to the EAS that includes the deregister status.

In Example 44, the subject matter of Examples 38-43 includes, wherein: a deregister request to deregister the edge application from the EES and MEC platform is received at the MEC App instance, the MEC App instance is configured to transmit the deregister request to the MEC platform in response to reception of the deregister request, and in response to reception of the deregister request from the MEC App instance, the apparatus further comprises for the MEC platform: means for redirecting the deregister request to the EES, means for receiving, in response to transmission of the deregister request to the EES, an deregister request acknowledgment from the EES that includes a deregister status of the edge application with the EES, and means for transmitting, in response to reception of the deregister request acknowledgment from the EES, another deregister acknowledgment to the MEC App instance that includes the deregister status.

In Example 45, the subject matter of Example 44 includes, the apparatus further comprises means for initializing dual deployment with the EES and MEC platform prior to reception of the registration request to allow the EES and MEC platform to communicate directly.

In Example 46, the subject matter of Example 45 includes, 3GPP platform to obtain MEC Platform information.

In Example 47, the subject matter of Example 46 includes, wherein EES and MEC platform pairs are created for the dual deployment during initialization.

In Example 48, the subject matter of Example 47 includes, wherein: the EES and MEC platform pairs are selected by the MEO, a pair selection notification that includes the EES and MEC platform pairs is transmitted from the MEO to the OSS, and the OSS provides an acknowledgment to the MEO in response to the pair selection notification.

In Example 49, the subject matter of Examples 47-48 includes, wherein: the EES and MEC platform pairs are selected by the OSS, a pair selection notification that includes the EES and MEC platform pairs is transmitted from the to OSS the MEO, and the MEO provides an acknowledgment to the OSS in response to the pair selection notification.

In Example 50, the subject matter of Examples 46-49 includes, wherein EES and MEC platform pairs are created for the dual deployment during the registration.

In Example 51, the subject matter of Examples 45-50 includes, wherein an Application Descriptor (AppD) for initialization comprises: a registration type attribute that indicates which of single MEC or dual MEC and 3GPP registration is requested by the MEC, and when the registration type attribute indicates dual MEC and 3GPP registration is requested by the MEC, an edge application version attribute that indicates at least one version of an edge application server (EAS) compatible with the MEC App.

In Example 52, the subject matter of Examples 45-51 includes, wherein an EAS profile for initialization comprises an EAS dual deployment information element (IE) that indicates whether the EAS supports dual deployment with the MEC, and a secondary system IE that contains an identifier of a secondary deployment system for application programming interface (API) consumption.

Example 53 is an apparatus of Edge Dual Deployment (EDD) comprising: means for receiving, from an edge application of a user equipment (UE), a registration request to register the edge application to a Multi-access Edge Computing (MEC) platform via an MEC App instance and an Edge Enabler Server (EES) of a 3rd generation partnership project (3GPP) system via an edge application server (EAS); and in response to the registration request: means for transmitting, to one of the MEC platform or EES, a primary registration request to register the edge application with the one of the MEC platform or EES, and means for transmitting, to another of the MEC platform or EES, a secondary registration request to register the edge application with the other of the MEC platform or EES, wherein the secondary registration request has one of: an Application Descriptor (AppD) comprising a registration type attribute that indicates MEC as a secondary registration, or an EAS profile comprising a secondary system information element (IE) that indicates an identifier of a secondary deployment system.

In Example 54, the subject matter of Example 53 includes, the apparatus further comprises means for transmitting the secondary registration request after reception of an acknowledgment of the primary registration request from the one of the MEC platform or EES.

Example 55 is one or more computer readable media comprising instructions that, when executed by processing circuitry, causes the processing circuitry to perform any of the operations described herein.

Example 56 is a computer program comprising the instructions of Example 55.

Example 57 is an Application Programming Interface defining functions, methods, variables, data structures, and/or protocols for the computer program of Example 56.

Example 58 is a computing system comprising the one or more computer readable media and the processing circuitry of Example 55.

Example 59 is a signal generated as a result of executing the instructions of Example 55.

Example 60 is one or more edge/edge-cloud/hybrid-cloud computing systems adapted to perform the operations or techniques discussed herein.

Example 61 is at least one machine-readable medium including instructions that, when executed by processing circuitry, cause the processing circuitry to perform operations to implement of any of Examples 1-60.

Example 62 is an apparatus comprising means to implement of any of Examples 1-60.

Example 63 is a system to implement of any of Examples 1-60.

Example 64 is a method to implement of any of Examples 1-60.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:
1. A device comprising:
processing circuitry; and
a memory including instructions embodied thereon, wherein the instructions, which when executed by the processing circuitry, configure the processing circuitry to:

receive, from an edge application of a user equipment (UE), a registration request to register the edge application to a Multi-access Edge Computing (MEC) platform via an MEC App instance and an Edge Enabler Server (EES) via an edge application server (EAS) of a $3^{rd}$ generation partnership project (3GPP) system, the registration request indicating one of the MEC platform or EES as a primary platform and another of the MEC platform or EES as a secondary platform; and transmit, to the primary platform, a registration request to register the edge application at the primary platform, the primary platform configured to redirect the registration request to the secondary platform to register the edge application at the secondary platform.

2. The device of claim 1, wherein:

the registration request is received at the EAS, an EAS profile of a dual application registration request with the EES to register the edge application with the EES comprises a first information element (IE) that indicates the EES is the primary platform and a second IE that indicates dual deployment is to occur with the MEC platform, and an EAS profile of an EAS registration response from the EES to the EAS in response to the EAS registration request comprises a third IE that provides an EES identifier of the EES, a fourth IE that provides a MEC platform identifier of the MEC platform, and a fifth IE that provides a registration identifier of the edge application for identification to the EES and the MEC platform.

3. The device of claim 2, wherein in response to reception of the dual application registration request from the EAS, the EES is configured to:

register the EAS, identify the MEC platform, redirect the dual application registration request to the MEC platform as an application registration request, receive, in response to transmission of the application registration request to the MEC platform, an application registration request acknowledgment from the MEC platform that includes a registration status of the edge application with the MEC platform, and transmit, in response to reception of the application registration request acknowledgment from the MEC platform, a dual application registration request acknowledgment to the EAS that includes the registration status.

4. The device of claim 1, wherein:

the registration request is received at the MEC App instance, the MEC App instance is configured to transmit a dual application registration request to the MEC platform in response to reception of the registration request, and in response to reception of the dual application registration request from the MEC App instance, the MEC platform is configured to:

register the MEC App instance, identify the EES, redirect the dual application registration request to the EES as an application registration request, receive, in response to transmission of the application registration request to the EES, an application registration request acknowledgment from the EES that includes a registration status of the edge application with the EES, and transmit, in response to reception of the application registration request acknowledgment from the EES, a dual application registration request acknowledgment to the MEC App instance that includes the registration status.

5. The device of claim 1, wherein:

an update request to update information of the edge application is received at the EAS, an EAS profile of the update request comprises a first information element (IE) that indicates an EES identifier of the EES, a second IE that indicates a MEC platform identifier of the MEC platform, and a third IE that indicates a registration identifier of the edge application for identification to the EES and the MEC platform, and in response to reception of the update request from the EAS, the EES is configured to:

update information of the edge application, redirect the update request to the MEC platform, receive, in response to transmission of the update request to the MEC platform, an update request acknowledgment from the MEC platform that includes an update status of the edge application with the MEC platform, and transmit, in response to reception of the update request acknowledgment from the MEC platform, another update request acknowledgment to the EAS that includes the update status.

6. The device of claim 1, wherein:

an update request to update information of the edge application is received at the MEC App instance, the MEC App instance is configured to transmit the update request to the MEC platform in response to reception of the update request, and in response to reception of the update request from the MEC App instance, the MEC platform is configured to:

redirect the update request to the EES, receive, in response to transmission of the update request to the EES, an update request acknowledgment from the EES that includes a update status of the edge application with the EES, and transmit, in response to reception of the update request acknowledgment from the EES, another update acknowledgment to the MEC App instance that includes the update status.

7. The device of claim 1, wherein:

a deregister request to deregister the edge application from the EES and MEC platform is received at the EAS, an EAS profile of the deregister request comprises a first information element (IE) that indicates an EES identifier of the EES, a second IE that indicates a MEC platform identifier of the MEC platform, and a third IE that indicates a registration identifier of the edge application for identification to the EES and the MEC platform, and in response to reception of the deregister request from the EAS, the EES is configured to:

redirect the deregister request to the MEC platform, receive, in response to transmission of the deregister request to the MEC platform, a deregister request acknowledgment from the MEC platform that includes a deregister status of the edge application with the MEC platform, and transmit, in response to reception of the deregister request acknowledgment from the MEC platform, another deregister request acknowledgment to the EAS that includes the deregister status.

8. The device of claim 1, wherein:
a deregister request to deregister the edge application from the EES and MEC platform is received at the MEC App instance,
the MEC App instance is configured to transmit the deregister request to the MEC platform in response to reception of the deregister request, and
in response to reception of the deregister request from the MEC App instance, the MEC platform is configured to:
redirect the deregister request to the EES,
receive, in response to transmission of the deregister request to the EES, an deregister request acknowledgment from the EES that includes a deregister status of the edge application with the EES, and
transmit, in response to reception of the deregister request acknowledgment from the EES, another deregister acknowledgment to the MEC App instance that includes the deregister status.

9. The device of claim 1, wherein the instructions, which when executed by the processing circuitry, configure the processing circuitry to initialize dual deployment with the EES and MEC platform prior to reception of the registration request to allow the EES and MEC platform to communicate directly.

10. The device of claim 9, wherein the instructions, which when executed by the processing circuitry, configure the processing circuitry to initialize the dual deployment via communication between a MEC Orchestrator (MEO) of the MEC platform and an Operations Support System (OSS) of the 3GPP system for the MEC platform to obtain information of available EESs and the 3GPP platform to obtain MEC Platform information.

11. The device of claim 10, wherein EES and MEC platform pairs are created for the dual deployment during initialization.

12. The device of claim 11, wherein:
the EES and MEC platform pairs are selected by the MEO,
a pair selection notification that includes the EES and MEC platform pairs is transmitted from the MEO to the OSS, and
the OSS provides an acknowledgment to the MEO in response to the pair selection notification.

13. The device of claim 11, wherein:
the EES and MEC platform pairs are selected by the OSS,
a pair selection notification that includes the EES and MEC platform pairs is transmitted from the to OSS the MEO, and
the MEO provides an acknowledgment to the OSS in response to the pair selection notification.

14. The device of claim 10, wherein EES and MEC platform pairs are created for the dual deployment during the registration.

15. The device of claim 9, wherein an Application Descriptor (AppD) for initialization comprises:
a registration type attribute that indicates which of single MEC or dual MEC and 3GPP registration is requested by the MEC, and
when the registration type attribute indicates dual MEC and 3GPP registration is requested by the MEC, an edge application version attribute that indicates at least one version of an edge application server (EAS) compatible with the MEC App.

16. The device of claim 9, wherein an EAS profile for initialization comprises an EAS dual deployment information element (IE) that indicates whether the EAS supports dual deployment with the MEC, and a secondary system IE that contains an identifier of a secondary deployment system for application programming interface (API) consumption.

17. A device comprising:
processing circuitry; and
a memory including instructions embodied thereon, wherein the instructions, which when executed by the processing circuitry, configure the processing circuitry to:
receive, from an edge application of a user equipment (UE), a registration request to register the edge application to a Multi-access Edge Computing (MEC) platform via an MEC App instance and an Edge Enabler Server (EES) of a 3rd generation partnership project (3GPP) system via an edge application server (EAS); and
in response to the registration request:
transmit, to one of the MEC platform or EES, a primary registration request to register the edge application with the one of the MEC platform or EES, and
transmit, to another of the MEC platform or EES, a secondary registration request to register the edge application with the other of the MEC platform or EES,
wherein the secondary registration request has one of:
an Application Descriptor (AppD) comprising a registration type attribute that indicates MEC as a secondary registration, or
an EAS profile comprising a secondary system information element (IE) that indicates an identifier of a secondary deployment system.

18. The device of claim 17, wherein the instructions, when executed by the processing circuitry, configure the processing circuitry to transmit the secondary registration request after reception of an acknowledgment of the primary registration request from the one of the MEC platform or EES.

19. An apparatus comprising:
means for receiving, from an edge application of a user equipment (UE), a registration request to register the edge application to a Multi-access Edge Computing (MEC) platform via an MEC App instance and an Edge Enabler Server (EES) via an edge application server (EAS) of a $3^{rd}$ generation partnership project (3GPP) system, the registration request indicating one of the MEC platform or EES as a primary platform and another of the MEC platform or EES as a secondary platform; and
means for transmitting, to the primary platform, a registration request to register the edge application at the primary platform, the primary platform configured to redirect the registration request to the secondary platform to register the edge application at the secondary platform.

20. The apparatus of claim 19, wherein:
the registration request is received at the EAS, an EAS profile of a dual application registration request with the EES to register the edge application with the EES comprises a first information element (IE) that indicates the EES is the primary platform and a second IE that indicates dual deployment is to occur with the MEC platform, and
an EAS profile of an EAS registration response from the EES to the EAS in response to the EAS registration request comprises a third IE that provides an EES identifier of the EES, a fourth IE that provides a MEC platform identifier of the MEC platform, and a fifth IE that provides a registration identifier of the edge application for identification to the EES and the MEC platform.

\* \* \* \* \*